United States Patent
Park et al.

(10) Patent No.: US 10,476,575 B2
(45) Date of Patent: Nov. 12, 2019

(54) CODEBOOK-BASED SIGNAL TRANSMISSION/RECEPTION METHOD IN MULTI-ANTENNA WIRELESS COMMUNICATION SYSTEM, AND DEVICE FOR SAME

(71) Applicant: LG ELECTRONICS INC., Seoul (KR)

(72) Inventors: Haewook Park, Seoul (KR); Kijun Kim, Seoul (KR); Jonghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 24 days.

(21) Appl. No.: 15/747,003

(22) PCT Filed: Jul. 25, 2016

(86) PCT No.: PCT/KR2016/008100
§ 371 (c)(1),
(2) Date: Jan. 23, 2018

(87) PCT Pub. No.: WO2017/014612
PCT Pub. Date: Jan. 26, 2017

(65) Prior Publication Data
US 2018/0219603 A1     Aug. 2, 2018

Related U.S. Application Data

(60) Provisional application No. 62/196,275, filed on Jul. 23, 2015, provisional application No. 62/232,466, (Continued)

(51) Int. Cl.
*H04B 7/06*     (2006.01)
*H04B 7/0413*   (2017.01)

(52) U.S. Cl.
CPC ............. *H04B 7/0639* (2013.01); *H04B 7/06* (2013.01); *H04B 7/0626* (2013.01); *H04B 7/0413* (2013.01)

(58) Field of Classification Search
CPC ....................................................... H04B 7/0639
(Continued)

(56) References Cited

U.S. PATENT DOCUMENTS

| | | | |
|---|---|---|---|
| 9,667,328 B2* | 5/2017 | Xin | H04B 7/0478 |
| 2010/0172430 A1* | 7/2010 | Melzer | H04B 7/0417 375/267 |

(Continued)

FOREIGN PATENT DOCUMENTS

| | | |
|---|---|---|
| EP | 2894802 | 7/2015 |
| EP | 3289696 | 3/2018 |

(Continued)

OTHER PUBLICATIONS

PCT International Application No. PCT/KR2016/008100, Written Opinion of the International Searching Authority dated Nov. 14, 2016, 11 pages.

(Continued)

*Primary Examiner* — Lihong Yu
(74) *Attorney, Agent, or Firm* — Lee Hong Degerman Kang & Waimey

(57) ABSTRACT

Disclosed are a codebook-based signal transmission/reception method in a multi-antenna wireless communication system, and a device for same. Specifically, provided is a method by which a terminal transmits/receives a signal on the basis of a codebook, in a 2-dimensional multi-antenna wireless communication system, comprising the steps of: receiving a channel state information reference signal (CSI-RS) from a base station, via a multi-antenna port; and reporting channel state information to the base station. The
(Continued)

channel state information comprises a precoding matrix indicator (PMI) for indicating a precoding matrix. The PMI comprises a first PMI for selecting a precoding matrix set from a codebook, and a second PMI for selecting one precoding matrix from the precoding matrix set. The pair of the first dimensional index and second dimensional index of the precoding matrix belonging to the precoding matrix set is (x, y), (x+2, y), (x, y+1), (x+1, y+1), x and y being whole numbers that are not negative.

13 Claims, 32 Drawing Sheets

Related U.S. Application Data filed on Sep. 25, 2015, provisional application No. 62/237,611, filed on Oct. 6, 2015, provisional application No. 62/239,292, filed on Oct. 9, 2015, provisional application No. 62/254,668, filed on Nov. 12, 2015.

(58) Field of Classification Search
USPC .......................................................... 375/267
See application file for complete search history.

(56) References Cited

U.S. PATENT DOCUMENTS

| | | | |
|---|---|---|---|
| 2013/0100922 A1 | 4/2013 | Ahn et al. | |
| 2013/0308715 A1 | 11/2013 | Nam et al. | |
| 2014/0050276 A1 | 2/2014 | Zhang et al. | |
| 2014/0098689 A1* | 4/2014 | Lee | H04B 7/0469 370/252 |
| 2016/0006493 A1* | 1/2016 | Chen | H04B 7/0456 375/267 |

FOREIGN PATENT DOCUMENTS

| | | |
|---|---|---|
| KR | 20150070925 | 6/2015 |
| WO | 2014/052806 | 4/2014 |
| WO | 2014/142504 | 9/2014 |
| WO | 2015/042986 | 4/2015 |
| WO | 2016/183880 | 11/2016 |

OTHER PUBLICATIONS

Samsung, "Specification impacts and evaluation results with KP codebook enhancements," 3GPP TSG-RAN WG1 #81, R1-153406, May 2015, 6 pages.
Japan Patent Office Application No. 2018-503205, Office Action dated Jan. 22, 2019, 3 pages.
European patent application No. 16828116.0, European Search Report dated Feb. 26, 2019, 15 pages.
Huawei et al., "Codebook enhancements for EBF/FD-MIMO," 3GPP TSG RAN WG1 Meeting #81, R1-152484, Fukuoka, Japan, May 25-29, 2015, 7 pages.
Dualcomm Incorpoarated, "Discussion on non-precoded CSI-RS and feedback enhancements," 3GPP TSG-RAN WG1 Meeting #81, R1-152795, Fukuoka, Japan, May 25-29, 2015, 4 pages.
Samsung, "Discussion on Scalable Codebook Design," 3GPP TSG RAN WG1 Meeting #81, R1-152892, Fukuoka, Japan, May 25-29, 2015, 4 pages.
Huawei et al., "Codebook design for 16 ports 2D antenna arrays," 3GPP TSG RAN WG1 Meeting #82bis, R1-155077, Malmo, Sweden, Oct. 5-9, 2015, 8 pages.
LG Electronics, "2D codebook design with 16-port CSI-RS," 3GPP TSG RAN WG1 Meeting #82bis, R1-155401, Malmo, Sweden, Oct. 5-9, 2015, 11 pages.

* cited by examiner

【FIG. 1】
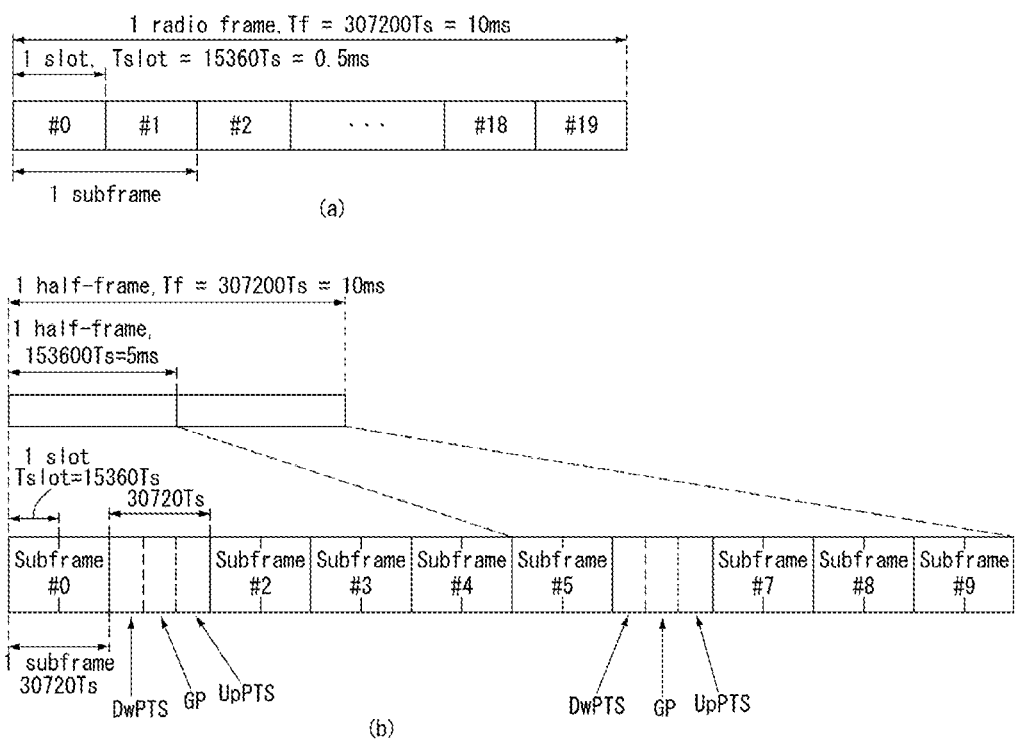

[FIG. 2]
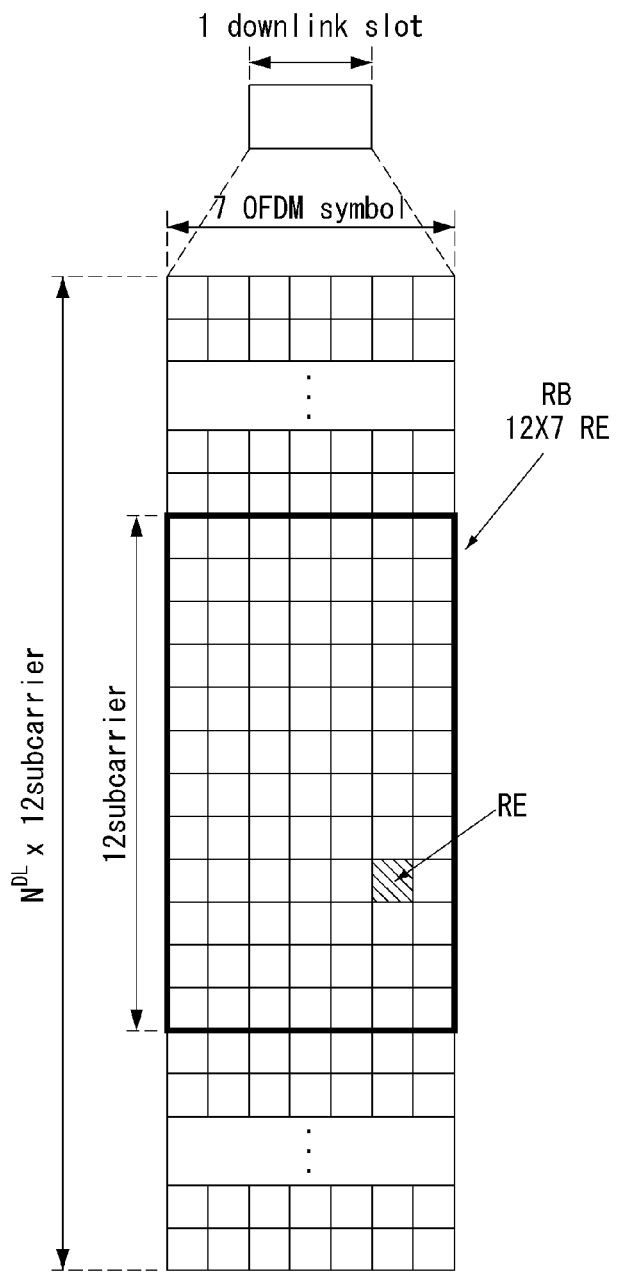

[FIG. 3]
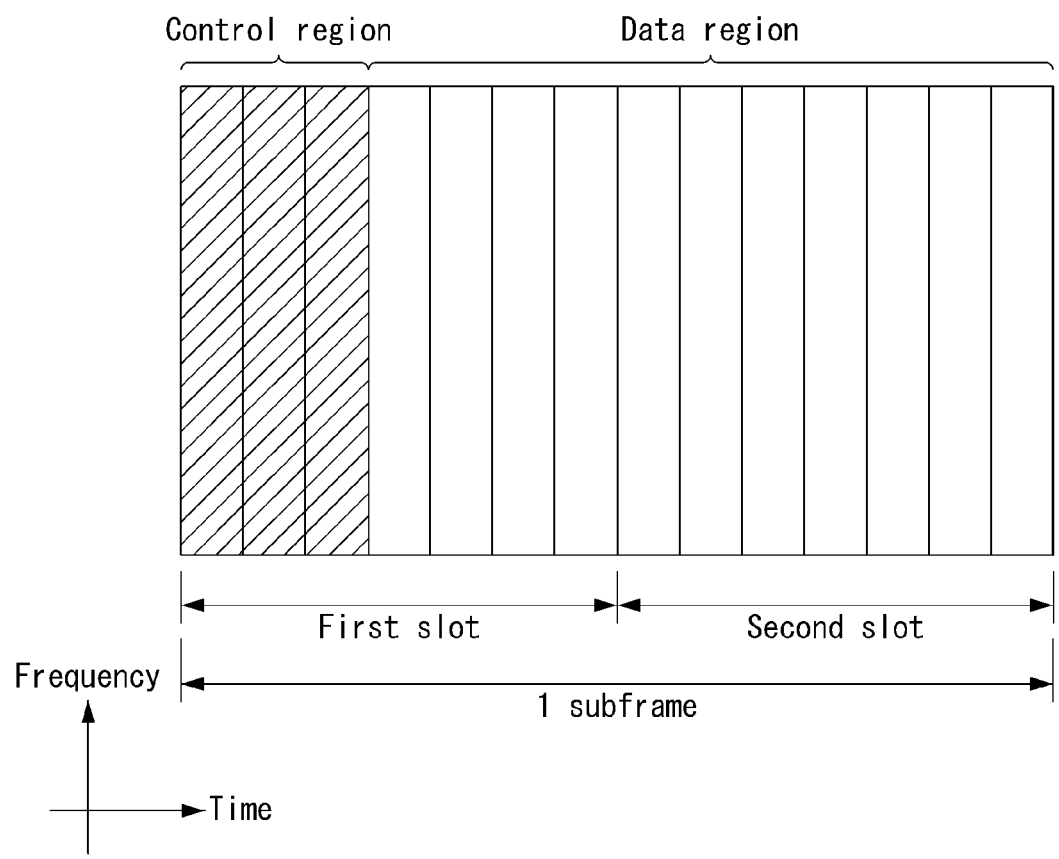

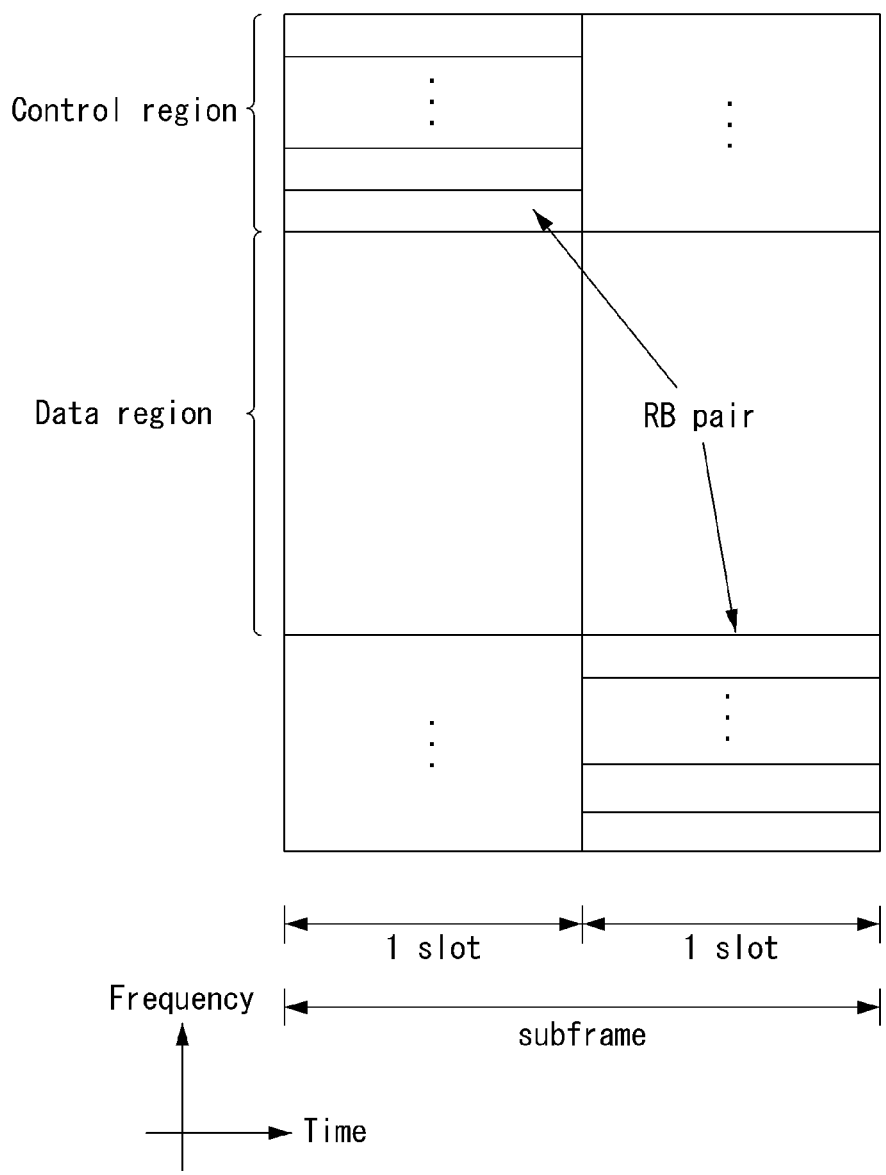
[FIG. 4]

【FIG. 5】
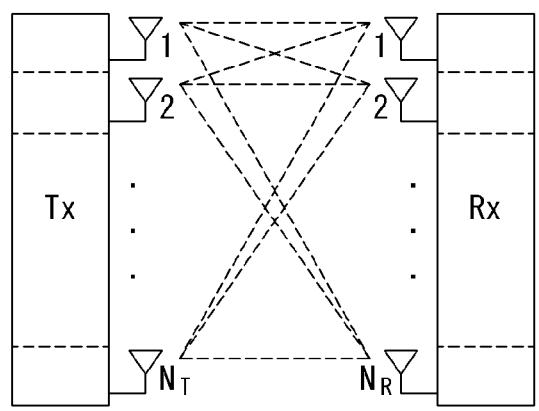
【FIG. 6】
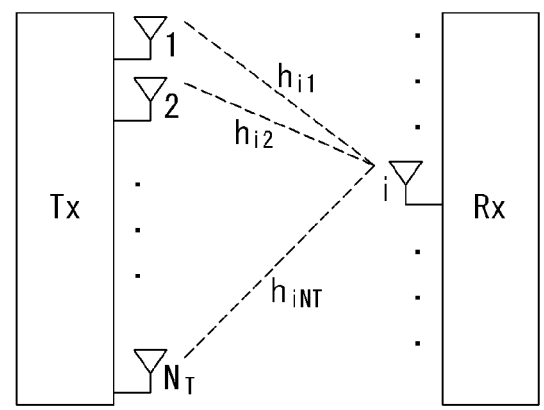

【FIG. 7】
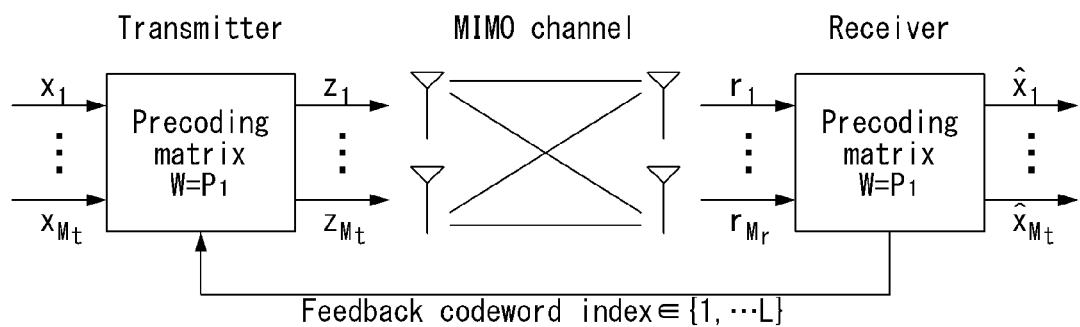

[FIG. 8]
(a) 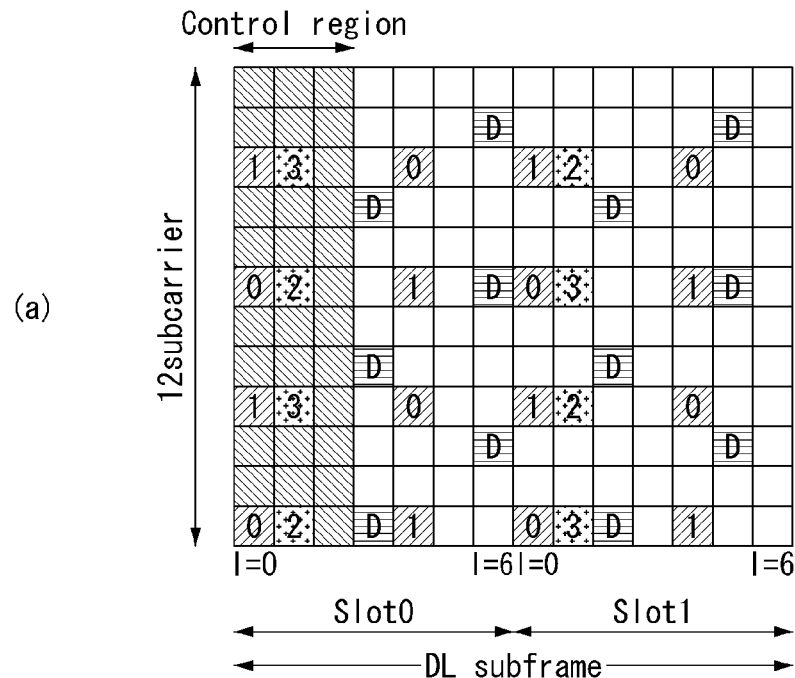
(b) 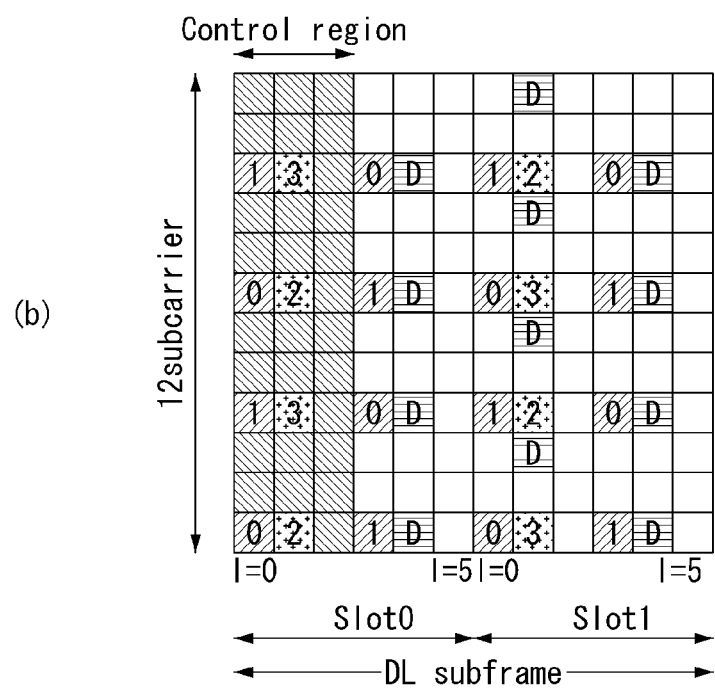

[FIG. 9]
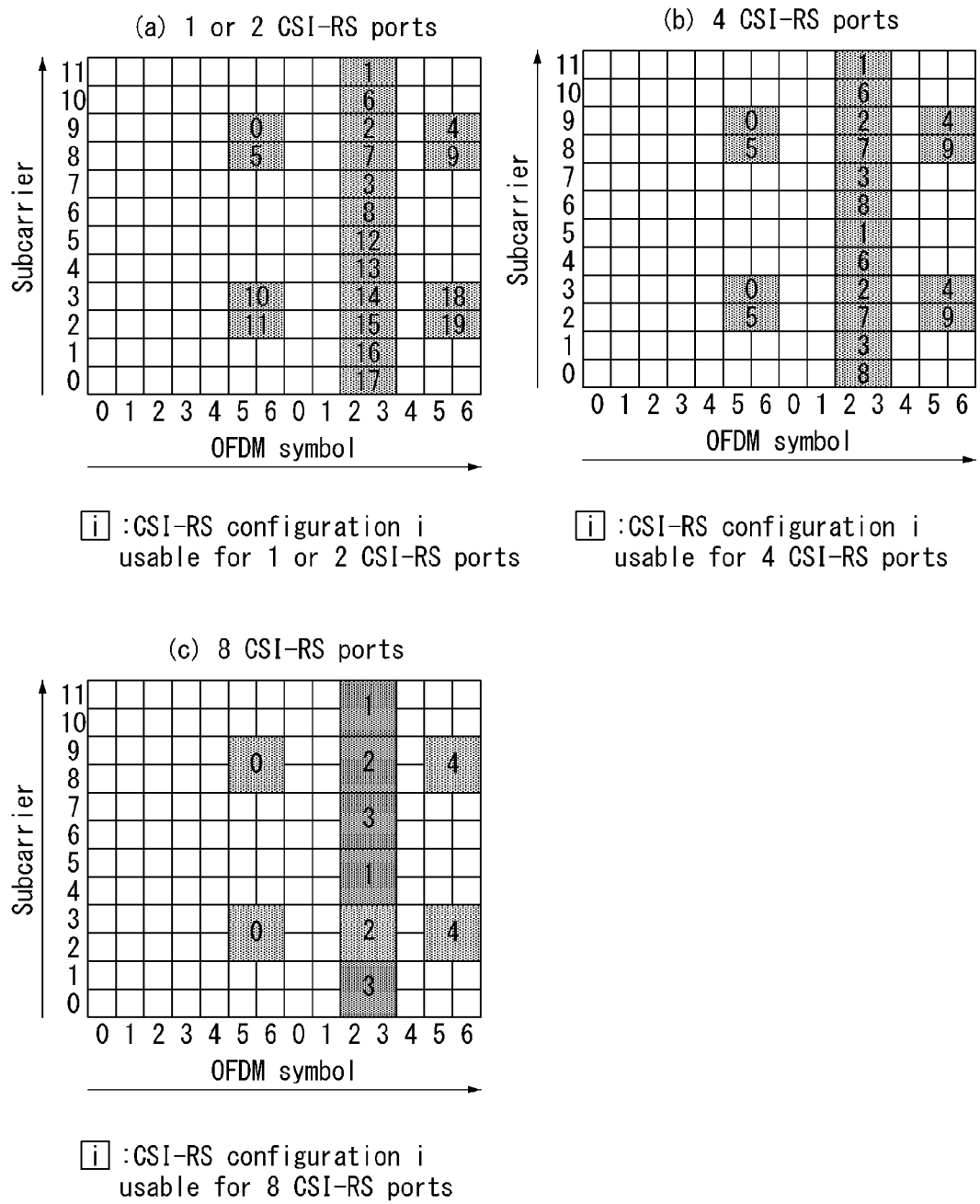

【FIG. 10】
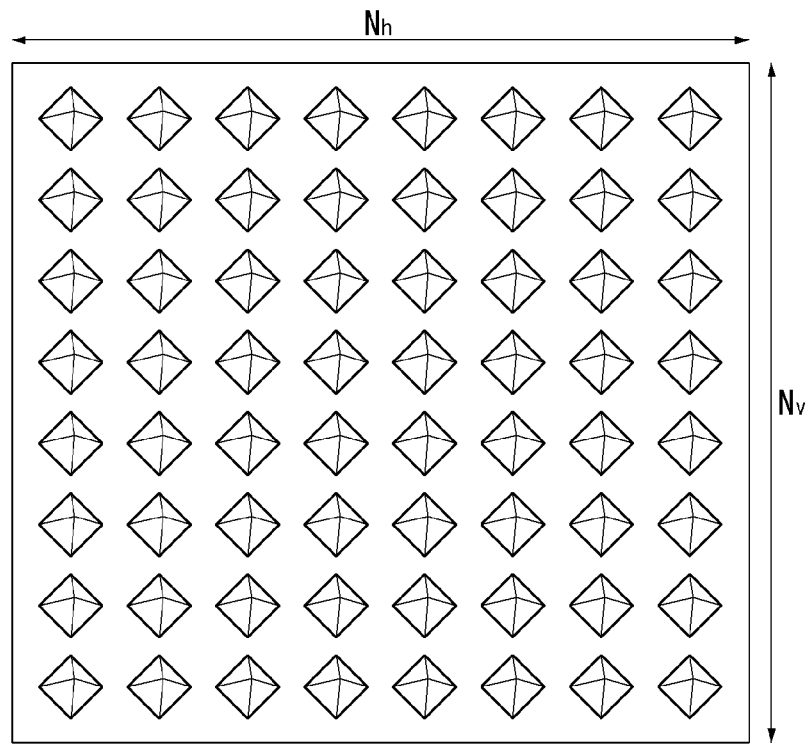
【FIG. 11】
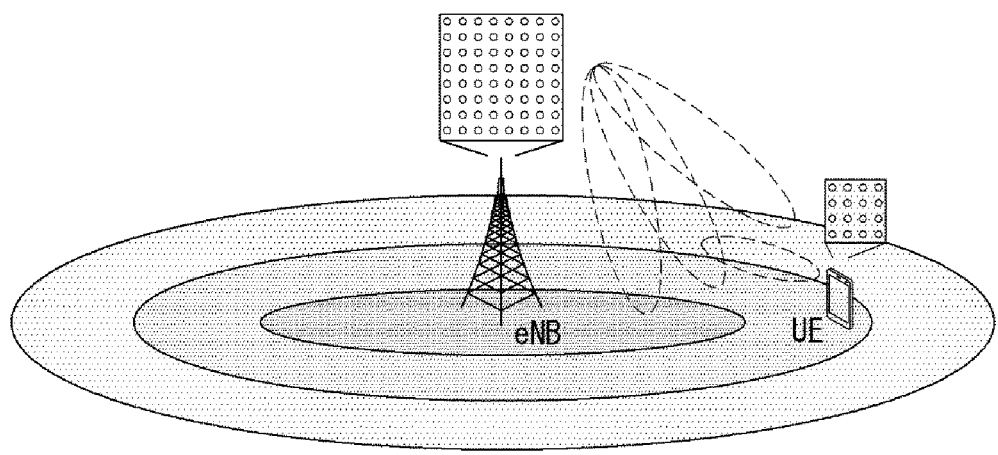

[FIG. 12]
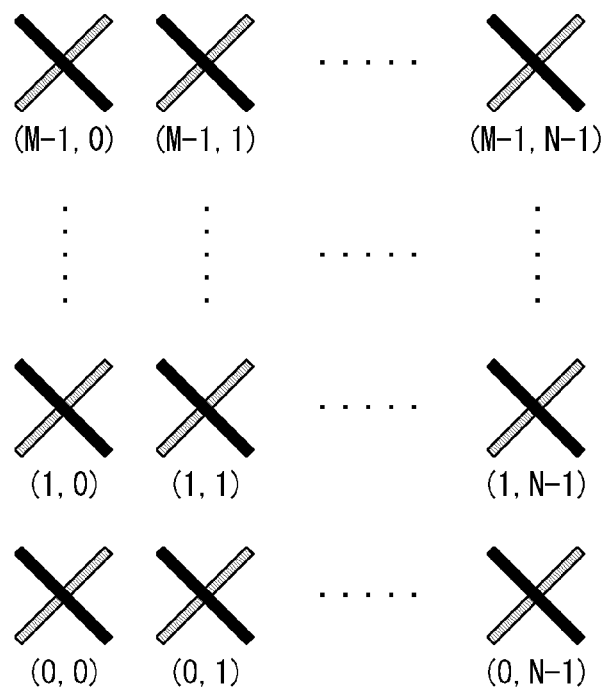

[FIG. 13]
(a) 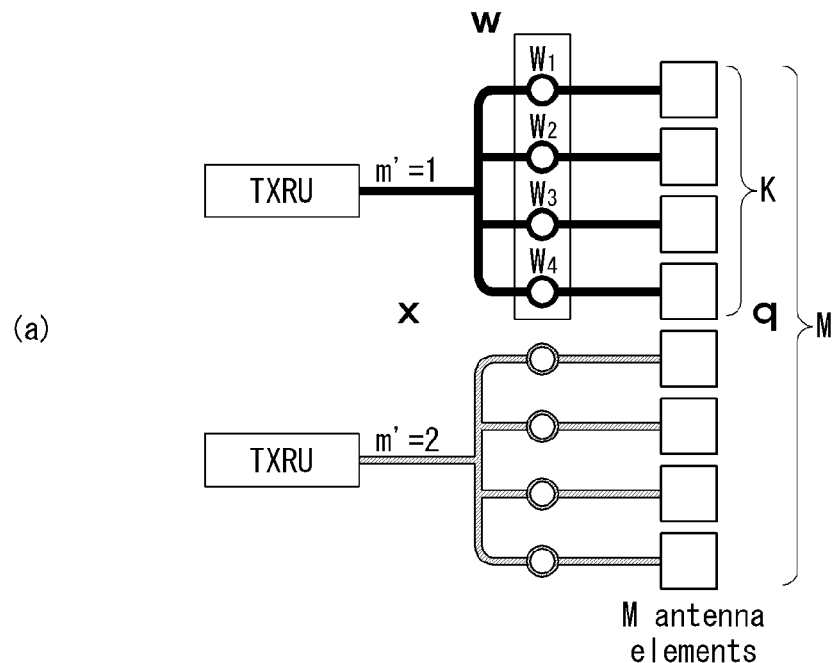
(b) 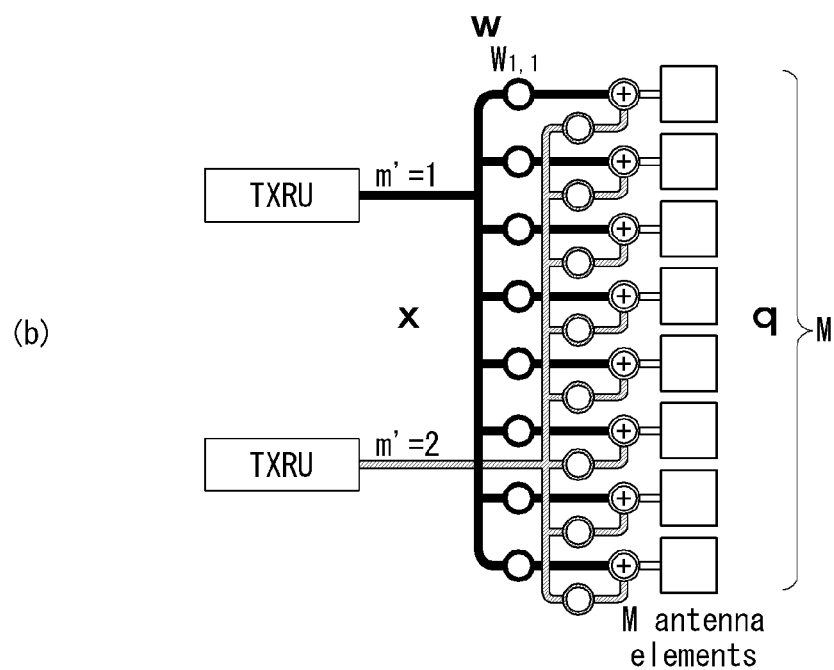

【FIG. 14】
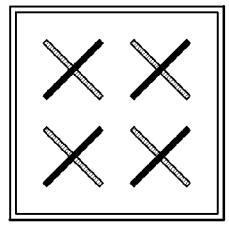
(M, N, P, Q) = (2, 2, 2, 8)
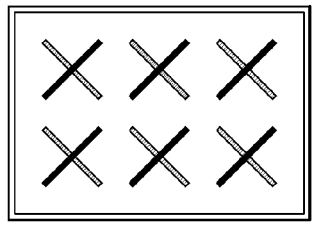
(M, N, P, Q) = (2, 3, 2, 12)
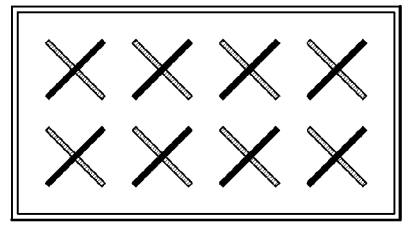
(M, N, P, Q) = (2, 4, 2, 16)
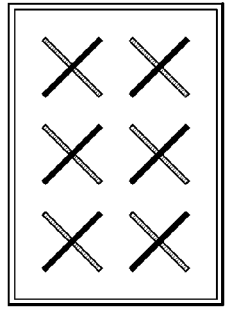
(M, N, P, Q) = (3, 2, 2, 12)
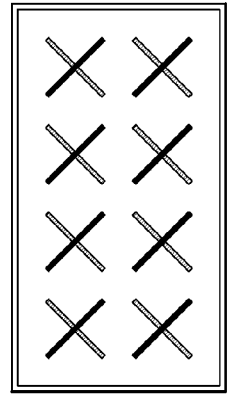
(M, N, P, Q) = (4, 2, 2, 16)
(a) 8 TXRU      (b) 12 TXRU      (c) 16 TXRU
【FIG. 15】
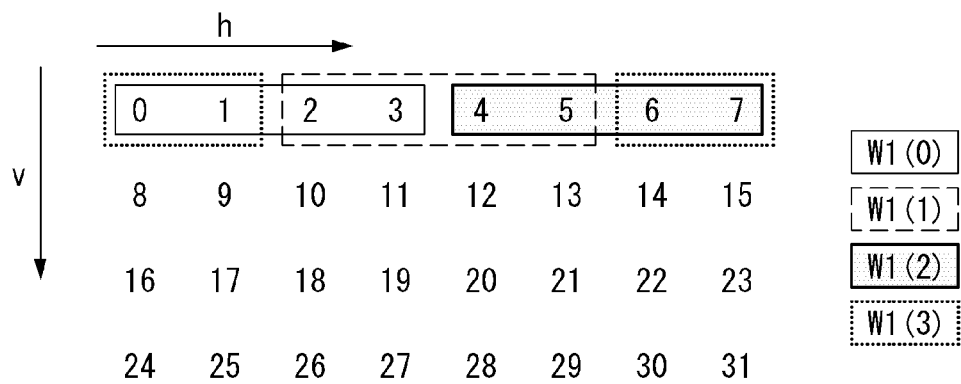

【FIG. 16】
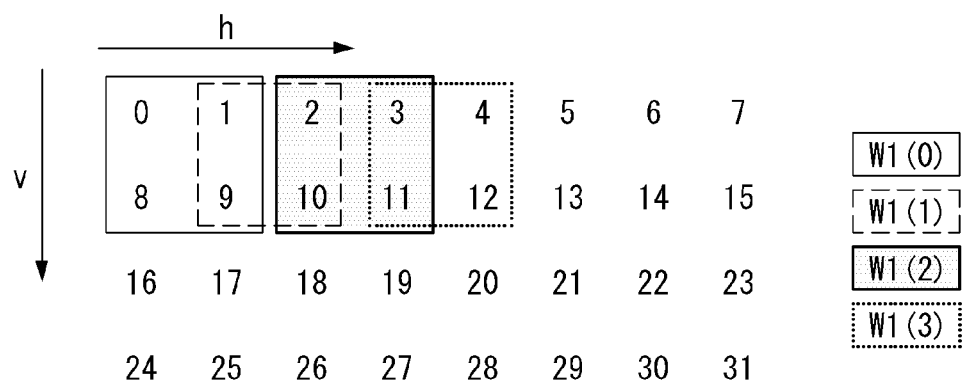
【FIG. 17】
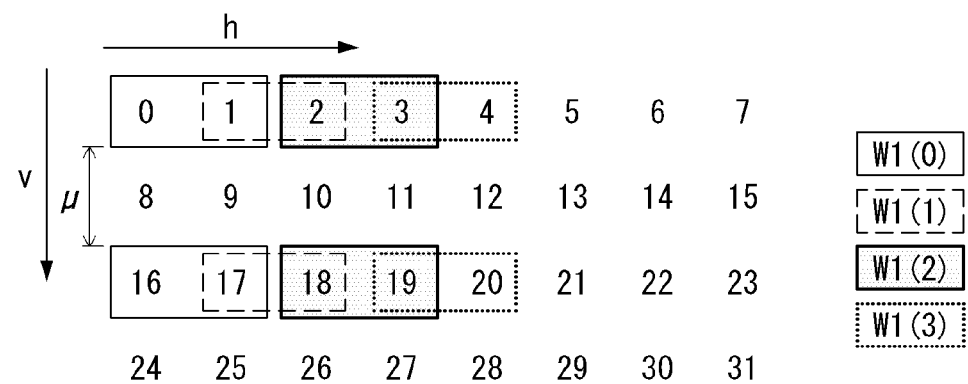

【FIG. 18】
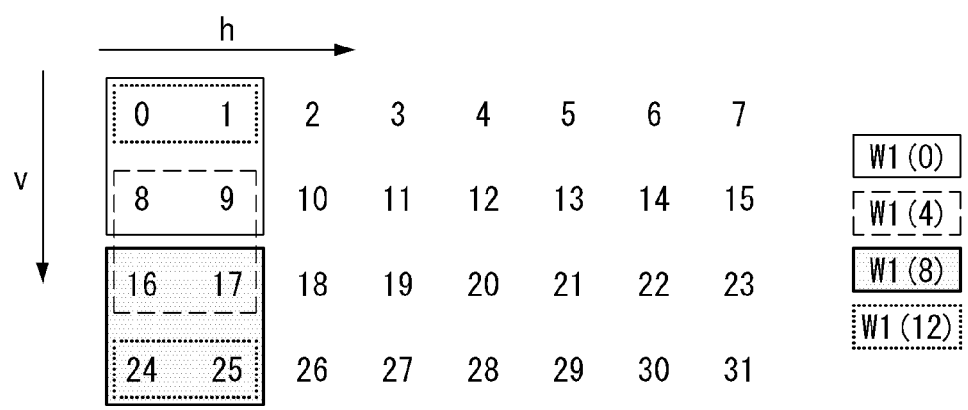
【FIG. 19】
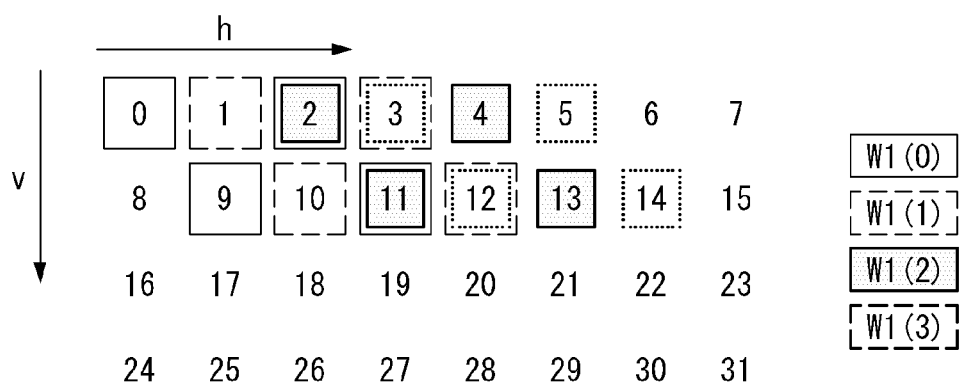

[FIG. 20]
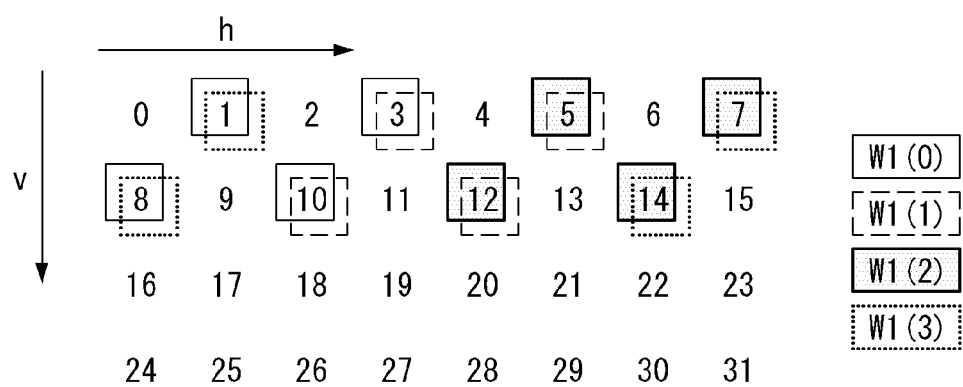
[FIG. 21]
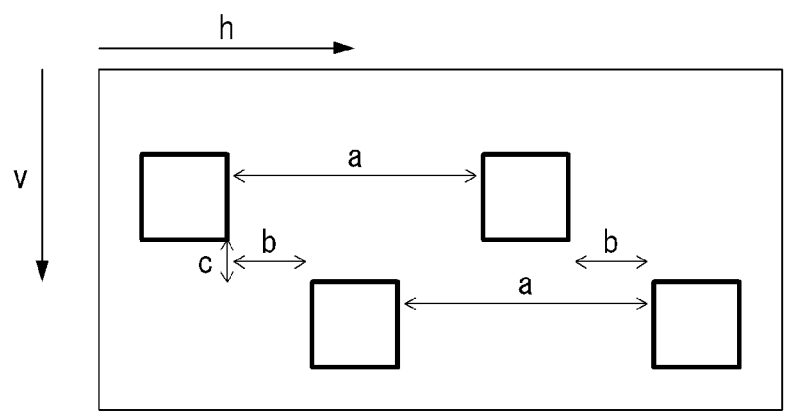

[FIG. 22]
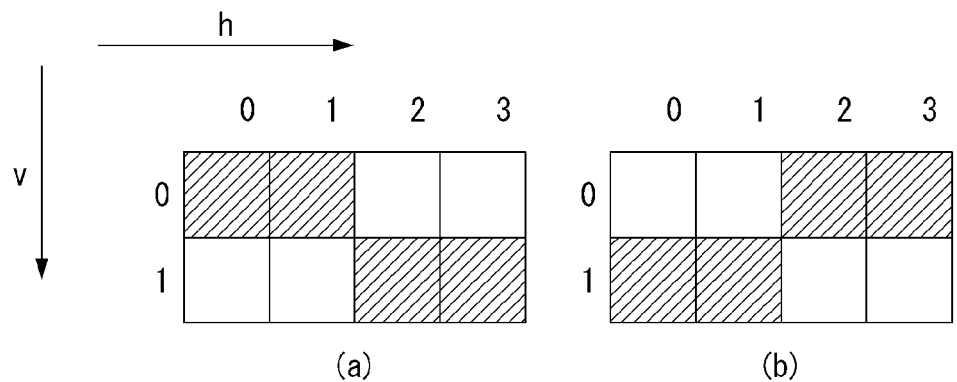
[FIG. 23]
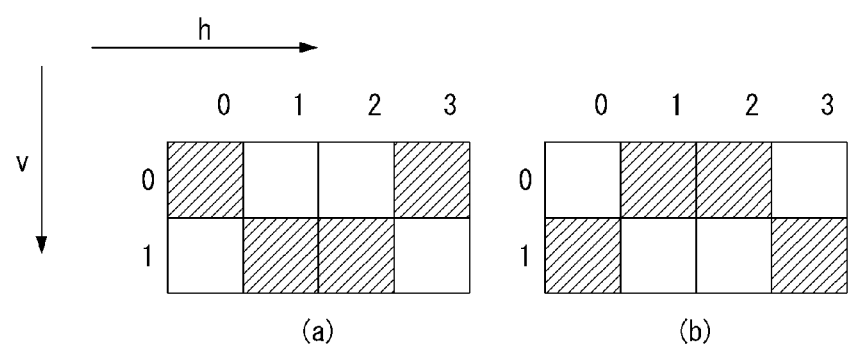
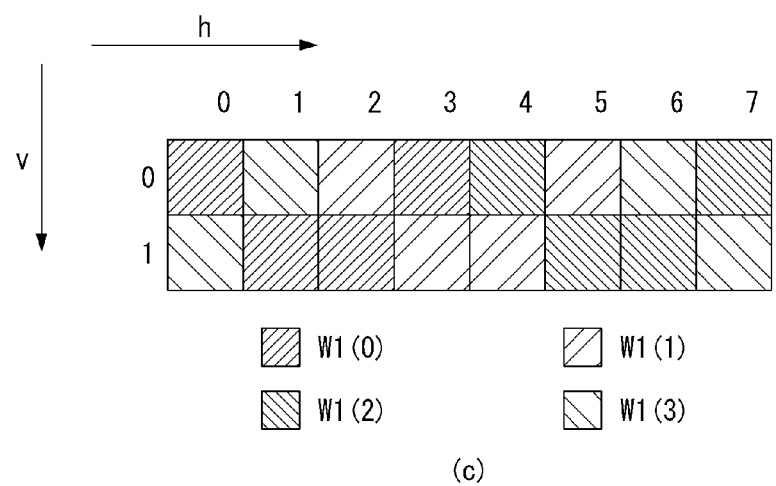

[FIG. 24]
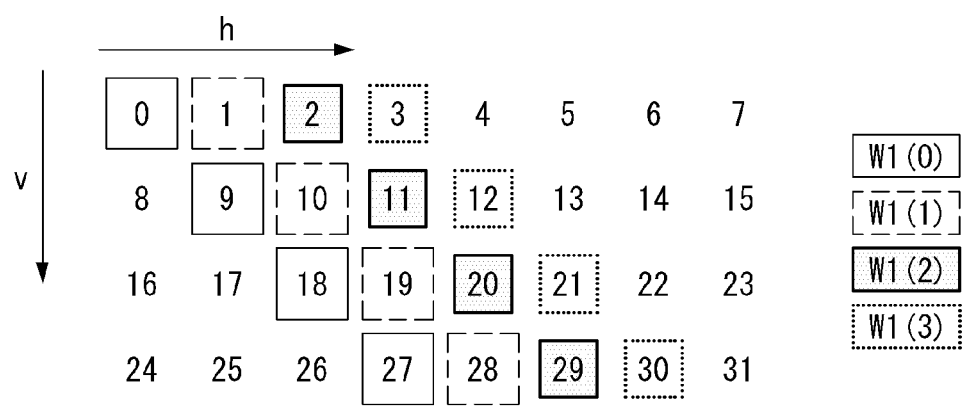

[FIG. 25]

[figure showing a grid of numbers 0-255 arranged in 8 rows of 32, with h axis horizontal and v axis vertical. Cells 0-7 grouped as W1(0), 8-15 as W1(1), with W1(2) and W1(3) labels below]

[FIG. 26]

[figure showing a grid of numbers 0-255 arranged in 8 rows of 32, with h axis horizontal and v axis vertical. Cells 0-3 and 32-35 grouped as W1(0), cells 4-7 and 36-39 as W1(1), with W1(2) and W1(3) labels below]

| W1(0) | W1(8) | W1(16) | W1(24) |

| W1(0) | W1(8) | W1(16) | W1(24) |

【FIG. 29】
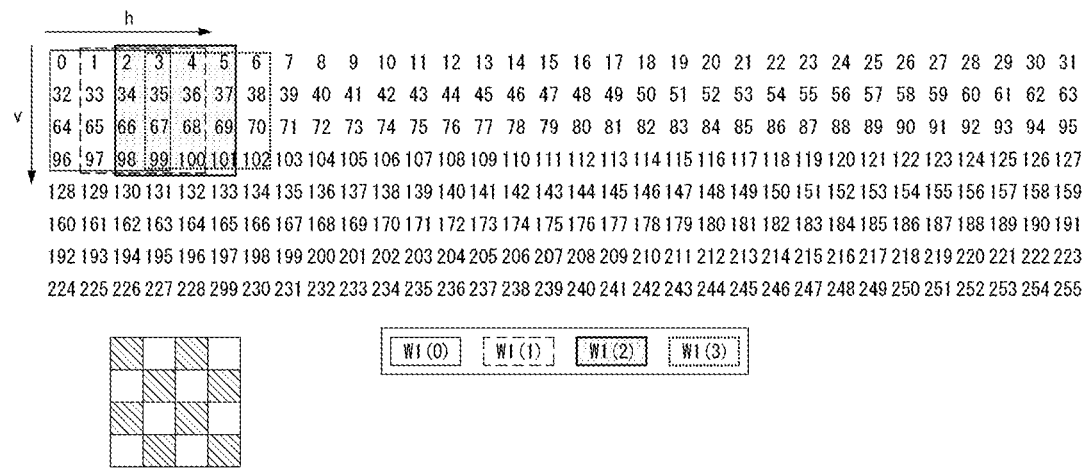
【FIG. 30】
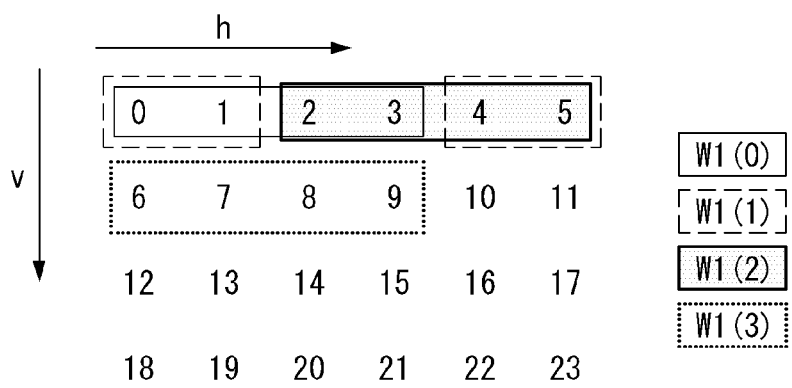

[FIG. 31]
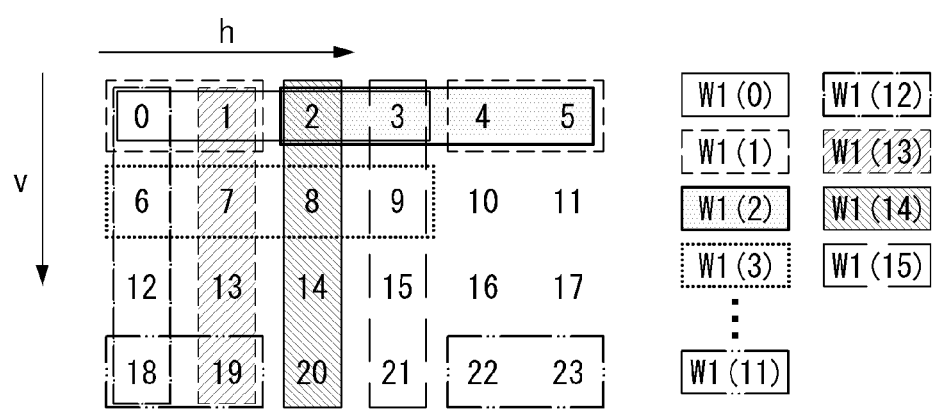

【FIG. 32】
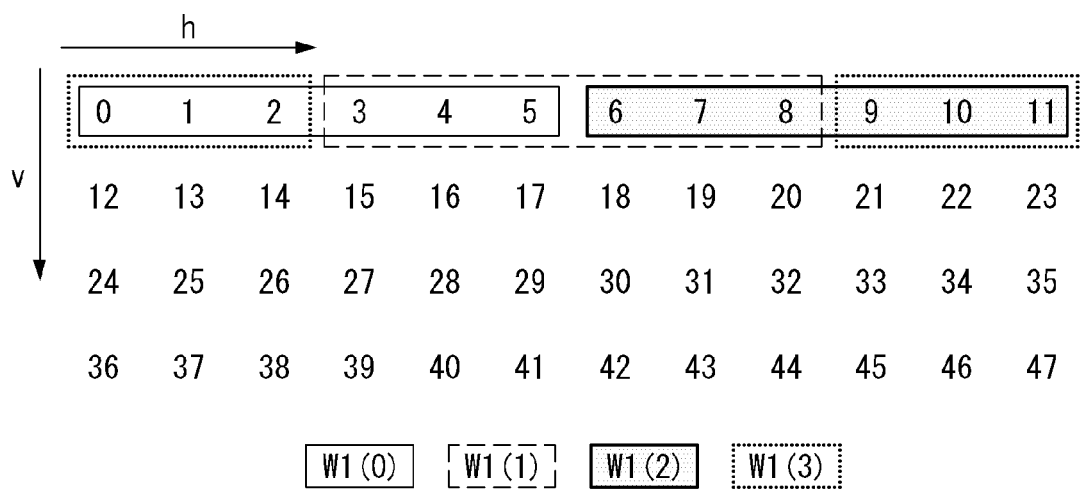
【FIG. 33】
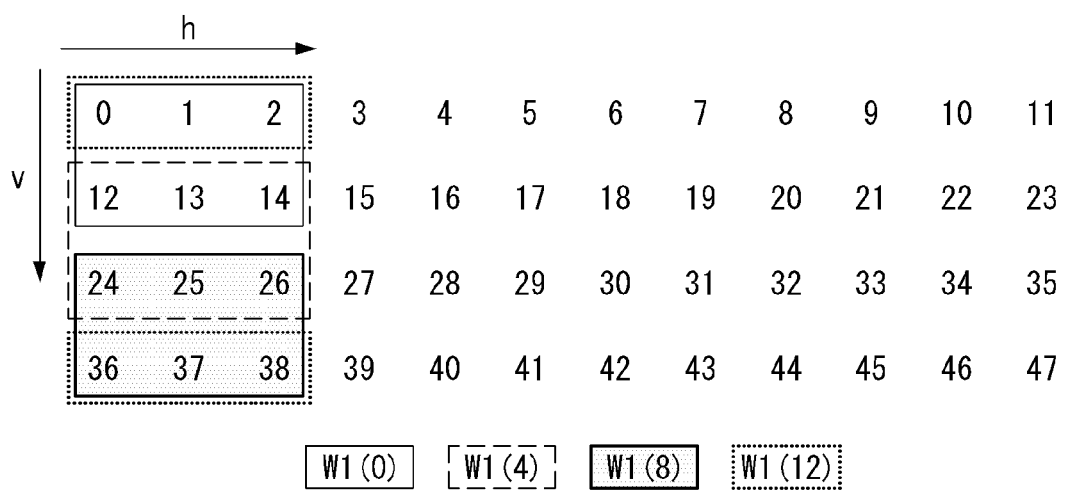

【FIG. 34】
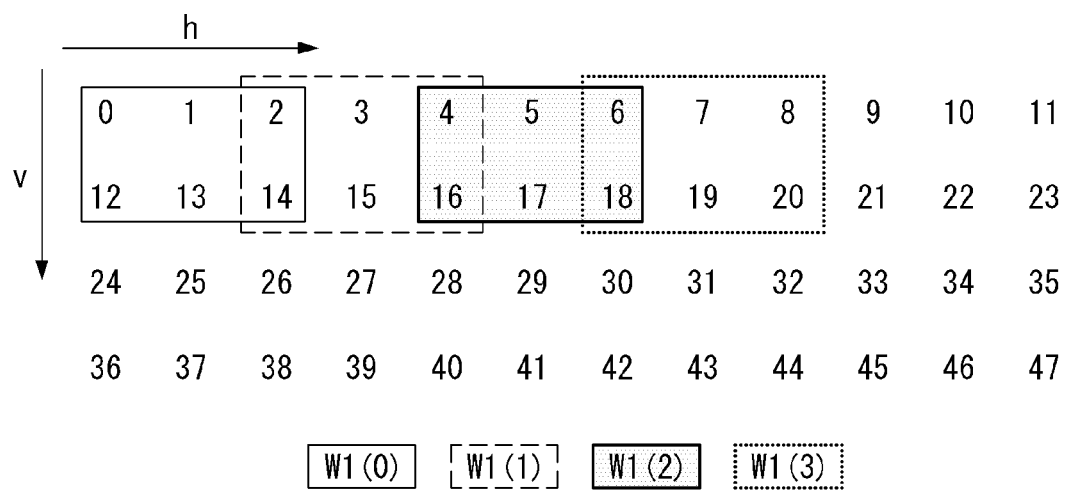
【FIG. 35】
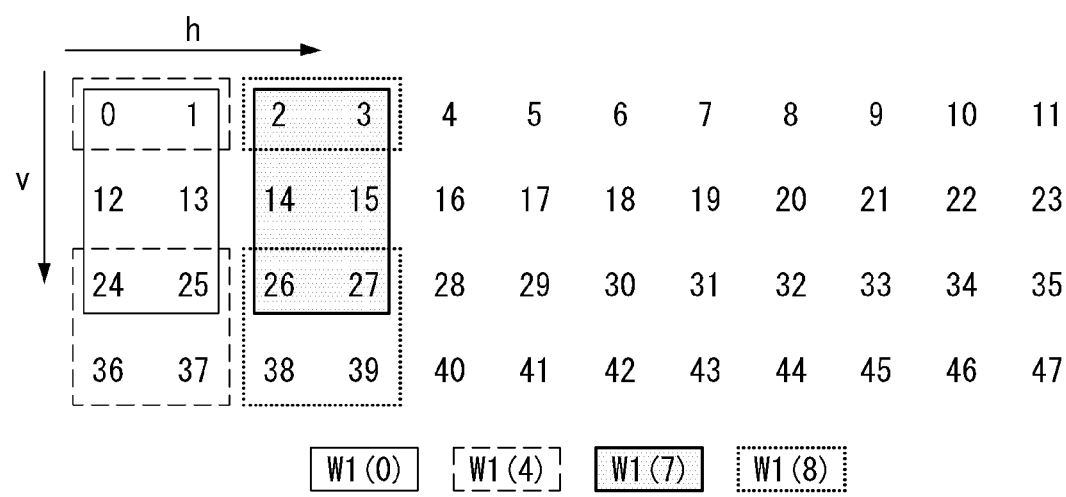

【FIG. 36】
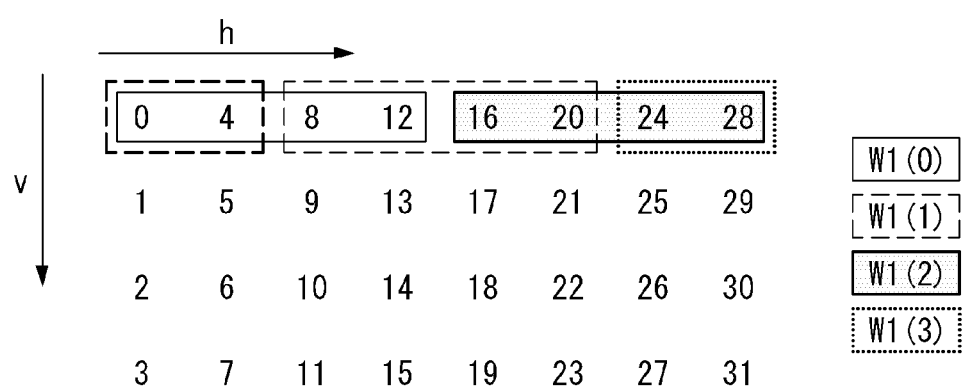

【FIG. 37】
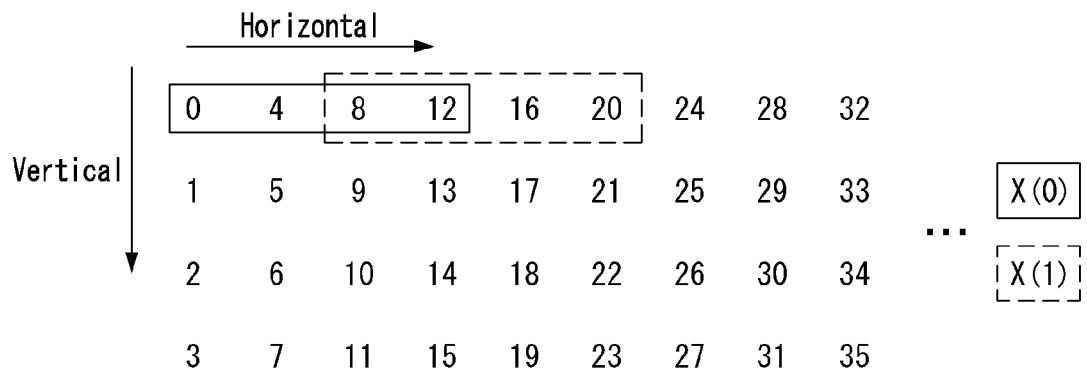
(a) Option 1: horizontal stripe
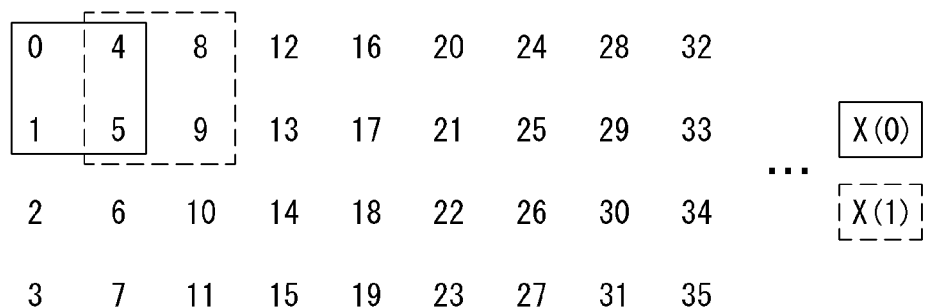
(b) Option 2: rectangle
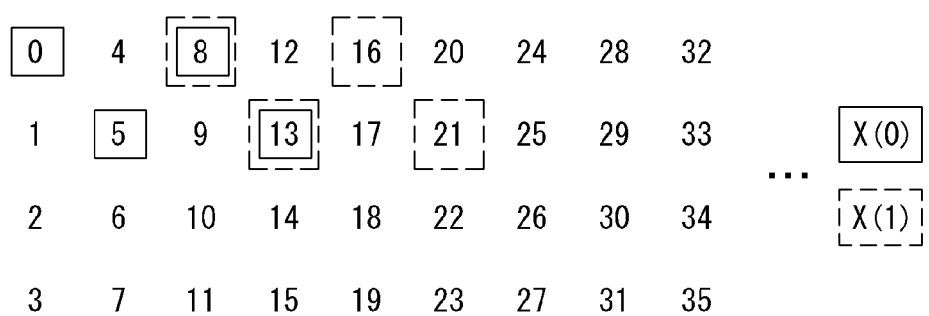
(c) Option 3: check pattern 【FIG. 38】
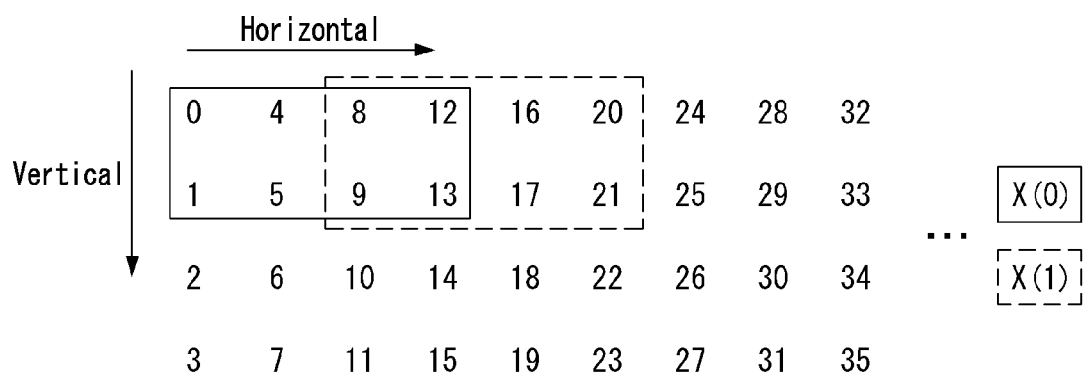
(a) Option 4: rectangle
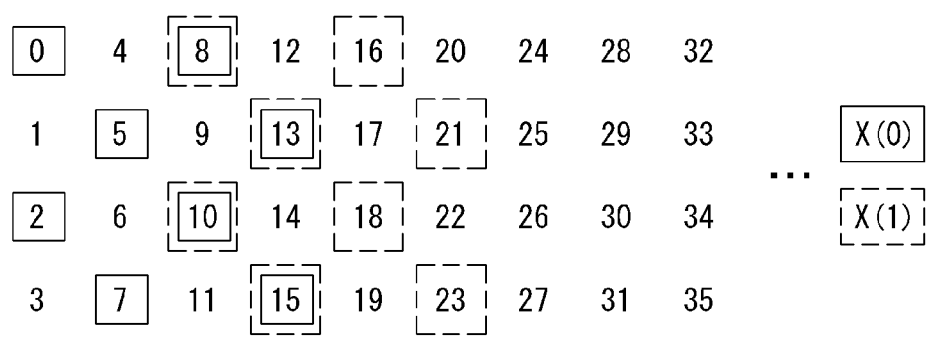
(b) Option 5: check pattern

[FIG. 39]
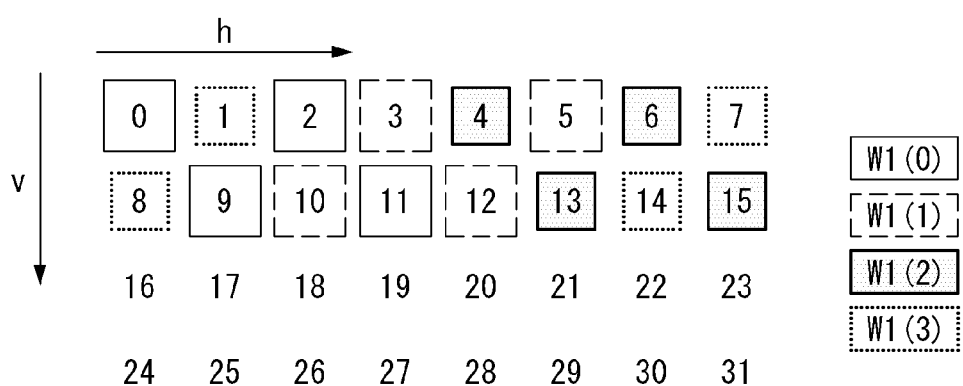

[FIG. 40]
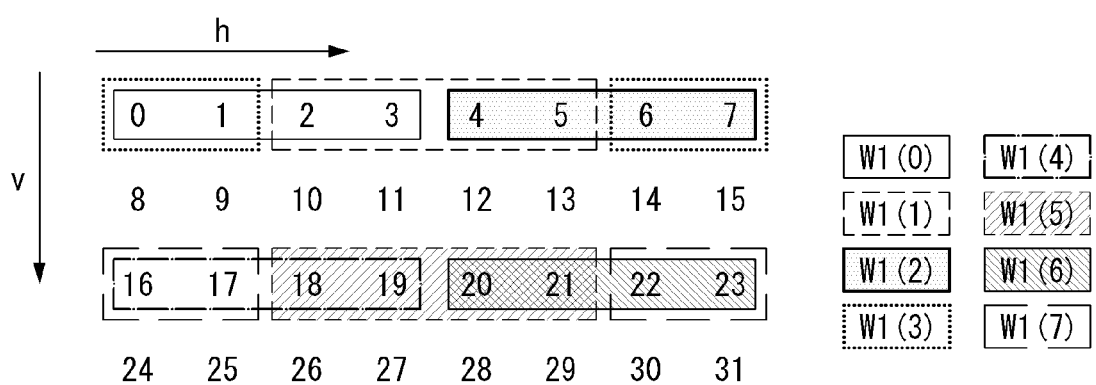

【FIG. 41】
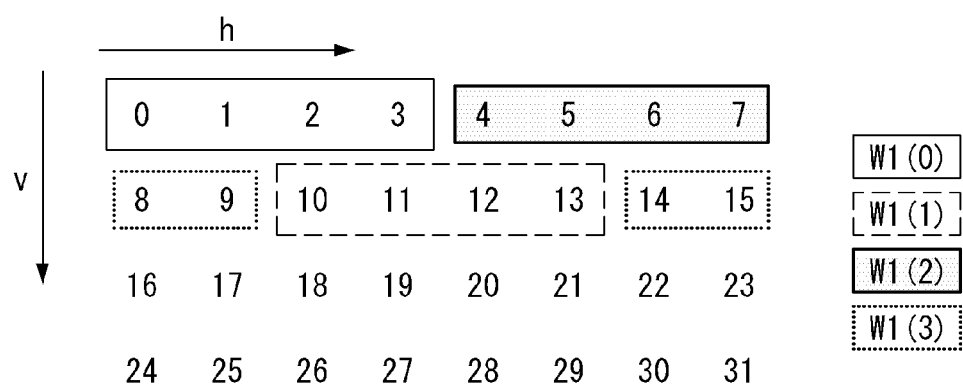
【FIG. 42】
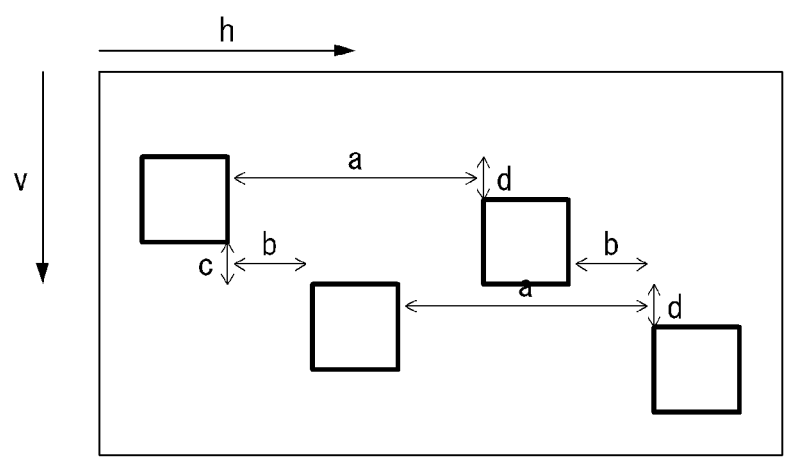

【FIG. 43】
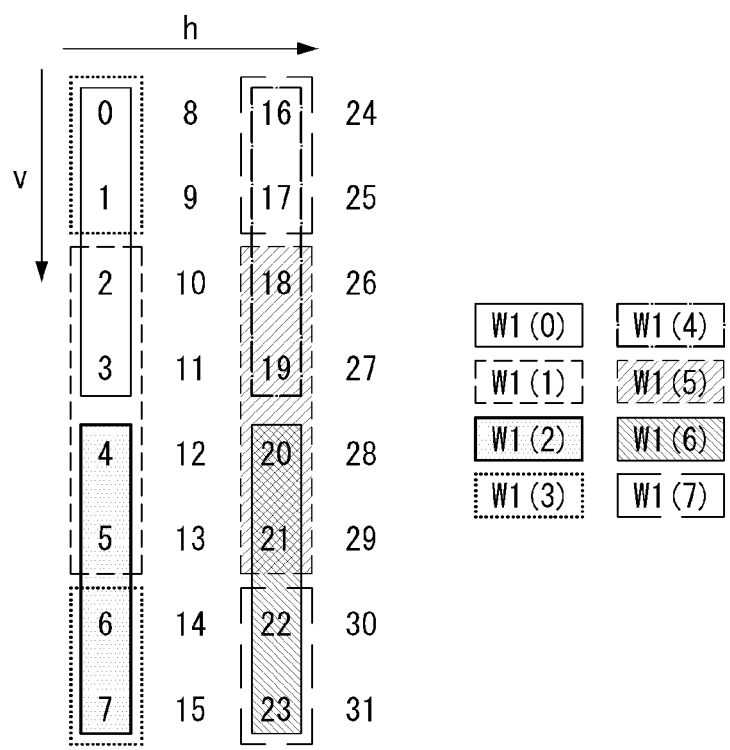

[FIG. 44]
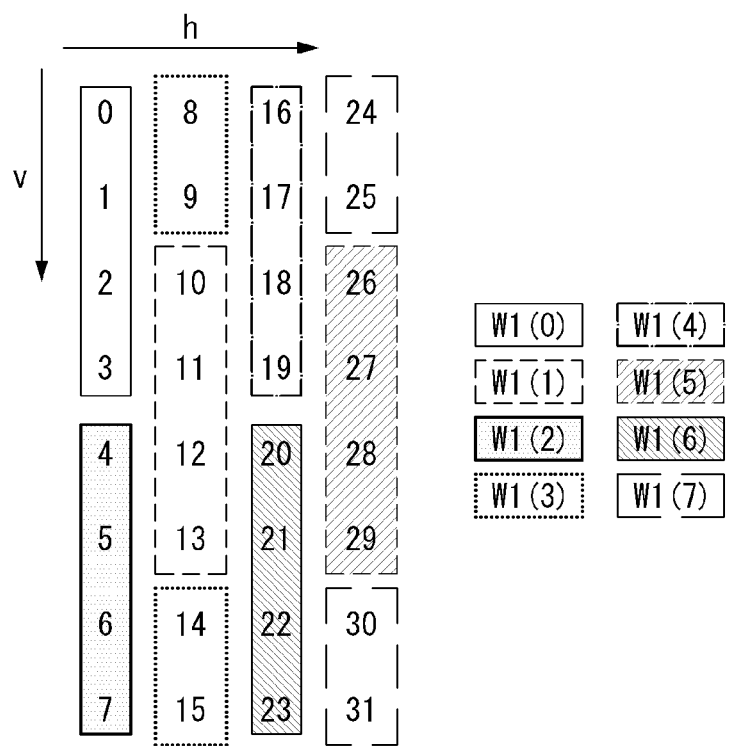

[FIG. 45]
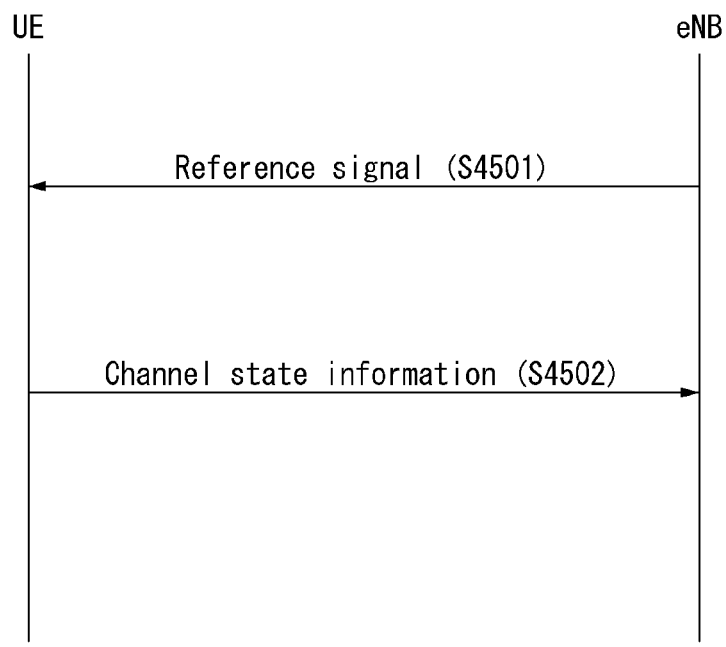
[FIG. 46]
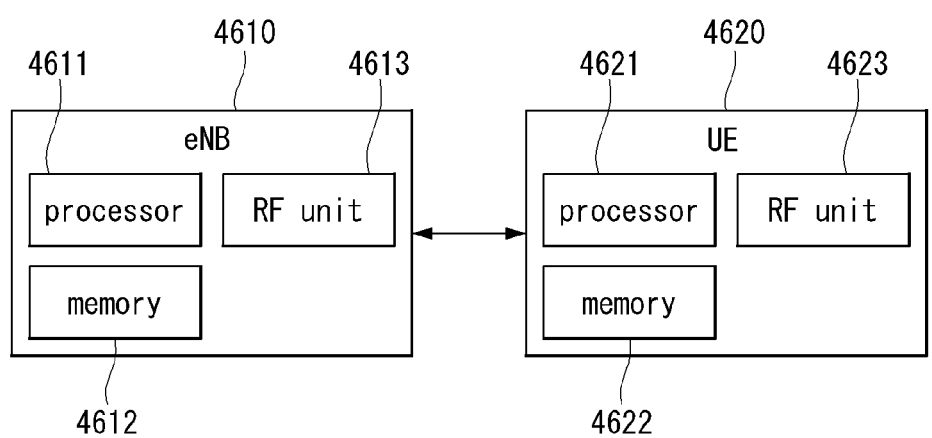

CODEBOOK-BASED SIGNAL TRANSMISSION/RECEPTION METHOD IN MULTI-ANTENNA WIRELESS COMMUNICATION SYSTEM, AND DEVICE FOR SAME

CROSS-REFERENCE TO RELATED APPLICATIONS

This application is the National Stage filing under 35 U.S.C. 371 of International Application No. PCT/KR2016/008100, filed on Jul. 25, 2016, which claims the benefit of U.S. Provisional Application No. 62/196,275, filed on Jul. 23, 2015, 62/232,466, filed on Sep. 25, 2015, 62/237,611, filed on Oct. 6, 2015, 62/239,292, filed on Oct. 9, 2015, and 62/254,668, filed on Nov. 12, 2015, the contents of which are all hereby incorporated by reference herein in their entirety.

TECHNICAL FIELD

The present invention relates to a wireless communication system and, more specifically, relates to a method of transmitting and receiving signals on the basis of a codebook in a 3-dimensional multi-input multi-output (3D MIMO) system in which a 2-dimensional active antenna system (2D AAS) is installed, and a device therefor.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to provide a method of configuring a codebook in a wireless communication system supporting 2D-AAS based 3D MIMO.

In addition, an object of the present invention is to provide a method of configuring a codebook using a discrete Fourier transform (DFT) matrix in a wireless communication system supporting 2D-AAS based 3D MIMO.

Furthermore, an object of the present invention is to provide a method of transmitting and receiving signals on the basis of a codebook in a wireless communication system supporting 2D-AAS based 3D MIMO.

Technological objects to be achieved by the present invention are not limited to the aforementioned objects, and other objects that have not been described may be clearly understood by a person having ordinary skill in the art to which the present invention pertains from the following description.

Technical Solution

In an aspect of the present invention, a method for transmitting and receiving a signal by a UE based on a codebook in a 2-dimensional multi-antenna wireless communication system includes: receiving a channel state information-reference signal (CSI-RS) from an eNB through multiple antenna ports; and reporting channel state information to the eNB, wherein the channel state information includes a precoding matrix indicator (PMI), the PMI includes a first PMI for selecting a precoding matrix set from the codebook and a second PMI for selecting a precoding matrix from the precoding matrix set, pairs of indexes of a first dimension and indexes of a second dimension of precoding matrices belonging to the precoding matrix set are $(x,y)$, $(x+2,y)$, $(x,y+1)$ and $(x+1,y+1)$, and x and y are integers which are not negative numbers.

In another aspect of the present invention, a method for transmitting and receiving a signal by an eNB on the basis of a codebook in a 2-dimensional multi-antenna wireless communication system includes: transmitting a CSI-RS to a UE through multiple antenna ports; and receiving channel state information from the UE, wherein the channel state information includes a precoding matrix indicator (PMI), the PMI includes a first PMI for selecting a precoding matrix set from the codebook and a second PMI for selecting a precoding matrix from the precoding matrix set, pairs of indexes of a first dimension and indexes of a second dimension of precoding matrices belonging to the precoding matrix set are $(x,y)$, $(x+2,y)$, $(x,y+1)$ and $(x+1,y+1)$, and x and y are integers which are not negative numbers.

Preferably, a spacing between precoding matrix sets adjacent in the direction of the first dimension may be 2.

Preferably, the codebook may be composed of a precoding matrix generated based on the Kronecker product of a first matrix for first dimension antenna ports and a second matrix for second dimension antenna ports, and the first matrix may be specified by a first dimension index of the precoding matrix and the second matrix is specified by a second dimension index of the precoding matrix.

Preferably, values of first dimension indexes and second dimension indexes of precoding matrices belonging to the precoding matrix set may be determined based on the first PMI.

Preferably, a factor for controlling phases between a first polarization antenna port and a second polarization antenna port may be determined as one of $$\left\{1, \exp\left(j\frac{\pi}{2}\right), \exp\left(j\frac{2\pi}{2}\right), \exp\left(j\frac{3\pi}{2}\right)\right\}$$

based on the second PMI in a cross-polarization antenna.

Preferably, a total number of precoding matrices constituting the codebook may be determined by the product of the number of antenna ports having the same polarization in the first dimension, the number of antenna ports having the same polarization in the second dimension, an oversampling factor used in the first dimension and an oversampling factor used in the second dimension.

Preferably, the first matrix may be composed of one or more columns selected from a DFT (Discrete Fourier Transform) matrix generated according to the equation below, $$D_{(mn)}^{N_h \times N_h Q_h} = \frac{1}{\sqrt{N_h}} e^{j\frac{2\pi(m-1)(n-1)}{N_h Q_h}},$$ [Equation]

$$m = 1, 2, \ldots, N_h, n = 1, 2, \ldots, N_h Q_h$$

wherein N_h is the number of antenna ports having the same polarization in the first dimension and Q_h is an oversampling factor used in the first dimension.

Preferably, the second matrix may be composed of one or more columns selected from a DFT (Discrete Fourier Transform) matrix generated according to the equation below, $$D_{(mn)}^{N_v \times N_v Q_v} = \frac{1}{\sqrt{N_v}} e^{j\frac{2\pi(m-1)(n-1)}{N_v Q_v}},$$ [Equation]

$$m = 1, 2, \ldots, N_v, n = 1, 2, \ldots, N_v Q_v$$

wherein N_v is the number of antenna ports having the same polarization in the second dimension and Q_v is an oversampling factor used in the second dimension.

Advantageous Effects

According to embodiments of the present invention, it is possible to smoothly perform transmission and reception of signals (or channels) between a transmitting end and a receiving end by defining a method of configuring a codebook in a wireless communication system supporting 2D-AAS based 3D MIMO.

In addition, according to embodiments of the present invention, it is possible to maximize a beamforming gain in a wireless communication system supporting 2D-AAS based 3D MIMO.

Effects which may be obtained by the present invention are not limited to the aforementioned effects, and other effects that have not been described may be clearly understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

FIG. 1 illustrates the structure of a radio frame in a wireless communication system to which the present invention may be applied.

FIG. 2 is a diagram illustrating a resource grid for a downlink slot in a wireless communication system to which the present invention may be applied.

FIG. 3 illustrates a structure of downlink subframe in a wireless communication system to which the present invention may be applied.

FIG. 4 illustrates a structure of uplink subframe in a wireless communication system to which the present invention may be applied.

FIG. 5 shows the configuration of a known MIMO communication system.

FIG. 6 is a diagram showing a channel from a plurality of transmission antennas to a single reception antenna.

FIG. 7 is a diagram for describing a basic concept of a codebook-based precoding in a wireless communication system to which the present invention may be applied.

FIG. 8 illustrates reference signal patterns mapped to downlink resource block pairs in a wireless communication system to which the present invention may be applied.

FIG. 9 is a diagram illustrating resources to which reference signals are mapped in a wireless communication system to which the present invention may be applied.

FIG. 10 illustrates a 2D-AAS having 64 antenna elements in a wireless communication system to which the present invention may be applied.

FIG. 11 illustrates a system in which an eNB or UE has a plurality of transmission/reception antennas capable of forming a 3-Dimension (3D) beam based on the AAS in a wireless communication system to which the present invention may be applied.

FIG. 12 illustrates a 2D antenna system having cross-polarizations in a wireless communication system to which the present invention may be applied.

FIG. 13 illustrates a transceiver unit model in a wireless communication system to which the present invention may be applied.

FIG. 14 illustrates a 2D AAS in a wireless communication system to which the present invention is applicable.

FIGS. 15 to 44 are diagrams for describing a method of configuring a codebook according to an embodiment of the present invention.

FIG. 45 is a diagram illustrating a method for transmitting and receiving a codebook-based signal according to an embodiment of the present invention.

FIG. 46 is a block diagram of a wireless communication device according to an embodiment of the present invention.

MODE FOR INVENTION

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$.

A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

12×7 resource elements. The number of RBs $N^{DL}$ included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-

TABLE 2

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \qquad [\text{Equation 1}]$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s=[s_1,s_2, \ldots s_{N_T}]^T \quad \text{[Equation 2]}$$

Meanwhile, transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s}=[\hat{s}_1,\hat{s}_2, \ldots ,\hat{s}_{N_T}]=[P_1 s_1, P_2 s_2, \ldots P_{N_T} s_{N_T}]^T \quad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector having controlled transmission power in the Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In this case, w_ij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y=[y_1,y_2, \ldots y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T=[h_{i1},h_{i2}, \ldots ,h_{iN_T}] \quad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

Meanwhile, Additive White Gaussian Noise (AWGN) is added to an actual channel after the actual channel experiences the channel matrix H. Accordingly, AWGN n_1, n_2, . . . , n_NR added to the N_R reception antennas, respectively, are represented using a vector as follows.

$$n=[n_1,n_2, \ldots n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_T} \end{bmatrix} =$$ [Equation 10]

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R)$$ [Equation 11]

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Hereinafter, in relation to the MIMO transport techniques described above, a codebook-based precoding technique will be described in detail.

FIG. 7 is a diagram for describing a basic concept of a codebook-based precoding in a wireless communication system to which the present invention may be applied.

According to the codebook-based precoding technique, a transmitting-end and a receiving end share codebook information that includes a predetermined number of precoding matrixes according to a transmission rank, the number of antennas, and so on.

That is, in the case that feedback information is finite, the precoding-based codebook technique may be used.

A receiving-end may measure a channel state through a receiving signal, and may feedback a finite number of preferred matrix information (i.e., index of the corresponding precoding matrix) based on the codebook information described above. For example, a receiving-end may measure a signal in Maximum Likelihood (ML) or Minimum Mean Square Error (MMSE) technique, and may select an optimal precoding matrix.

FIG. 7 shows that a receiving-end transmits the precoding matrix information for each codeword to a transmitting-end, but the present invention is not limited thereto.

The transmitting-end that receives the feedback information from the receiving-end may select a specific precoding matrix from the codebook based on the received information. The transmitting-end that selects the precoding matrix may perform precoding in a manner of multiplying layer signals, of which number amounts to a transmission rank, by the selected precoding matrix and may transmit the precoded transmission signal via a plurality of antennas. The number of rows in a precoding matrix is equal to the number of antennas, while the number of columns is equal to a rank value. Since the rank value is equal to the number of layers, the number of the columns is equal to the number of the layers. For instance, when the number of transmitting antennas and the number of layers are 4 and 2, respectively, a precoding matrix may include 4×2 matrix. Equation below represents an operation of mapping information mapped to each layer to a respective antenna through the precoding matrix in the case.

$$\begin{bmatrix} y_1 \\ y_2 \\ y_3 \\ y_4 \end{bmatrix} = \begin{bmatrix} p_{11} & y_1 \\ p_{12} & y_1 \\ p_{13} & y_1 \\ p_{14} & y_1 \end{bmatrix} \cdot \begin{bmatrix} x_1 \\ x_2 \end{bmatrix}$$ [Equation 12]

Referring to Equation 12, information mapped to a layer includes x_1 and x_2 and each element p_ij of 4×2 matrix is a weight used for precoding. y_1, y_2, y_3 and y_4 indicate information mapped to antennas and may be transmitted via corresponding antennas by OFDM transmission schemes, respectively.

The receiving-end that receives the signal precoded and transmitted in the transmitting-end may reconstruct the received signal by performing inverse processing of the precoding performed in the transmitting-end. Generally, since a precoding matrix satisfies such a unitary matrix (U) condition as 'U*U^H=I' (herein, U^H means an Hermit matrix of matrix U), the above-mentioned inverse processing of the precoding may be performed in a manner of multiplying the received signal by Hermit matrix PH of the precoding matrix P used for the precoding performed by the transmitting-end.

In addition, since the precoding is requested to have good performance for antenna configurations of various types, it may be necessary to consider performance for various antenna configurations in codebook design. In the following description, an exemplary configuration of multiple antennas is explained.

In the conventional 3GPP LTE system (e.g., system according to 3GPP LTE Release-8 or Release-9 Standard), since maximum four transmission antennas are supported in DL, a codebook for four transmission antennas is designed. In the 3GPP LTE-A system evolved from the conventional 3GPP LTE system, maximum eight transmission antennas may be supported in DL. Accordingly, it may be necessary to design a precoding codebook that provides good performance for a DL transmission via maximum eight transmission antennas.

Moreover, when a codebook is designed, generally required are constant modulus property, finite alphabet, restriction on a codebook size, nested property, and providing good performance for various antenna configurations.

The constant modulus property means a property that amplitude of each channel component of a precoding matrix configuring a codebook is constant. According to this property, no matter what kind of a precoding matrix is used, power levels transmitted from all antennas may be maintained equal to each other. Hence, it may be able to raise efficiency in using a power amplifier.

The finite alphabet means to configure precoding matrixes using quadrature phase shift keying (QPSK) alphabet (i.e., ±1, ±j) only except a scaling factor in the case of two transmitting antennas, for example. Accordingly, when multiplication is performed on a precoding matrix by a precoder, it may alleviate the complexity of calculation.

The codebook size may be restricted as a predetermined size or smaller. Since a size of a codebook increases, precoding matrixes for various cases may be included in the codebook, and accordingly, a channel status may be more accurately reflected. However, the number of bits of a precoding matrix indicator (PMI) correspondingly increases to cause signaling overhead.

The nested property means that a portion of a high rank precoding matrix is configured with a low rank precoding matrix. Thus, when the corresponding precoding matrix is configured, an appropriate performance may be guaranteed even in the case that a BS determines to perform a DL transmission of a transmission rank lower than a channel rank indicated by a rank indicator (RI) reported from a UE. In addition, according to this property, complexity of channel quality information (CQI) calculation may be reduced. This is because calculation for a precoding matrix selection may be shared in part when an operation of selecting a precoding matrix from precoding matrixes designed for different ranks is performed.

Providing good performance for various antenna configurations may mean that providing performance over a predetermined level is required for various cases including a low correlated antenna configuration, a high correlated antenna configuration, a cross-polarized antenna configuration and the like.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

FIG. 8 illustrates reference signal patterns mapped to downlink resource block pairs in a wireless communication system to which the present invention may be applied.

Referring to FIG. 8, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 8a) and has a length of 12 OFDM symbols in the case of an extended cyclic prefix (CP) (FIG. 8b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, if the number of transmission antennas of an eNB is two, CRSs for a No. 0 antenna port and a No. 1 antenna port are transmitted. If the number of transmission antennas of an eNB is four, CRSs for No. 0~No. 3 antenna ports are transmitted. If the number of transmission antennas of an eNB is four, a CRS pattern in one RB is shown in FIG. 8.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

A DRS is described in more detail below. The DRS is used to demodulate data. In multi-input multi-output antenna transmission, precoding weight used for a specific UE is combined with a transmission channel transmitted by each transmission antenna when the UE receives an RS, and is used to estimate a corresponding channel without any change.

A 3GPP LTE system (e.g., Release-8) supports a maximum of four transmission antennas, and a DRS for rank 1 beamforming is defined. The DRS for rank 1 beamforming also indicates an RS for an antenna port index 5.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

For data demodulation, a DM-RS is dedicatedly transmitted to a UE scheduled in a corresponding time-frequency domain. That is, a DM-RS for a specific UE is transmitted only in a region in which the corresponding UE has been scheduled, that is, in the time-frequency domain in which data is received.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

For data demodulation, a DM-RS is dedicatedly transmitted to a UE scheduled in a corresponding time-frequency domain. That is, a DM-RS for a specific UE is transmitted only in the region in which scheduling is performed for the corresponding UE, that is, only in the time-frequency domain in which data is received.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined for only a subcarrier spacing Δf=15 kHz.

In a subframe configured for CSI-RS transmission, a CSI-RS sequence is mapped to a complex-valued modulation symbol a_k,l^(p) used as a reference symbol on each antenna port p as in Equation 13.

$$a_{k,l}^{(p)} = w_{l''} \cdot r_{l,n_s}(m')$$ [Equation 13]

$$k = k' + 12m +
\begin{cases}
-0 & \text{for } p \in \{15,16\}, \text{normal cyclic prefix} \\
-6 & \text{for } p \in \{17,18\}, \text{normal cyclic prefix} \\
-1 & \text{for } p \in \{19,20\}, \text{normal cyclic prefix} \\
-7 & \text{for } p \in \{21,22\}, \text{normal cyclic prefix} \\
-0 & \text{for } p \in \{15,16\}, \text{extended cyclic prefix} \\
-3 & \text{for } p \in \{17,18\}, \text{extended cyclic prefix} \\
-6 & \text{for } p \in \{19,20\}, \text{extended cyclic prefix} \\
-9 & \text{for } p \in \{21,22\}, \text{extended cyclic prefix}
\end{cases}$$

$$l = l' +
\begin{cases}
l'' & \text{CSI reference signal configuration 0-19,} \\
 & \text{normal cyclic prefix} \\
2l'' & \text{CSI reference signal configuration 20-31,} \\
 & \text{normal cyclic prefix} \\
l'' & \text{CSI reference signal configuration 0-27,} \\
 & \text{normal cyclic prefix}
\end{cases}$$

$$w_{l'} = \begin{cases} 1 & p \in \{15,17,19,21\} \\ (-1)^{l''} & p \in \{16,18,20,22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 13, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod2 | (k', l') | $n_s$ mod2 | (k', l') | $n_s$ mod2 |
| Frame structure type 1 and 2 | 0 | (9,5) | 0 | (9,5) | 0 | (9,5) | 0 |
| | 1 | (11,2) | 1 | (11,2) | 1 | (11,2) | 1 |
| | 2 | (9,2) | 1 | (9,2) | 1 | (9,2) | 1 |
| | 3 | (7,2) | 1 | (7,2) | 1 | (7,2) | 1 |
| | 4 | (9,5) | 1 | (9,5) | 1 | (9,5) | 1 |
| | 5 | (8,5) | 0 | (8,5) | 0 | | |
| | 6 | (10,2) | 1 | (10,2) | 1 | | |
| | 7 | (8,2) | 1 | (8,2) | 1 | | |
| | 8 | (6,2) | 1 | (6,2) | 1 | | |
| | 9 | (8,5) | 1 | (8,5) | 1 | | |
| | 10 | (3,5) | 0 | | | | |
| | 11 | (2,5) | 0 | | | | |
| | 12 | (5,2) | 1 | | | | |
| | 13 | (4,2) | 1 | | | | |
| | 14 | (3,2) | 1 | | | | |
| | 15 | (2,2) | 1 | | | | |
| | 16 | (1,2) | 1 | | | | |
| | 17 | (0,2) | 1 | | | | |
| | 18 | (3,5) | 1 | | | | |
| | 19 | (2,5) | 1 | | | | |
| Frame structure type 2 only | 20 | (11,1) | 1 | (11,1) | 1 | (11,1) | 1 |
| | 21 | (9,1) | 1 | (9,1) | 1 | (9,1) | 1 |
| | 22 | (7,1) | 1 | (7,1) | 1 | (7,1) | 1 |
| | 23 | (10,1) | 1 | (10,1) | 1 | | |
| | 24 | (8,1) | 1 | (8,1) | 1 | | |
| | 25 | (6,1) | 1 | (6,1) | 1 | | |
| | 26 | (5,1) | 1 | | | | |
| | 27 | (4,1) | 1 | | | | |
| | 28 | (3,1) | 1 | | | | |
| | 29 | (2,1) | 1 | | | | |
| | 30 | (1,1) | 1 | | | | |
| | 31 | (0,1) | 1 | | | | |

Table 4 illustrates the mapping of (k',l') from a CSI-RS configuration in an extended CP.

TABLE 4

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod2 | (k', l') | $n_s$ mod2 | (k', l') | $n_s$ mod2 |
| Frame structure type 1 and 2 | 0 | (11,4) | 0 | (11,4) | 0 | (11,4) | 0 |
| | 1 | (9,4) | 0 | (9,4) | 0 | (9,4) | 0 |
| | 2 | (10,4) | 1 | (10,4) | 1 | (10,4) | 1 |
| | 3 | (9,4) | 1 | (9,4) | 1 | (9,4) | 1 |
| | 4 | (5,4) | 0 | (5,4) | 0 | | |
| | 5 | (3,4) | 0 | (3,4) | 0 | | |
| | 6 | (4,4) | 1 | (4,4) | 1 | | |
| | 7 | (3,4) | 1 | (3,4) | 1 | | |
| | 8 | (8,4) | 0 | | | | |
| | 9 | (6,4) | 0 | | | | |
| | 10 | (2,4) | 0 | | | | |
| | 11 | (0,4) | 0 | | | | |
| | 12 | (7,4) | 1 | | | | |
| | 13 | (6,4) | 1 | | | | |
| | 14 | (1,4) | 1 | | | | |
| | 15 | (0,4) | 1 | | | | |
| Frame structure type 2 only | 16 | (11,1) | 1 | (11,1) | 1 | (11,1) | 1 |
| | 17 | (10,1) | 1 | (10,1) | 1 | (10,1) | 1 |
| | 18 | (9,1) | 1 | (9,1) | 1 | (9,1) | 1 |
| | 19 | (5,1) | 1 | (5,1) | 1 | | |
| | 20 | (4,1) | 1 | (4,1) | 1 | | |
| | 21 | (3,1) | 1 | (3,1) | 1 | | |
| | 22 | (8,1) | 1 | | | | |
| | 23 | (7,1) | 1 | | | | |

TABLE 4-continued

| CSI reference signal configuration | Number of CSI reference signals configured | | | | | |
|---|---|---|---|---|---|---|
| | 1 or 2 | | 4 | | 8 | |
| | (k', l') | $n_s$ mod2 | (k', l') | $n_s$ mod2 | (k', l') | $n_s$ mod2 |
| 24 | (6,1) | 1 | | | | |
| 25 | (2,1) | 1 | | | | |
| 26 | (1,1) | 1 | | | | |
| 27 | (0,1) | 1 | | | | |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

FIG. 9 is a diagram illustrating resources to which reference signals are mapped in a wireless communication system to which the present invention may be applied.

FIG. 9(a) shows twenty types of CSI-RS configurations available for CSI-RS transmission by one or two CSI-RS antenna ports, FIG. 9(b) shows ten types of CSI-RS configurations available for four CSI-RS antenna ports, and FIG. 9(c) shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 9(a).

Likewise, when four antenna ports are configured for CSI-RS transmission with respect to a specific cell, a CSI-RS is transmitted on radio resources on a configured CSI-RS configuration of the ten types of CSI-RS configurations shown in FIG. 9(b). Furthermore, when eight antenna ports are configured for CSI-RS transmission with respect to a specific cell, a CSI-RS is transmitted on radio resources on a configured CSI-RS configuration of the five types of CSI-RS configurations shown in FIG. 9(c).

A CSI-RS for each antenna port is subjected to CDM for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1 −1] and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1 −1] multiplied in order to detect the CSI-RS for the antenna port 16.

Referring to FIG. 9(a) to 9(c), in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

A plurality of CSI-RS configurations may be used in one cell. 0 or one CSI-RS configuration may be used for a non-zero power (NZP) CSI-RS, and 0 or several CSI-RS configurations may be used for a zero power (ZP) CSI-RS.

For each bit set to 1 in a zeropower (ZP) CSI-RS ('ZeroPowerCSI-RS') that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T_CSI-RS and a subframe offset Δ_CSI-RS for CSI-RS transmission are shown in Table 5.

Table 5 illustrates CSI-RS subframe configurations.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}-5$ |

TABLE 5-continued

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 15-34 | 20 | $I_{CSI-RS}$-15 |
| 35-74 | 40 | $I_{CSI-RS}$-35 |
| 75-154 | 80 | $I_{CSI-RS}$-75 |

Referring to Table 5, the CSI-RS transmission period T_CSI-RS and the subframe offset Δ_CSI-RS are determined depending on the CSI-RS subframe configuration I_CSI-RS.

The CSI-RS subframe configuration of Table 5 may be configured as one of the aforementioned 'SubframeConfig' field and 'zeroTxPowerSubframeConfig' field. The CSI-RS subframe configuration may be separately configured with respect to an NZP CSI-RS and a ZP CSI-RS.

A subframe including a CSI-RS satisfies Equation 14.

$$(10n_f+\lfloor n_s/2 \rfloor - \Delta_{CSI-RS}) \bmod T_{CSI-RS} = 0 \quad \text{[Equation 14]}$$

In Equation 14, T_CSI-RS means a CSI-RS transmission period, Δ_CSI-RS means a subframe offset value, n_f means a system frame number, and n_s means a slot number.

In the case of a UE in which the transmission mode 9 has been configured with respect to a serving cell, one CSI-RS resource configuration may be configured for the UE. In the case of a UE in which the transmission mode 10 has been configured with respect to a serving cell, one or more CSI-RS resource configuration(s) may be configured for the UE.

In the current LTE standard, a CSI-RS configuration includes an antenna port number (antennaPortsCount), a subframe configuration (subframeConfig), and a resource configuration (resourceConfig). Accordingly, the a CSI-RS configuration provides notification that a CSI-RS is transmitted how many antenna port, provides notification of the period and offset of a subframe in which a CSI-RS will be transmitted, and provides notification that a CSI-RS is transmitted in which RE location (i.e., a frequency and OFDM symbol index) in a corresponding subframe.

Specifically, the following parameters for each CSI-RS (resource) configuration are configured through high layer signaling.

If the transmission mode 10 has been configured, a CSI-RS resource configuration identifier A CSI-RS port number (antennaPortsCount): a parameter (e.g., one CSI-RS port, two CSI-RS ports, four CSI-RS ports or eight CSI-RS ports) indicative of the number of antenna ports used for CSI-RS transmission A CSI-RS configuration (resourceConfig) (refer to Table 3 and Table 4): a parameter regarding a CSI-RS allocation resource location A CSI-RS subframe configuration (subframeConfig, that is, I_CSI-RS) (refer to Table 5): a parameter regarding the period and/or offset of a subframe in which a CSI-RS will be transmitted If the transmission mode 9 has been configured, transmission power P_C for CSI feedback: in relation to the assumption of a UE for reference PDSCH transmission power for feedback, when the UE derives CSI feedback and takes a value within a [−8, 15] dB range in a 1-dB step size, P_C is assumed to be the ratio of energy per resource element (EPRE) per PDSCH RE and a CSI-RS EPRE.

If the transmission mode 10 has been configured, transmission power P_C for CSI feedback with respect to each CSI process. If CSI subframe sets C_CSI,0 and C_CSI,1 are configured by a high layer with respect to a CSI process, P_C is configured for each CSI subframe set in the CSI process.

A pseudo-random sequence generator parameter n_ID

If the transmission mode 10 has been configured, a high layer parameter 'qcl-CRS-Info-r11' including a QCL scrambling identifier for a quasico-located (QCL) type B UE assumption (qcl-ScramblingIdentity-r11), a CRS port count (crs-PortsCount-r111), and an MBSFN subframe configuration list (mbsfn-SubframeConfigList-r11) parameter.

When a CSI feedback value derived by a UE has a value within the [−8, 15] dB range, P_C is assumed to be the ration of PDSCH EPRE to CSI-RS EPRE. In this case, the PDSCH EPRE corresponds to a symbol in which the ratio of PDSCH EPRE to CRS EPRE is p_A.

A CSI-RS and a PMCH are not configured in the same subframe of a serving cell at the same time.

In the frame structure type 2, if four CRS antenna ports have been configured, a CSI-RS configuration index belonging to the [20-31] set (refer to Table 3) in the case of a normal CP or a CSI-RS configuration index belonging to the [16-27] set (refer to Table 4) in the case of an extended CP is not configured in a UE.

A UE may assume that the CSI-RS antenna port of a CSI-RS resource configuration has a QCL relation with delay spread, Doppler spread, Doppler shift, an average gain and average delay.

A UE in which the transmission mode 10 and the QCL type B have been configured may assume that antenna ports 0-3 corresponding to a CSI-RS resource configuration and antenna ports 15-22 corresponding to a CSI-RS resource configuration have QCL relation with Doppler spread and Doppler shift.

In the case of a UE in which the transmission modes 1-9 have been configured, one ZP CSI-RS resource configuration may be configured in the UE with respect to a serving cell. In the case of a UE in which the transmission mode 10 has been configured, one or more ZP CSI-RS resource configurations may be configured in the UE with respect to a serving cell.

The following parameters for a ZP CSI-RS resource configuration may be configured through high layer signaling.

The ZP CSI-RS configuration list (zeroTxPowerResourceConfigList) (refer to Table 3 and Table 4): a parameter regarding a zero-power CSI-RS configuration The ZP CSI-RS subframe configuration (eroTxPowerSubframeConfig, that is, I_CSI-RS) (refer to Table 5): a parameter regarding the period and/or offset of a subframe in which a zero-power CSI-RS is transmitted A ZP CSI-RS and a PMCH are not configured in the same subframe of a serving cell at the same time.

In the case of a UE in which the transmission mode 10 has been configured, one or more channel state information-interference measurement (CSI-IM) resource configurations may be configured in the UE with respect to a serving cell.

The following parameters for each CSI-IM resource configuration may be configured through high layer signaling.

The ZP CSI-RS configuration (refer to Table 3 and Table 4)

The ZP CSI RS subframe configuration I_CSI-RS (refer to Table 5)

A CSI-IM resource configuration is the same as any one of configured ZP CSI-RS resource configurations.

A CSI-IM resource and a PMCH are not configured within the same subframe of a serving cell at the same time.

Massive MIMO

A MIMO system having a plurality of antennas may be called a massive MIMO system and has been in the spotlight as means for improving spectrum efficiency, energy efficiency and processing complexity.

In recent 3GPP, in order to satisfy the requirements of spectrum efficiency for a future mobile communication system, a discussion about the massive MIMO system has started. The massive MIMO is also called full-dimension MIMO (FD-MIMO).

In a wireless communication system after LTE Release (Rel)-12, the introduction of an active antenna system (AAS) is considered.

Unlike the existing passive antenna system in which an amplifier and antenna capable of adjusting the phase and size of a signal have been separated, the AAS means a system in which each antenna is configured to include an active element, such as an amplifier.

The AAS does not require a separate cable, connector and other hardware for connecting an amplifier and an antenna because the active antenna is used, and thus has a high efficiency characteristic in terms of energy and operating costs. In particular, the AAS enables an advanced MIMO technology, such as the formation of an accurate beam pattern or 3D beam pattern in which a beam direction and a beam width are considered because the AAS supports each electronic beam control method.

Due to the introduction of an advanced antenna system, such as the AAS, a massive MIMO structure having a plurality of input/output antennas and a multi-dimension antenna structure is also considered. For example, unlike in the existing straight type antenna array, if a two-dimensional (2D) antenna array is formed, a 3D beam pattern can be formed by the active antenna of the AAS.

FIG. 10 illustrates a 2D-AAS having 64 antenna elements in a wireless communication system to which the present invention may be applied.

FIG. 10 illustrates a common 2D antenna array. A case where N_t=N_v·N_h antennas has a square form as in FIG. 10 may be considered. In this case, N_h indicates the number of antenna columns in a horizontal direction, and N_v indicates the number of antenna rows in a vertical direction.

If the antenna array of such a 2D structure is used, radio waves can be controlled both in the vertical direction (elevation) and the horizontal direction (azimuth) so that a transmission beam can be controlled in the 3D space. A wavelength control mechanism of such a type may be called 3D beamforming.

FIG. 11 illustrates a system in which an eNB or UE has a plurality of transmission/reception antennas capable of forming a 3D beam based on the AAS in a wireless communication system to which the present invention may be applied.

FIG. 11 is a diagram of the aforementioned example and illustrates a 3D MIMO system using a 2D antenna array (i.e., 2D-AAS).

From the point of view of a transmission antenna, if a 3D beam pattern is used, a semi-static or dynamic beam can be formed in the vertical direction of the beam in addition to the horizontal direction. For example, an application, such as the formation of a sector in the vertical direction, may be considered.

Furthermore, from the point of view of a reception antenna, when a reception beam is formed using a massive reception antenna, a signal power rise effect according to an antenna array gain may be expected. Accordingly, in the case of the uplink, an eNB can receive a signal from a UE through a plurality of antennas. In this case, there is an advantage in that the UE can set its transmission power very low by considering the gain of the massive reception antenna in order to reduce an interference influence.

FIG. 12 illustrates a 2D antenna system having cross-polarizations in a wireless communication system to which the present invention may be applied.

A 2D planar antenna array model in which polarization is considered may be diagrammed as shown in FIG. 12.

Unlike the existing MIMO system according to a passive antenna, a system based on an active antenna can dynamically control the gain of an antenna element by applying weight to an active element (e.g., an amplifier) to which each antenna element has been attached (or included). The antenna system may be modeled in an antenna element level because a radiation pattern depends on the number of antenna elements and an antenna arrangement, such as antenna spacing.

An antenna array model, such as the example of FIG. 12, may be represented by (M, N, P). This corresponds to a parameter that characterizes an antenna array structure.

M indicates the number of antenna elements having the same polarization in each column (i.e., the vertical direction) (i.e., the number of antenna elements having a +45° slant in each column or the number of antenna elements having a −45° slant in each column).

N indicates the number of columns in the horizontal direction (i.e., the number of antenna elements in the horizontal direction).

P indicates the number of dimensions of polarization. P=2 in the case of cross-polarization as in the case of FIG. 12, or P=1 in the case of co-polarization.

An antenna port may be mapped to a physical antenna element. The antenna port may be defined by a reference signal related to a corresponding antenna port. For example, in the LTE system, the antenna port 0 may be related to a cell-specific reference signal (CRS), and the antenna port 6 may be related to a positioning reference signal (PRS).

For example, an antenna port and a physical antenna element may be mapped in a one-to-one manner. This may correspond to a case where a single cross-polarization antenna element is used for downlink MIMO or downlink transmit diversity. For example, the antenna port 0 is mapped to one physical antenna element, whereas the antenna port 1 may be mapped to the other physical antenna element. In this case, from the point of view of a UE, two types of downlink transmission are present. One is related to a reference signal for the antenna port 0, and the other is related to a reference signal for the antenna port 1.

For another example, a single antenna port may be mapped to multiple physical antenna elements. This may correspond to a case where a single antenna port is used for beamforming. In beamforming, multiple physical antenna elements are used, so downlink transmission may be directed toward a specific UE. In general, this may be achieved using an antenna array configured using multiple columns of multiple cross-polarization antenna elements. In this case, from the point of view of a UE, one type of downlink transmission generated from a single antenna port is present. One is related to a CRS for the antenna port 0, and the other is related to a CRS for the antenna port 1.

That is, an antenna port indicates downlink transmission from the point of view of a UE not actual downlink transmission from a physical antenna element by an eNB.

For another example, a plurality of antenna ports is used for downlink transmission, but each antenna port may be mapped to multiple physical antenna elements. This may correspond to a case where an antenna array is used for downlink MIMO or downlink diversity. For example, each of the antenna ports 0 and 1 may be mapped to multiple physical antenna elements. In this case, from the point of view of a UE, two types of downlink transmission. One is related to a reference signal for the antenna port 0, and the other is related to a reference signal for the antenna port 1.

In FD-MIMO, the MIMO precoding of a data stream may experience antenna port virtualization, transceiver unit (or a transmission and reception unit) (TXRU) virtualization, and an antenna element pattern.

In the antenna port virtualization, a stream on an antenna port is precoded on a TXRU. In the TXRU virtualization, a TXRU signal is precoded on an antenna element. In the antenna element pattern, a signal radiated by an antenna element may have a directional gain pattern.

In the existing transceiver modeling, a static one-to-one mapping between an antenna port and a TXRU is assumed, and a TXRU virtualization effect is joined into a static (TXRU) antenna pattern including the effects of the TXRU virtualization and the antenna element pattern.

The antenna port virtualization may be performed by a frequency-selective method. In LTE, an antenna port, together with a reference signal (or pilot), is defined. For example, for precoded data transmission on an antenna port, a DMRS is transmitted in the same bandwidth as a data signal, and both the DMRS and data are precoded by the same precoder (or the same TXRU virtualization precoding). For CSI measurement, a CSI-RS is transmitted through multiple antenna ports. In CSI-RS transmission, a precoder that characterizes mapping between a CSI-RS port and a TXRU may be designed in a unique matrix so that a UE can estimate a TXRU virtualization precoding matrix for a data precoding vector.

A TXRU virtualization method is discussed in 1D TXRU virtualization and 2D TXRU virtualization, which are described below with reference to the following drawing.

FIG. 13 illustrates a transceiver unit model in a wireless communication system to which the present invention may be applied.

In the 1D TXRU virtualization, M_TXRU TXRUs are related to M antenna elements configured in a single column antenna array having the same polarization.

In the 2D TXRU virtualization, a TXRU model configuration corresponding to the antenna array model configuration (M, N, P) of FIG. 12 may be represented by (M_TXRU, N, P). In this case, M_TXRU means the number of TXRUs present in the 2D same column and same polarization, and always satisfies M_TXRU≤M. That is, the total number of TXRUs is the same as M_TXRU×N×P.

A TXRU virtualization model may be divided into a TXRU virtualization model option-1: sub-array partition model as in FIG. 13(a) and a TXRU virtualization model option-2: full connection model as in FIG. 13(b) depending on a correlation between an antenna element and a TXRU.

Referring to FIG. 13(a), in the case of the sub-array partition model, an antenna element is partitioned into multiple antenna element groups, and each TXRU is connected to one of the groups.

Referring to FIG. 13(b), in the case of the full-connection model, the signals of multiple TXRUs are combined and transferred to a single antenna element (or the arrangement of antenna elements).

In FIG. 13, q is the transmission signal vectors of antenna elements having M co-polarizations within one column. W is a wideband TXRU virtualization vector, and W is a wideband TXRU virtualization matrix. X is the signal vectors of M_TXRU TXRUs.

In this case, mapping between an antenna port and TXRUs may be one-to-one or one-to-many.

In FIG. 13, mapping between a TXRU and an antenna element (TXRU-to-element mapping) shows one example, but the present invention is not limited thereto. From the point of view of hardware, the present invention may be identically applied to mapping between an TXRU and an antenna element which may be implemented in various forms.

Codebook Design Method for 3D MIMO System Operating Based on 2D AAS

As illustrated in FIGS. 10 to 12, the present invention proposes a method of configuring (designing) a codebook on the basis of DFT (discrete Fourier transform) for 2D AAS.

Inn LTE-A, a PMI (precoding matrix indicator) of an 8 Tx (transmitter) codebook is designed as a long term and/or wideband precoder W_1 and a short term and/or sub-band precoder W_2 in order to improve feedback channel accuracy.

An equation for configuring a final PMI from two pieces of channel information is represented by the product of W_1 and W_2 as expressed by Equation 15.

$$W = \text{norm}(W_1, W_2) \qquad \text{[Equation 15]}$$

In Equation 15, W is a precoder generated from W_1 and W_2 and is fed back to a base station from a UE. norm(A) represents a matrix in which a norm per column in a matrix A is normalized to 1.

In the 8Tx codebook defined in LTE, W_1 and W_2 have structures as represented by Equation 16.

$$W_1(i_1) = \begin{bmatrix} X_{i_1} & 0 \\ 0 & X_{i_1} \end{bmatrix}, \qquad \text{[Equation 16]}$$

W(i)=where $X_{i_1}$ is Nt/2 by M matrix.

$$W_2(i_2) = \begin{bmatrix} \overbrace{e_M^k \quad e_M^l \quad \cdots \quad e_M^m}^{r\ columns} \\ \alpha_{i_2} e_M^k \quad \beta_{i_2} e_M^l \quad \cdots \quad \gamma_{i_2} e_M^m \end{bmatrix}$$

(if rank=r), where 1≤k,l,m M and k, l, m are integer.

Here, i_1 and i_2 respectively indicate indexes of W_1 and W_2 and $e_M^k$ represents a selection vector having a length of M, in which the value of a k-th element is 1 and other values are 0.

The aforementioned codeword structure is designed in consideration of channel correlation characteristics generated when cross polarized antennas are used and an antenna spacing is narrow (e.g., a distance between adjacent antennas is less than half a signal wavelength). Cross polarized antennas can be divided into a horizontal antenna group and a vertical antenna group. Each antenna group has characteristics of a uniform linear array (ULA) antenna and the two antenna groups may be co-located. Accordingly, correlation between antennas of each group has the same linear phase increment characteristic and correlation between antenna groups has phase rotation characteristic.

Since a codebook corresponds to values obtained by quantizing channels, it is necessary to design the codebook by reflecting characteristics of a channel corresponding to a source therein.

When a rank-1 codeword generated in the above structure is exemplified for convenience of description, it can be confirmed that such channel characteristics have been reflected in a codeword that satisfies Equation 16.

$$W_1(i_1) * W_2(i_2) = \begin{bmatrix} X_{i_1}(k) \\ \alpha_{i_2} X_{i_1}(k) \end{bmatrix} \quad \text{[Equation 17]}$$

In Equation 17, the codeword is represented by N_t (the number of Tx antennas)×1 and structurized into an upper vector $X_{i_1}(k)$ and a lower vector $\alpha_{i_2} X_{i_1}(k)$ which respectively represent correlation characteristics of the horizontal antenna group and the vertical antenna group. It is advantageous to represent $X_{i_1}(k)$ as a vector having linear phase increment by reflecting inter-antenna correlation characteristic of each antenna group therein, and a DFT matrix can be used therefor as a typical example.

This codebook structure is applicable to systems using 2D AAS and is represented by Equation 18.

$$W = W_1 W_2 = (W_{1H} \otimes W_{1V})(W_{2H} \otimes W_{2V}) \quad \text{[Equation 18]}$$

Here, W_1 represents long-term properties of a channel and is fed back with respect to widebands, and W_2 represents short-term properties of a channel, is fed back with respect to subbands and performs selection and co-phasing (in the case of cross polarized antennas). The subscripts H and V represent horizontal and vertical directions and $\otimes$ denotes a Kronecker product.

W_1V is selected as a subset of a matrix D composed of columns in the matrix D of a DFT codebook, as represented by Equation 19. The DFT codebook can be generated as represented by Equation 19.

$$D_{(mn)}^{N_v \times N_v Q_v} = \frac{1}{\sqrt{N_v}} e^{j\frac{2\pi(m-1)(n-1)}{N_v Q_v}}, \quad \text{[Equation 19]}$$

$$\text{for } m = 1, 2, \ldots, N_v, n = 1, 2, \ldots, N_v Q_v$$

In Equation 19, $Q_v$ denotes an oversampling factor and $N_v$ represents the number of vertical antenna ports.

Here, an antenna element may correspond to an antenna port according to antenna virtualization. Hereinafter, an antenna element will be called an antenna port in the specification for convenience of description.

Similarly, W_1H is selected as a subset of the matrix D composed of columns in the matrix D as represented by Equation 20. A DFT codebook can be generated as represented by Equation 20.

$$D_{(mn)}^{N_h \times N_h Q_h} = \frac{1}{\sqrt{N_h}} e^{j\frac{2\pi(m-1)(n-1)}{N_h Q_h}} \text{ for } m = 1, \quad \text{[Equation 20]}$$

$$2, \ldots, N_h, n = 1, 2, \ldots, N_h Q_h$$

In Equation 20, $Q_k$ denotes an oversampling factor and $N_h$ is the number of horizontal antenna ports.

As described above, the precoding matrix W in a codebook can be represented as $W=W_1 W_2$. Here, W1 can be derived as $$W_1 = \begin{pmatrix} X_1 \otimes X_2 & 0 \\ 0 & X_1 \otimes X_2 \end{pmatrix}.$$

Here, $x_i$ is an N_1×L_1 matrix and can be composed of L_1 column vectors. The column vectors have a length of N_1 and can correspond to a DFT vector oversampled O_1 times, that is, $$v_l = \begin{bmatrix} 1 & \frac{j2\pi l}{e^{N_1 O_1}} & \cdots & e^{\frac{j2\pi(N_1-1)l}{N_1 O_1}} \end{bmatrix}^t.$$

In addition, X, is an N_2×L_2 matrix and can be composed of L_2 column vectors. Here, the column vectors have a length of N_2 and can correspond to a DFT vector oversampled O_2 times, that is, $$v_l = \begin{bmatrix} 1 & \frac{j2\pi l}{e^{N_2 O_2}} & \cdots & e^{\frac{j2\pi(N_2-1)l}{N_2 O_2}} \end{bmatrix}^t.$$

Here, N_1 represents the number of antenna ports for the same polarization in the first dimension (e.g., horizontal domain) and N_2 represents the number of antenna ports for the same polarization in the second dimension (e.g., vertical domain).

FIG. 14 illustrates a 2D AAS in a wireless communication system to which the present invention is applicable.

FIG. 14(a) illustrates an 8 transceiver unit (TXRU: transceiver unit) 2D AAS, FIG. 14(b) illustrates a 12 TXRU 2D AAS and FIG. 14(c) illustrates a 16 TXRU 2D AAS.

In FIG. 14, M is the number of antenna ports of a single column (i.e., the first dimension) which have the same polarization and N is the number of antenna ports of a single row (i.e., the second dimension) which have the same polarization. P indicates the number of dimensions of polarization. Q indicates the total number of TXRUs (antenna ports).

The codebook proposed in the present invention is applicable to the 2D AAS illustrated in FIG. 14. The present invention is not limited to the 2D AAS illustrated in FIG. 14 and may be extended and applied to antenna configurations other than the antenna configuration of FIG. 14.

First, a case of (M, N, P, Q)=(2, 2, 2, 8) will be described. In this case, two ±45° slant antennas (antennas "/" in FIG. 14) are located in the horizontal direction and the vertical direction, and $N_h=2, N_v=2$.

The numbers of columns (i.e., the numbers of precoding matrices) that form codebooks constituting W_1H and W_1V according to an oversampling factor $Q_h$ in the horizontal direction and an oversampling factor $Q_v$ in the vertical direction are $N_h Q_h$ and $N_h Q_v$, respectively. The codebook C_1 constituting W_1 is composed of Kroenecker product of codebooks corresponding to horizontal and vertical antenna ports, and thus the number of columns constituting the codebook C_1 is $N_h Q_h N_v Q_v$, and in the case of 8 TXRUs, $4 Q_h Q_v$.

In this manner, various types of codebooks can be configured according to oversampling factors and the number of bits of a PMI fed back from a reception terminal to a base station.

Hereinafter, the number of feedback bits corresponding to W_1 is defined as L_1 and the number of feedback bits corresponding to W_2 is defined as L_2.

In addition, the aforementioned parameters $N_h$, $Q_h$, $N_v$ and $Q_v$ may have different values depending on the number of antenna ports, as illustrated in FIG. 14, and signaled by a base station to a terminal through RRC signaling or values predefined between the base station and the terminal may be used as the parameters.

The present invention proposes a method of configuring/setting W_1 and W_2 in codebook design for a 2D AAS in which at least matrix W_1 has a dual structure.

In the following description of the present invention, the first dimension/domain is referred to as a horizontal dimension/domain and the second dimension/domain is referred to as a vertical dimension/domain in a 2D antenna array for convenience of description. However, the present invention is not limited thereto.

Furthermore, in description of the present invention, the same variables used in equations can be indicated by the same signs and construed as the same meaning unless specially described.

In addition, in description of the present invention, a beam can be construed as a precoding matrix for generating the beam and a beam group can be construed as a set of precoding matrices (or a set of precoding vectors). Further, selection of a beam (or a beam pair) can be construed as selection of a precoding matrix (or vector) capable of generating the beam.

1.8 TXRU

A method of configuring a codebook for an 8 TXRU 2D AAS as shown in FIG. 14(a) will be described. It is assumed that $Q_h=4$, $Q^v=2$, $L_1=4, L_2=4$.

In this case, the number of columns constituting a codebook C1 is ($=N_hQ_hN_vQ_v=2*4*2*2$). Each column is composed of 4 Tx DFT vectors.

A reception UE can report (i.e., feed back), to a base station (BS), a W_1 index suitable therefor in terms of long-term/wideband among the columns using a reference signal (e.g., CSI-RS) transmitted from the BS.

Here, a method of configuring W_1 corresponding to each index may be correlated with L_2 which is the number of feedback bits of W_2 matrix in charge of selection and co-phasing. The number of bits corresponding to selection is defined as L_2S and the number of bits corresponding to co-phasing is defined as L_2C for convenience. Here, the relationship of L_2=L_2S+L_2C is established.

For example, in the case of L_2S=2, W_1 corresponding to each index can be composed of $2^2=4$ columns. In this case, a method of configuring W_1 and W_2 is as follows.

First, an inner precoder $W_1$ can be selected from the first codebook $C_1$.

In an embodiment of the present invention, W_1 can be configured as represented by Equation 21.

Here, i_1 indicates an index of W_1 (i.e., a set of precoding matrices) (i.e., a first PMI for specifying W_1) and i_2 is an index corresponding to selection of W_2 (i.e., a second PMI for specifying a precoding matrix selected from the set of precoding matrices).

As described above, the number of columns constituting the codebook C1 is $N_hQ_hN_vQ_v$ (32 in the case of Equation 21), and each column corresponds to a precoding matrix (or precoding vector) W_m and can be identified by the index m.

Further, precoding matrices constituting the codebook C1 can be represented in a 2-dimensional form (refer to FIG. 15). In this case, each precoding matrix W_m can be specified by the index h in the first dimension (i.e., horizontal dimension) and the index v in the second dimension (i.e., vertical dimension). That is, the index m can be one-to-one mapped to an index pair such as (h,v).

In addition, a first matrix (or a first vector) (e.g., a matrix (or a vector) having horizontal elements) v_h for first dimension antenna ports can be specified by the index h of the first dimension and a second matrix (or a second vector) (e.g., a matrix (or a vector) having vertical elements) v_v for second dimension antenna ports can be specified by the index v of the second dimension. In addition, w_m has a DFT matrix form and can be generated as the Kronecker product of v_h and v_v.

A precoding matrix set composed of one or more precoding matrices (e.g., 4 precoding matrices) may be determined by i_1 in the entire codebook, and one precoding matrix may be determined by i_2 in the determined precoding matrix set. In other words, the precoding matrix index m or precoding index pair values (h, v) of one or more precoding matrices belonging to the precoding matrix set may be determined by i_1. In addition, one precoding matrix index m or precoding index pair value (h, v) may be determined by i_2 in the determined percoding matrix set.

The above equation 21 can be represented as the diagram of FIG. 15.

FIG. 15 is a diagram for describing a method of configuring a codebook according to an embodiment of the present invention.

In FIG. 15, numerals 0 to 31 indicate indexes of columns (i.e., precoding matrices w_m) constituting the entire codebook C_1. That is, the numerals indicate indexes m of all precoding matrices. m can have a value in the range of 0 to N_h*Q_h*N_v*Q_v.

Furthermore, in FIG. 15, the columns (i.e., precoding matrices w_m) constituting the entire codebook C_1 are arranged in a 2-dimensional form. h and v indicate an index of a horizontal component of each column (i.e., precoding matrix w_m) constituting the entire codebook C_1 (i.e., an index of a horizontal component of a DFT vector constituting w_m) and an index of a vertical component of each column (i.e., an index of a vertical component of the DFT vector constituting w_m). That is, h may have a value in the range of 0 to N_h*Q_h (0 to 7 in FIG. 15) and v may have a value in the range of 0 to N_v*Q_v (0 to 3 in FIG. 15).

$$C_1 = \left\{ \begin{bmatrix} \tilde{W}_1 & 0 \\ 0 & \tilde{W}_1 \end{bmatrix} \middle| \tilde{W}_1 = \underbrace{\begin{bmatrix} W_{(2i_1+0)\bmod 8+8\lfloor\frac{i_1}{4}\rfloor} & W_{(2i_1+1)\bmod 8+8\lfloor\frac{i_1}{4}\rfloor} & W_{(2i_1+2)\bmod 8+8\lfloor\frac{i_1}{4}\rfloor} & W_{(2i_1+3)\bmod 8+8\lfloor\frac{i_1}{4}\rfloor} \end{bmatrix}}_{4\ columns} \right\} \quad \text{[Equation 21]}$$

$$\text{where } w_m = v_h \otimes v_v,\ v_h = \begin{bmatrix} 1 \\ e^{j\frac{2\pi h}{8}} \end{bmatrix},\ v_v = \begin{bmatrix} 1 \\ e^{j\frac{2\pi v}{4}} \end{bmatrix},\ h = m \bmod 8,\ v = \left\lfloor \frac{m}{8} \right\rfloor,$$

$$m \in \left\{ (2i_1 + i_2)\bmod 8 + 8\left\lfloor \frac{i_1}{4} \right\rfloor \right\},\ i_1 = 0, 1, \ldots, 15,\ i_2 = 0, 1, 2, 3,$$

Furthermore, each box shown in FIG. 15 represents W_1(i_1) (i.e., W_1(0), W_1(1), W_1(2) and W_1(3)). That is, the box of W_1(i_1) can be determined by i_1. Referring to FIG. 15, W_1(0) can be composed of a precoding matrix with m=0, 1, 2 and 3. When this is represented as pairs of indexes in the horizontal dimension and indexes in the vertical dimension, a precoding matrix with (h,v)=(0,0), (1,0), (2,0) and (3,0) can be configured. W_1(1) can be composed of a precoding matrix with m=2, 3, 4 and 5 (i.e., precoding matrix with (h,v)=(2,0), (3,0), (4,0) and (5,0)). W_1 (2) can be composed of a precoding matrix with m=4, 5, and 7 (i.e., precoding matrix with (h,v)=(4,0), (5,0), (6,0) and (7,0)). W_1(3) can be composed of a precoding matrix with m=6, 7, 0 and 1 (i.e., precoding matrix with (h,v)=(6,7), (7,0), (0,0) and (1,0)). W_1(4) and W_1(15) can be configured in the same manner.

In this manner, W_1 is composed of subsets of 4 horizontal components for a fixed (identical) vertical component and 2 horizontal components may overlap in consecutive (adjacent) W_1s. That is, 2 precoding matrices overlap between W_s which are consecutive (adjacent) in the horizontal dimension direction. In other words, the spacing between precoding matrix sets which are consecutive (adjacent) in the horizontal dimension direction can be 2. For example, precoding matrices w_m constituting W_1s having indexes of 0 to 3 can be composed of the same vertical component matrix DC E $$v_v = \begin{bmatrix} 1 \\ e^{j\frac{2\pi 0}{4}} \end{bmatrix}.$$

When the method of configuring W_1 as illustrated in FIG. 15 is generalized, pairs of indexes in the first dimension and indexes in the second dimension of a precoding matrix constituting W_1 may correspond to (x,y), (x+1,y), (x+2,y) and (x+3,y). Here, x and y are integers that are not negative numbers.

The aforementioned index pairs may be represented as (h,v), (h+1,v), (h+2,v) and (h+3,v) in the horizontal dimension and the vertical dimension. In the same manner, indexes x and y may be replaced by h and v the horizontal dimension and the vertical dimension in other codebook configuration methods described in the specification.

x may have a value depending on the spacing between precoding matrix sets which are consecutive (adjacent) in the horizontal dimension direction. For example, when the spacing is 2 in the first dimension (e.g., horizontal dimension) direction as shown in FIG. 15, x may have a value corresponding to a multiple of 2. When the spacing is 1 in the first dimension (e.g., horizontal dimension) direction, x may have a value corresponding to a multiple of 1. In the same manner, y may have a value depending on the spacing between precoding matrix sets which are consecutive (adjacent) in the vertical dimension direction.

In the following description of the present invention, description of the same parts as those in Equation 21 and FIG. 15 is omitted and different parts are described.

As another embodiment, W_1 may be configured as represented by Equation 22.

$$C_1 = \left\{ \begin{bmatrix} \tilde{W}_1 & 0 \\ 0 & \tilde{W}_1 \end{bmatrix} \middle| \tilde{W}_1 = \underbrace{\begin{bmatrix} W_{(i_1)\bmod 8 + 16\lfloor\frac{i_1}{8}\rfloor} & W_{(i_1+1)\bmod 8 + 16\lfloor\frac{i_1}{8}\rfloor} & W_{(i_1)\bmod 8 + 16\lfloor\frac{i_1}{8}\rfloor} & W_{(i_1+1)\bmod 8 + 16\lfloor\frac{i_1}{8}\rfloor + 8} \end{bmatrix}}_{4\,columns} \right\} \quad \text{[Equation 22]}$$

$$\text{where } w_m = v_h \otimes v_v,\ v_h = \begin{bmatrix} 1 \\ e^{j\frac{2\pi h}{8}} \end{bmatrix},\ v_v = \begin{bmatrix} 1 \\ e^{j\frac{2\pi v}{4}} \end{bmatrix},\ h = m \bmod 8,\ v = \lfloor\frac{m}{8}\rfloor,$$

$$m \in \left\{(i_1 + i_2 \bmod 2) \bmod 8 + 16\lfloor\frac{i_1}{8}\rfloor + 8\lfloor\frac{i_2}{2}\rfloor\right\},\ i_1 = 0, 1, \ldots, 15,\ i_2 = 0, 1, 2, 3.$$

Equation 22 is represented as the diagram of FIG. 16.

FIG. 16 is a diagram for describing a method of configuring a codebook according to an embodiment of the present invention.

Referring to FIG. 16, each W_1 has 2 vertical components and 2 horizontal components and one horizontal component overlap between consecutive W_1s. That is, 2 precoding matrices overlap between W_1s consecutive (neighboring) in the horizontal dimension direction. That is, the spacing between precoding matrix sets consecutive (neighboring) in the horizontal dimension direction can correspond to 1.

For example, when W_1 has an index in the range of 0 to 7, w_m included in W_1 can be composed of vertical component matrices $$v_v = \begin{bmatrix} 1 \\ e^{j\frac{2\pi 0}{4}} \end{bmatrix},\ v_v = \begin{bmatrix} 1 \\ e^{j\frac{2\pi 1}{4}} \end{bmatrix}.$$

When W_1 has an index in the range of 8 to 15, w_m included in W_1 can be composed of vertical component matrices $$v_v = \begin{bmatrix} 1 \\ e^{j\frac{2\pi 2}{4}} \end{bmatrix},\ v_v = \begin{bmatrix} 1 \\ e^{j\frac{2\pi 3}{4}} \end{bmatrix}.$$

When the method of configuring W_1 shown in FIG. 16 is generalized, pairs of indexes in the first dimension and indexes in the second dimension of precoding matrices constituting W_1 can correspond to (x,y), (x+1,y), (x,y+1) and (x+1,y+1). Here, x and y are integers that are not negative numbers.

x may have a value depending on the spacing between precoding matrix sets consecutive (neighboring) in the horizontal dimension direction. For example, when the spacing is 2 in the first dimension (e.g., horizontal dimension) direction, x may have a value corresponding to a multiple of 2. On the other hand, when the spacing is 1 in the horizontal dimension direction as shown in FIG. 16, x may have a value corresponding to a multiple of 1. In the same manner, y may have a value depending on the spacing between precoding matrix sets consecutive (neighboring) in the vertical dimension direction.

As another embodiment, W_1 may be configured as represented by Equation 23.

$$C_1 = \left\{ \begin{bmatrix} \tilde{W}_1 & 0 \\ 0 & \tilde{W}_1 \end{bmatrix} \middle| \tilde{W}_1 = \begin{bmatrix} \underbrace{W_{(i_1)\bmod 8+8\lfloor \frac{i_1}{8} \rfloor} \; W_{(i_1+1)\bmod 8+8\lfloor \frac{i_1}{8} \rfloor} \; W_{(i_1)\bmod 8+8\lfloor \frac{i_1}{8} \rfloor+8\mu} \; W_{(i_1+1)\bmod 8+8\lfloor \frac{i_1}{8} \rfloor+8\mu}}_{4\,columns} \end{bmatrix} \right\} \quad [\text{Equation 23}]$$

where $w_m = v_h \otimes v_v$, $v_h = \begin{bmatrix} 1 \\ e^{j\frac{2\pi h}{8}} \end{bmatrix}$, $v_v = \begin{bmatrix} 1 \\ e^{j\frac{2\pi v}{4}} \end{bmatrix}$, $h = m \bmod 8$, $v = \lfloor \frac{m}{8} \rfloor$, $$m \in \left\{ (i_1 + i_2 \bmod 2)\bmod 8 + 8\lfloor \tfrac{i_1}{8} \rfloor + 8\mu \lfloor \tfrac{i_2}{2} \rfloor \right\}, \; i_1 = 0, 1, \ldots, 15, \; i_2 = 0, 1, 2, 3.$$

Equation 23 is represented as the diagram of FIG. 17.

FIG. 17 is a diagram for describing a method of configuring a codebook according to an embodiment of the present invention.

Referring to FIG. 17, the length of the vertical domain can be set to μ during beam grouping. FIG. 17 illustrates a case in which μ=2.

When the method of configuring W_1 shown in FIG. 17 is generalized, pairs of indexes in the first dimension and indexes in the second dimension of precoding matrices constituting W_1 can correspond to (x,y), (x+1,y), (x,y+μ) and (x+1,y+μ). Here, x and y are integers that are not negative numbers.

In addition, 2 precoding matrices overlap between W_1s consecutive (neighboring) in the horizontal dimension direction. That is, the spacing between precoding matrix sets consecutive (neighboring) in the horizontal dimension direction can correspond to 1.

As another embodiment, W_1 may be configured as represented by Equation 24.

For example, when the index of W_1 is {0,4,8,12}, w_m included in W_1 can be composed of horizontal component matrices $$v_h = \begin{bmatrix} 1 \\ e^{j\frac{2\pi 0}{8}} \end{bmatrix}, \; v_h = \begin{bmatrix} 1 \\ e^{j\frac{2\pi 1}{8}} \end{bmatrix}$$

When the index of W_1 is {1,5,9,13}, w_m included in W_1 can be composed of horizontal component matrices $$v_h = \begin{bmatrix} 1 \\ e^{j\frac{2\pi 2}{8}} \end{bmatrix}, \; v_h = \begin{bmatrix} 1 \\ e^{j\frac{2\pi 3}{8}} \end{bmatrix}.$$

When the method of configuring W_1 shown in FIG. 18 is generalized, pairs of indexes in the first dimension and $$C_1 = \left\{ \begin{bmatrix} \tilde{W}_1 & 0 \\ 0 & \tilde{W}_1 \end{bmatrix} \middle| \tilde{W}_1 = \begin{bmatrix} \underbrace{W_{(2i_1)\bmod 32} \; W_{(2i_1+1)\bmod 32} \; W_{(2i_1+8)\bmod 32} \; W_{(2i_1+9)\bmod 32}}_{4\,columns} \end{bmatrix} \right\} \quad [\text{Equation 24}]$$

where $w_m = v_h \otimes v_v$, $v_h = \begin{bmatrix} 1 \\ e^{j\frac{2\pi h}{8}} \end{bmatrix}$, $v_v = \begin{bmatrix} 1 \\ e^{j\frac{2\pi v}{4}} \end{bmatrix}$, $h = m \bmod 8$, $v = \lfloor \frac{m}{8} \rfloor$, $$m \in \left\{ \left(2i_1 + i_2 \bmod 2 + 8\lfloor \tfrac{i_2}{2} \rfloor\right) \bmod 32 \right\}, \; i_1 = 0, 1, \ldots, 15, \; i_2 = 0, 1, 2, 3.$$

Here, i_1 indicates an index of W_1 and i_2 is an index corresponding to selection of W_2.

Equation 24 is represented as the diagram of FIG. 18.

FIG. 18 is a diagram for describing a method of configuring a codebook according to an embodiment of the present invention.

Referring to FIG. 18, each W_1 has 2 vertical components and 2 horizontal components, and one vertical component overlaps between consecutive W_1s. That is, 2 precoding matrices overlap between W_1s consecutive (neighboring) in the vertical dimension direction. That is, the spacing between precoding matrix sets consecutive (neighboring) in the vertical dimension direction can correspond to 1.

indexes in the second dimension of precoding matrices constituting W_1 correspond to (x,y), (x+1,y), (x+1,y) and (x+1,y+1). Here, x and y are integers that are not negative numbers.

In addition, 2 precoding matrices overlap between W_1s consecutive (neighboring) in the vertical dimension direction. That is, the spacing between precoding matrix sets consecutive (neighboring) in the vertical dimension direction can correspond to 1.

As another embodiment, W_1 may be configured as represented by Equation 25.

$$C_1 = \left\{ \begin{bmatrix} \tilde{W}_1 & 0 \\ 0 & \tilde{W}_1 \end{bmatrix} \middle| \tilde{W}_1 = \begin{bmatrix} \underbrace{W_{(i_1)\bmod 8+16\lfloor \frac{i_1}{8} \rfloor} \; W_{(i_1+2)\bmod 8+16\lfloor \frac{i_1}{8} \rfloor} \; W_{(i_1+1)\bmod 8+16\lfloor \frac{i_1}{8} \rfloor+8} \; W_{(i_1+3)\bmod 8+16\lfloor \frac{i_1}{8} \rfloor+8}}_{4\,columns} \end{bmatrix} \right\} \quad [\text{Equation 25}]$$

where $W_m = V_h \otimes V_v$, $V_h = \begin{bmatrix} 1 \\ e^{j\frac{2\pi h}{8}} \end{bmatrix}$, $V_v = \begin{bmatrix} 1 \\ e^{j\frac{2\pi v}{4}} \end{bmatrix}$, $h = m \bmod 8$, $v = \lfloor \frac{m}{8} \rfloor$, $$m \in \left\{ \left(i_1 + 2 \cdot (i_2 \bmod 2) + \lfloor \frac{i_2}{2} \rfloor \right) \bmod 8 + 16 \lfloor \frac{i_1}{8} \rfloor + 8 \lfloor \frac{i_2}{2} \rfloor \right\}, i_1 = 0, 1, \ldots, 15, i_2 = 0, 1, 2, 3.$$

Equation 25 is represented as the diagrams of FIGS. 19 and 20.

FIG. 19 is a diagram for describing a method of configuring a codebook according to an embodiment of the present invention.

Referring to FIG. 19, W_1 may be configured in a zigzag pattern (or check pattern). That is, W_1(0) can be composed of {w_0, w_2, w_9, w_11}.

When the method of configuring W_1 shown in FIG. 19 is generalized, pairs of indexes in the first dimension and indexes in the second dimension of precoding matrices constituting W_1 correspond to (x,y), (x+2,y), (x+1,y+1) and (x+3,y+1). Here, x and y are integers that are not negative numbers.

In addition, 2 precoding matrices overlap between W_1s consecutive (neighboring) in the horizontal dimension direction. That is, the spacing between precoding matrix sets consecutive (neighboring) in the horizontal dimension direction can correspond to 2.

In the example of FIG. 19, the pattern of W_1 corresponds to a case in which beam groups of W_1 are {w_0, w_2, w_9, w_11}.

Further, W_1 may be configured as a complementary set of the zigzag pattern (or check pattern).

FIG. 20 is a diagram for describing a method of configuring a codebook according to an embodiment of the present invention.

FIG. 20 illustrates a case in which the zigzag pattern (check pattern) as shown in FIG. 19 corresponds to a complementary set of {w_1, w_3, w_8, w_10} in a 2×4 rectangular beam group composed of {w_0, w_1, w_2, w_3, w_8, w_9, w_10, w_11}.

When the method of configuring W_1 shown in FIG. 20 is generalized, pairs of indexes in the first dimension and indexes in the second dimension of precoding matrices constituting W_1 correspond to (x+1,y), (x,y+1), (x+2,y+1) and (x+3,y). Here, x and y are integers that are not negative numbers.

FIG. 20 illustrates a case in which the spacing between W_1 beam groups (i.e., precoding matrix sets) is 2, and it is obvious that the above-described embodiments with respect to the zigzag patterns (or check patterns) are easily applicable to the zigzag pattern (or check pattern) which will be described below.

Cases in which the spacing between indexes of horizontally adjacent precoding matrix sets is 1 or 2 in the aforementioned zigzag patterns (or check patterns) have been described above. This can be generalized and represented by the following equation 26.

[Equation 26]
$$C_1 = \left\{ \begin{bmatrix} \tilde{W}_1 & 0 \\ 0 & \tilde{W}_1 \end{bmatrix} \middle| \tilde{W}_1 = \underbrace{\left[ W_{(i_1)\bmod 8 + 16\lfloor \frac{i_1}{8} \rfloor \bmod 32} \, W_{(i_1+a)\bmod 8 + 16\lfloor \frac{i_1}{8} \rfloor \bmod 32} \, W_{(i_1+b)\bmod 8 + 16\lfloor \frac{i_1}{8} \rfloor + 8c \bmod 32} \, W_{(i_1+a+(+b))\bmod 8 + 16\lfloor \frac{i_1}{8} \rfloor + 8c \bmod 32} \right]}_{4 \text{ columns}} \right\}$$

where $W_m = V_h \otimes V_v$, $V_h = \begin{bmatrix} 1 \\ e^{j\frac{2\pi h}{8}} \end{bmatrix}$, $V_v = \begin{bmatrix} 1 \\ e^{j\frac{2\pi v}{4}} \end{bmatrix}$, $h = m \bmod 8$, $v = \lfloor \frac{m}{8} \rfloor$, $$m \in \left\{ \left(i_i + a \cdot (i_2 \bmod 2) + b \lfloor \frac{i_2}{2} \rfloor \right) \bmod 8 + 16 \lfloor \frac{i_1}{8} \rfloor + 8c \lfloor \frac{i_2}{2} \rfloor \bmod 32 \right\}, i_1 = 0, 1, \ldots, 15, i_2 = 0, 1, 2, 3.$$

Equation 26 is represented as the diagram of FIG. 21.

FIG. 21 is a diagram for describing a method of configuring a codebook according to an embodiment of the present invention.

Referring to FIG. 21, column indexes are spaced by values a and b in the horizontal direction and spaced by a value c in the vertical direction in w_m constituting W_1.

When the method of configuring W_1 shown in FIG. 21 is generalized, pairs of indexes in the first dimension and indexes in the second dimension of precoding matrices constituting W_1 correspond to (x,y), (x+a,y), (x+b,y+c) and (x+a+b,y+c). Here, x and y are integers that are not negative numbers.

In the above-described zigzag pattern configuration method, $B_h$ W_s are present in the horizontal direction and $B_v/2$ W_1 groups are present in the vertical direction. Similarly, a pattern in which $B_h/2$ W_1s are arranged in the horizontal direction and $B_v$ 4 W_1 groups are arranged can be generated and is represented by Equation 27.

[Equation 27]
$$C_1 = \left\{ \begin{bmatrix} \tilde{W}_1 & 0 \\ 0 & \tilde{W}_1 \end{bmatrix} \middle| \tilde{W}_1 = \underbrace{\left[ W_{(i_1)\bmod 8 + 16\lfloor \frac{i_1}{8} \rfloor \bmod 32} \, W_{(i_1+a)\bmod 8 + 16\lfloor \frac{i_1}{8} \rfloor \bmod 32} \, W_{(i_1+b)\bmod 8 + 16\lfloor \frac{i_1}{8} \rfloor + 8c \bmod 32} \, W_{(i_1+a+(+b))\bmod 8 + 16\lfloor \frac{i_1}{8} \rfloor + 8c \bmod 32} \right]}_{4 \text{ columns}} \right\}$$

where $W_m = V_h \otimes V_v$, $V_h = \begin{bmatrix} 1 \\ e^{j\frac{2\pi h}{8}} \end{bmatrix}$, $V_v = \begin{bmatrix} 1 \\ e^{j\frac{2\pi v}{4}} \end{bmatrix}$, $h = m \bmod 8$, $v = \lfloor \frac{m}{8} \rfloor$, -continued $$m \in \left\{\left(\left(2i_i + a\cdot(i_2\text{mod}2) + b\left\lfloor\frac{i_2}{2}\right\rfloor\right)\text{mod}8 + 8\left\lfloor\frac{i_1}{4}\right\rfloor + 8c\left\lfloor\frac{i_2}{2}\right\rfloor\right)\text{mod}32\right\}, i_1 = 0, 1, \ldots, 15, i_2 = 0, 1, 2, 3.$$

Equation 26 normalizes the zigzag pattern (or check pattern). In FIG. 26, the aforementioned square pattern (refer to FIG. 18) can be derived by adjusting the 3 parameters a, b and c. That is, when a is set to −1, b is set to 0 and c is set to 0 in Equation 26, a square pattern (refer to FIG. 18) can be derived. Alternatively, a block-shaped pattern as shown in FIG. 22 may be derived.

FIG. 22 is a diagram for describing a method of configuring a codebook according to an embodiment of the present invention.

Referring to FIG. 22, when a is set to 0, b is set to 2 and c is set to 0 in Equation 26, a pattern as shown in FIG. 22(a) can be configured. In the case of patterns of FIG. 22, all regions of a grid of beam (GoB) can be covered without overlap between beam groups when a beam group spacing is set to 2.

When the method of configuring W_1 shown in FIG. 22(a) is generalized, pairs of indexes in the first dimension and indexes in the second dimension of precoding matrices constituting W_1 correspond to (x,y), (x+1,y), (x+2,y+1) and (x+3,y+1). Here, x and y are integers that are not negative numbers.

FIG. 22(b) illustrates complementary sets of FIG. 22(a) in a 2×4 beam group. Pairs of indexes in the first dimension and indexes in the second dimension of precoding matrices constituting W_1, as shown in FIG. 22(b), correspond to (x,y+1), (x+1,y+1), (x+2,y) and (x+3,y). Here, x and y are integers that are not negative numbers.

In addition, as patterns having the aforementioned characteristics, "V" patterns as shown in FIG. 23 can also be considered.

FIG. 23 is a diagram for describing a method of configuring a codebook according to an embodiment of the present invention.

When the 3 parameters a, b and c are adjusted in Equation 26, a "V" pattern can be derived as shown in FIG. 23(a). When the method of configuring W_1 as shown in FIG. 23(a) is generalized, pairs of indexes in the first dimension and indexes in the second dimension of precoding matrices constituting W_1 correspond to (x,y), (x+1,y+1), (x+2,y+1) and (x+3,y). Here, x and y are integers that are not negative numbers.

FIG. 23(b) illustrates complementary sets of FIG. 23(a) in a 2×4 beam group.

When the method of configuring W_1 as shown in FIG. 23(b) is generalized, pairs of indexes in the first dimension and indexes in the second dimension of precoding matrices constituting W_1 correspond to (x,y+1), (x+1,y), (x+2,y) and (x+3,y+1). Here, x and y are integers that are not negative numbers.

FIG. 23(c) illustrates an embodiment of a V pattern. In this case, 8 beams are present in the horizontal direction and the spacing between beam groups is 2 in the horizontal direction.

In the case of the above-described patterns of FIGS. 22 and 23, the entire GoB can be covered, but when codebook subsampling of selecting even-numbered or odd-numbered W_1 is considered, GoB is covered less uniformly than the zigzag patterns (or check patterns) illustrated in FIG. 19 and FIG. 20 when subsampling is permitted and thus performance deterioration may occur.

Embodiments in which W_1 is composed of 4 columns have been described. Methods of configuring W_2 when these embodiments will be described.

In the case of transmission rank of 1, an outer precoder $W_2$ can be selected from the second codebook $C_2^{(1)}$.

In the case of rank 1, W_1 is configured as described above and one of precoding matrices (or vectors) included in W_1 can be selected.

In an embodiment of the present invention, W_2 may be configured as represented by Equation 28.

$$C_2^{(1)} = \left\{\frac{1}{\sqrt{2}}\begin{bmatrix} Y \\ \varphi Y \end{bmatrix}\right\}, \quad \text{[Equation 28]}$$

$$Y \in \{e_1, e_2, e_3, e_4\}, \varphi \in \{1, -1, j, -j\}.$$

Here, $e_k$ is a selection vector in which only a k-th element has a value of 1 and other elements have a value of 0. The value (i.e., one of 1 to 4) of k (i.e., selection index) is determined by i_2.

That is, the k-th precoding matrix is selected from precoding matrices belonging to the precoding matrix set W_1, and k may refer to the index for identifying a precoding matrix belonging to the precoding matrix set.

Here, k may be sequentially indexed from the left to the right of w_m belonging to W_1 in the equation for configuring W_1 such as Equation 21.

Alternatively, with respect to precoding matrices w_m belonging to the precoding matrix set W_1, k may be sequentially indexed in increasing order of index (i.e., x or h) of the first dimension and then in increasing order of index (i.e., y or v) of the second dimension. For example, {w_0, w_2, w_9, w_11} can be sequentially indexed with k={1, 2, 3, 4} in the example of FIG. 19. Conversely, k may be sequentially indexed in increasing order of index (i.e., y or v) of the second dimension and then in increasing order of index (i.e., x or h) of the first dimension. For example, {w_0, w_9, w_2, w_11} can be sequentially indexed with k={1, 2, 3, 4} in the example of FIG. 19.

Alternatively, with respect to precoding matrices w_m belonging to the precoding matrix set W_1, k may be indexed in increasing order of index (i.e., x or h) of the first dimension. For example, {w_0, w_9, w_2, w_11} can be sequentially indexed with k={1, 2, 3, 4} in the example of FIG. 19.

φ performs co-phasing between polarization antenna port groups. In other words, φ indicates a factor for controlling phase between first and second antenna ports in a cross-polarization antenna and can be determined as one of $$\exp\left(j\frac{\pi}{2}\right), \exp\left(j\frac{2\pi}{2}\right) \text{ and } \exp\left(j\frac{3\pi}{2}\right).$$

As represented in Equation 28, L_2 is 4 bits because L_2S=2 and L_2C=2.

As illustrated in FIGS. 15 to 20, two beams overlap between adjacent W1s. That is, as in the example of FIG. 15, W_1(0) is composed of a beam group of {0,1,2,3}, W_1(1)

is composed of a beam group of {2,3,4,5}, and {2,3} overlaps. In this case, as a method for increasing beam resolution of all codebooks, the selection vector $e_i$ can be multiplied by a rotation coefficient $$\left(e.g., \alpha_i = \exp\left(\frac{j2\pi(i-1)}{N_h Q_h}\right)\right).$$

Here, the rotation coefficient can correspond to $$\alpha_i = \exp\left(j\frac{2\pi 2(i-1)}{N_v Q_v}\right), \alpha_i = \exp\left(j\frac{2\pi 2(i-1)}{N_h Q_h N_v Q_v}\right)$$

or any rotation coefficient adapted to system performance.

More specifically, the rotation coefficient can be set to $$\alpha_i = \exp\left(j\frac{2\pi 2(i-1)}{32}\right), \alpha_i = \exp\left(j\frac{2\pi 2(i-1)}{16}\right),$$

$$\alpha_i = \exp\left(j\frac{2\pi 2(i-1)}{8}\right), \alpha_i = \exp\left(j\frac{2\pi 2(i-1)}{4}\right)$$

or an arbitrary value.

In this case, Equation 28 can be represented as Equation 29.

$$C_2^{(1)} = \left\{\frac{1}{\sqrt{2}}\begin{bmatrix} Y \\ \alpha_i \phi Y \end{bmatrix}\right\}, \quad \text{[Equation 29]}$$

$$Y \in \{e_1, e_2, e_3, e_4\}, \phi \in \{1, -1, j, -j\}.$$

Here, i is the index of the selection vector $e_i$.

In the case of transmission rank 2, the outer precoder $W_2$ can be selected from the second codebook $C_2^{(2)}$.

In the case of rank 2 or higher, one of precoding matrices including a precoding matrix set can be selected as in the case of rank 1. Here, a precoding matrix can be composed of a precoding vector applied per layer. In addition, W_1 is configured as described above and a precoding vector applied per layer can be selected from precoding vectors included in W_1. That is, in the case of rank 2 or higher, a precoding vector set may correspond to a precoding matrix set in the case of rank 1. In addition, a precoding matrix composed of a precoding vector selected per layer can be derived. Accordingly, in the case of rank 2 or higher, a precoding matrix set may refer to a set of precoding matrices generated according to various combinations of precoding vectors for respective layers.

In an embodiment of the present invention, W_2 may be configured as represented by Equation 30.

$$C_2^{(2)} = \left\{\frac{1}{\sqrt{2}}\begin{bmatrix} Y_1 & Y_2 \\ \varphi Y_1 & -\varphi Y_2 \end{bmatrix}\right\} \quad \text{[Equation 30]}$$

$(Y_1, Y_2) \in \{(e_1,e_1),(e_2,e_2),(e_3,e_3),(e_4,e_4),(e_1,e_2),(e_2,e_3),$
$(e_1,e_4),(e_2,e_3),(e_1,e_4),(e_2,e_4)\}; \varphi \in \{1, j\}$ As represented by Equation 30, L_2 is 4 bits since L_2S=3 and L_2C=1.

In the case of rank 2, a, can also be introduced as in Equation 29, which can be represented by Equation 31.

$$C_2^{(2)} = \left\{\frac{1}{\sqrt{2}}\begin{bmatrix} Y_1 & Y_2 \\ \alpha_i \phi Y_1 & -\alpha_i \phi Y_2 \end{bmatrix}\right\} \quad \text{[Equation 31]}$$

$(Y_1, Y_2) \in \{(e_1,e_1),(e_2,e_2),(e_3,e_3),(e_4,e_4),(e_1,e_2),(e_2,e_3),$
$(e_1,e_4),(e_2,e_4)\}; \phi \in \{1, j\}$ Equations 28 and 29 corresponding to rank 1 and Equations 30 and 31 corresponding to rank 2 may be combined and used. According to more specific embodiments, W_2 can be configured according to a combination of Equations 28 and 30, a combination of Equations 29 and 31, a combination of Equations 29 and 30 or a combination of Equations 29 and 31.

As in Equations 29 and 31, a codebook considering a specific rotation coefficient $\alpha_i$ may be used when the codebook W_2 which will be described below is configured.

Cases in which L_1=4 and L_2=4 have been described. However, when L_1 is extended to 5, 6, 7, 8 and 9 bits for fixed L_2=4, the above-described patterns (FIGS. 15 to 23) constituting W_1 can be easily extended and applied. 32 beams illustrated in FIGS. 15 to 23 are determined by an oversampling factor and dimensionality of an antenna port. That is, a total number of beams is $B_T=N_h Q_h N_v Q_v$, the number of columns corresponds to $B_h=N_h Q_h$ which is the number of columns of W_1H corresponding to a horizontal DFT matrix, and the number of row corresponds to $B_v=N_v Q_v$ which his the number of columns of W_1V corresponding to a vertical DFT matrix. The number of L_1 bits according to oversampling can be arranged as shown in Table 6.

Table 6 shows the number of L_1 bits according to oversampling when L_2 is 4 in (2,2,2,8) AAS.

TABLE 6

| | | $Q_h$ | | | |
|---|---|---|---|---|---|
| Number of L_1 bits | | 2 | 4 | 8 | 16 |
| $Q_v$ | 2 | | 4 | 5 | 6 |
| | 4 | 4 | 5 | 6 | 7 |
| | 8 | 5 | 6 | 7 | 8 |
| | 16 | 6 | 7 | 8 | 9 |

When Equation 21 is generalized using the number of L_1 bits, Equation 32 is obtained. That is, when the number of L_1 bits is determined/set as shown in Table 6, the W_1 configuration method proposed by the present invention can be generalized as represented by Equation 32.

$$C_1 = \quad \text{[Equation 32]}$$

$$\left\{\begin{bmatrix} \tilde{W}_1 & 0 \\ 0 & \tilde{W}_1 \end{bmatrix} \middle| \tilde{W}_1 = \underbrace{[W_{m(i_1,0)} W_{m(i_1,1)} W_{m(i_1,2)} W_{m(i_1,3)}]}_{4 \text{ columns}}\right\}$$

where $W_m = V_h \otimes V_v$, $V_h = \begin{bmatrix} 1 \\ e^{j\frac{2\pi h}{B_h}} \end{bmatrix}$, $V_v = \begin{bmatrix} 1 \\ e^{j\frac{2\pi v}{B_v}} \end{bmatrix}$, $h = m(i_1, i_2) \bmod B_h$, $v = \left\lfloor \frac{m(i_1, i_2)}{B_h} \right\rfloor$, $m(i_1, i_2) = (2i_1 + i_2) \bmod B_h + B_h \left\lfloor \frac{i_1}{B_h/2} \right\rfloor$ for, -continued $$i_1 = 0, 1, \ldots, 2^{L_1} - 1, i_2 = 0, 1, 2, 3,$$

Furthermore, a legacy 4 Tx codebook of 3GPP release-12 may be used for the horizontal part. In this case, Equation 32 can be modified into Equation 33.

$$C_1 = \left\{ \begin{bmatrix} \tilde{W}_1 & 0 \\ 0 & \tilde{W}_1 \end{bmatrix} \middle| \tilde{W}_1 = \underbrace{[W_{m(i_1,0)} W_{m(i_1,1)} W_{m(i_1,2)} W_{m(i_1,3)}]}_{4\,columns} \right\} \quad [\text{Equation 33}]$$

where $W_m = V_h \otimes V_v$, $V_h = \begin{bmatrix} 1 \\ e^{j\frac{2\pi h}{B_h}} \end{bmatrix}$, $V_v = \begin{bmatrix} 1 \\ e^{j\frac{2\pi v}{B_v}} \end{bmatrix}$, $h = m(i_1, i_2) \bmod B_h$, $v = \left\lfloor \frac{m(i_1, i_2)}{B_h} \right\rfloor$, $m(i_1, i_2) = (i_1 + \mu i_2) \bmod B_h + B_h \left\lfloor \frac{i_1}{B_h/2} \right\rfloor$ for, $i_1 = 0, 1, \ldots, 2^{L_1} - 1, i_2 = 0, 1, 2, 3,$ Here, P refers to the spacing between beams in the same W_1 group, and when μ=8, the horizontal direction is the same as that in the legacy release-12 4 Tx codebook.

Equations 22, 23, 24, 26 and 27 can be generalized by modifying the function m(i_1,i_2) in the generalized equation 32.

When the function m(i_1,i_2) in Equation 32 is modified into $$m(i_1, i_2) = (i_1 + i_2 \bmod 2) \bmod B_h + 2B_h \left\lfloor \frac{i_1}{B_h} \right\rfloor + B_h \left\lfloor \frac{i_2}{2} \right\rfloor, \quad [\text{Equation 34}]$$

for $i_1 = 0, 1, \ldots, 2^{L_1} - 1, i_2 = 0, 1, 2, 3$.

In addition, when the function m(i_1,i_2) in Equation 32 is modified into Equation 35, Equation 23 can be generalized.

$$m(i_1, i_2) = (i_1 + i_2 \bmod 2) \bmod B_h + \quad [\text{Equation 35}]$$

$$B_h \left\lfloor \frac{i_1}{B_h} \right\rfloor + \mu B_h \left\lfloor \frac{i_1}{\mu B_h} \right\rfloor + B_h \mu \left\lfloor \frac{i_2}{2} \right\rfloor,$$

for $i_1 = 0, 1, \ldots, 2^{L_1} - 1, i_2 = 0, 1, 2, 3$.

Furthermore, when the function m(i_1,i_2) in Equation 32 is modified into Equation 36, Equation 24 can be generalized.

$$m(i_1, i_2) = \left( 2i_1 + i_2 \bmod 2 + B_h \left\lfloor \frac{i_2}{2} \right\rfloor \right) \bmod B_T, \quad [\text{Equation 36}]$$

for $i_1 = 0, 1, \ldots, 2^{L_1} - 1, i_2 = 0, 1, 2, 3$.

Further, when the function m(i_1,i_2) in Equation 32 is modified into Equation 37, Equation 26 can be generalized.

$$m(i_1, i_2) = \quad [\text{Equation 37}]$$

$$\left( \left( i_1 + a \cdot (i_2 \bmod 2) + b \left\lfloor \frac{i_2}{2} \right\rfloor \right) \bmod B_h + 2 \cdot B_h \left\lfloor \frac{i_1}{B_h} \right\rfloor + B_h \cdot c \left\lfloor \frac{i_2}{2} \right\rfloor \right) \bmod B_T,$$

for $i_1 = 0, 1, \ldots, 2^{L_1} - 1, i_2 = 0, 1, 2, 3$.

In addition, when the function m(i_1,i_2) in Equation 32 is modified into Equation 38, Equation 27 can be generalized.

$$m(i_1, i_2) = \quad [\text{Equation 38}]$$

$$\left( \left( 2i_1 + a \cdot (i_2 \bmod 2) + b \left\lfloor \frac{i_2}{2} \right\rfloor \right) \bmod B_h + B_h \left\lfloor \frac{i_1}{B_h/2} \right\rfloor + B_h \cdot c \left\lfloor \frac{i_2}{2} \right\rfloor \right) \bmod B_T,$$

for $i_1 = 0, 1, \ldots, 2^{L_1} - 1, i_2 = 0, 1, 2, 3$.

Furthermore, the indexes of columns constituting W_1 may be grouped into a set in the vertical direction instead of the horizontal direction in Equation 32. This can be represented by Equation 39.

$$m(i_1, i_2) = \left( i_1 + B_h i_2 + \left\lfloor \frac{i_1}{B_h} \right\rfloor \right) \bmod B_T, \quad [\text{Equation 39}]$$

for $i_1 = 0, 1, \ldots, 2^{L_1} - 1, i_2 = 0, 1, 2, 3$.

In another embodiment in which W_1 is composed of 4 vectors, W_1 may be configured as represented by Equation 40.

$$C_1 = \left\{ \begin{bmatrix} \tilde{W}_1 & 0 \\ 0 & \tilde{W}_1 \end{bmatrix} \middle| \tilde{W}_1 = \quad [\text{Equation 40}] \right.$$

$$\left. \underbrace{\left[ W_{(i_1) \bmod 32} \; W_{(i_1+9) \bmod 32} \; W_{(i_1+18) \bmod 32} \; W_{(i_1+27) \bmod 32} \right]}_{4\,columns} \right\}$$

where $w_m = v_h \otimes v_r$, $v_h = \begin{bmatrix} 1 \\ e^{j\frac{2\pi h}{8}} \end{bmatrix}$, $v_v = \begin{bmatrix} 1 \\ e^{j\frac{2\pi v}{4}} \end{bmatrix}$, $h = m \bmod 8$, $v = \left\lfloor \frac{m}{8} \right\rfloor$, $m \in \{(i_1 + 9i_2)\}, i_1 = 0, 1, \ldots, 15, i_2 = 0, 1, 2, 3$.

Equation 40 is represented as the diagram of FIG. 24.

FIG. 24 is a diagram for describing a method of configuring a codebook according to an embodiment of the present invention.

Referring to FIG. 24, W_1 can be configured in a back slash pattern. In the case of the back slash pattern as shown in FIG. 24, a spacing of beams constituting W_1 can be set to 9.

When the W_1 configuration method as shown in FIG. 24 is generalized, pairs of indexes in the first dimension and indexes in the second dimension of precoding matrices constituting W_1 correspond to (x,y), (x+1,y+1), (x+2,y+2) and (x+3,y+3). Here, x and y are integers that are not negative numbers.

In addition, the spacing of beams constituting W_1 is set to 8, a vertical stripe pattern can be configured.

m(i_1,i_2) in Equation 40 can be generalized by being modified into Equation 41.

$$m(i_1,i_2)=(i_1+\mu i_2) \bmod B_T,$$

$$\text{for } i_1=0,1,\ldots,2^{L_1}-1, i_2=0,1,2,3. \quad \text{[Equation 41]}$$

Here, μ indicates a uniform spacing between beam vectors constituting W_1, i_1 indicates the index of W_1, and i_2 is an index corresponding to selection of W_2.

When W_1 is configured as illustrated in FIGS. 17 and 21 (or FIGS. 22 and 23), W_1 can be configured by consecutively arranging the indexes of beams in the horizontal or vertical direction or setting a gap.

Furthermore, there are Equations 32 and 33 in which only horizontal beams are configured in a given vertical domain. Horizontally consecutive beams constitute W_1 in the case of Equation 32 and beams having a spacing of 8 in the horizontal direction constitute W_1 in the case of Equation 33.

Such codebook configuration methods can be adaptively applied according to BS antenna layout. That is, when antenna port layout is wide in the horizontal direction (e.g., a TXRU subarray model or the like), Equation 33 which represents a case in which the beam spacing in W_1 is wide can be used or the parameters for determining a horizontal spacing in FIG. 21 (or FIGS. 22 and 23) can be set to determine a wider spacing.

On the contrary, when horizontal antenna port layout is narrow, Equation 32 can be used or the parameters for determining a horizontal spacing in FIG. 21 (or FIGS. 22 and 23) can be set to determine a narrower spacing. The same applies to a vertical case. Furthermore, antenna port layout can be adaptively set using the parameters for determining a beam spacing in FIGS. 17 and 21 (or FIGS. 22 and 23) according to granularity of vertical or horizontal beams.

Cases in which the number of feedback bits of long-term W_1 is increased in a 2D AAS have been described. This is more advantageous than a case in which the number of feedback bits of short-term W_2 is increased in terms of system overhead. However, a case in which the number of bits of W_2 is increased may also be considered in a 2D AAS using large antenna ports.

As another embodiment of the present invention, a method of configuring a codebook for the 8 TXRU 2D AAS as shown in FIG. 14(a) will be described. A case in which $Q_h=16$, $Q_v=4$, $L_1=6$ is assumed.

In this case, the number of columns constituting the entire codebook C_1 is 256 (=$N_h Q_h N_v Q_v$=2*16*2*4). In addition, each column is composed of a 4 Tx DFT vector.

Among the columns of C_1, W_1 may be considered to be composed of 8 DFT vectors (i.e., 8 columns) according to i_1. In this case, various patterns constituting W1 can also be considered similarly to a case in which L_2=4.

In an embodiment according to the present invention, W_1 may be configured as represented by Equation 42.

$$C_1 = \left\{ \begin{bmatrix} \tilde{W}_1 & 0 \\ 0 & \tilde{W}_1 \end{bmatrix} \right| \tilde{W}_1 = \quad \text{[Equation 42]}$$

$$\left[ w_{(4i_1+0) \bmod 32 + 32\lfloor \frac{i_1}{8} \rfloor} \; w_{(4i_1+1) \bmod 32 + 32\lfloor \frac{i_1}{8} \rfloor} \; \cdots \; w_{(4i_1+7) \bmod 32 + 32\lfloor \frac{i_1}{8} \rfloor} \right]_{8 \text{ columns}} \right\}$$

-continued where $w_m = v_h \otimes v_v$, $$v_h = \begin{bmatrix} 1 \\ e^{j\frac{2\pi h}{32}} \end{bmatrix},$$

$$v_v = \begin{bmatrix} 1 \\ e^{j\frac{2\pi v}{16}} \end{bmatrix}, h = m \bmod 32, v = \lfloor \frac{m}{32} \rfloor,$$

$$m \in \left\{ (4i_1 + i_2) \bmod 32 + 32 \lfloor \frac{i_1}{8} \rfloor \right\},$$

$$i_1 = 0, 1, \ldots, 63, i_2 = 0, 1, 2, \ldots, 7$$

Equation 42 is represented as the diagram of FIG. 25.

FIG. 25 is a diagram for describing a method of configuring a codebook according to an embodiment of the present invention.

In FIG. 25, numerals 0 to 255 indicate indexes of columns constituting the entire codebook C_1, and h and v respectively indicate a horizontal component and a vertical component of a DFT vector constituting w_m in W_1 which is an element of C_1.

Referring to FIG. 25, W_1 is composed of 8 columns, and 4 beams may overlap between W_1s having adjacent indexes i_1.

When the W_1 configuration method as shown in FIG. 25 is generalized, pairs of indexes in the first dimension and indexes in the second dimension of precoding matrices constituting W_1 correspond to (x,y), (x+i,y), (x+2,y), (x+3,y), (x+4,y), (x+5,y), (x+6,y) and (x+7,y). Here, x and y are integers that are not negative numbers.

When Equation 42 is generalized into Equation 43.

$$C_1 = \left\{ \begin{bmatrix} \tilde{W}_1 & 0 \\ 0 & \tilde{W}_1 \end{bmatrix} \right| \tilde{W}_1 = \quad \text{[Equation 43]}$$

$$\left[ w_{(4i_1+0) \bmod B_h + B_h \lfloor \frac{i_1}{B_h/4} \rfloor} \; w_{(4i_1+1) \bmod B_h + B_h \lfloor \frac{i_1}{B_h/4} \rfloor} \; \cdots \; w_{(4i_1+7) \bmod B_h + B_h \lfloor \frac{i_1}{B_h/4} \rfloor} \right]_{8 \text{ columns}} \right\}$$

where $w_m = v_h \otimes v_v$, $v_h = \begin{bmatrix} 1 \\ e^{j\frac{2\pi h}{B_h}} \end{bmatrix},$ $$v_v = \begin{bmatrix} 1 \\ e^{j\frac{2\pi v}{B_v}} \end{bmatrix}, h = m \bmod 32, v = \lfloor \frac{m}{B_h} \rfloor,$$

$$m \in \left\{ (4i_1 + i_2) \bmod B_h + B_h \lfloor \frac{i_1}{B_h/4} \rfloor \right\},$$

$$i_1 = 0, 1, \ldots, 2^{L_1} - 1, i_2 = 0, 1, 2, \ldots, 7$$

As another embodiment, W_1 may be configured as represented by Equation 44.

$$C_1 = \left\{ \begin{bmatrix} \tilde{W}_1 & 0 \\ 0 & \tilde{W}_1 \end{bmatrix} \right\} \tilde{W}_1 = \quad \text{[Equation 44]}$$

$$\left[ w_{(2i_1) \bmod B_h + 2 \cdot B_h \lfloor \frac{i_1}{B_h/2} \rfloor} \; w_{(2i_1+1) \bmod B_h + 2 \cdot B_h \lfloor \frac{i_1}{B_h/2} \rfloor} \; \cdots \; w_{(2i_1+3) \bmod B_h + 2 \cdot B_h \lfloor \frac{i_1}{B_h/2} \rfloor + B_h} \right]_{\text{8 columns}} \right\}$$

where $w_m = v_h \otimes v_v$, $v_h = \begin{bmatrix} 1 \\ e^{j\frac{2\pi h}{B_h}} \end{bmatrix}$, $v_v = \begin{bmatrix} 1 \\ e^{j\frac{2\pi v}{B_v}} \end{bmatrix}$, $h = m \bmod 32$, $v = \lfloor \frac{m}{B_h} \rfloor$, $m \in \left\{ (2i_1 + i_2 \bmod 4) \bmod B_h + 2 \cdot B_h \lfloor \frac{i_1}{B_h/2} \rfloor + B_h \lfloor \frac{i_1}{4} \rfloor \right\}$, $i_1 = 0, 1, \ldots, 2^{L_1} - 1$, $i_2 = 0, 1, 2, \ldots, 7$ Equation 44 is represented as the diagram of FIG. 26.

FIG. 26 is a diagram for describing a method of configuring a codebook according to an embodiment of the present invention.

Referring to FIG. 26, W_1 is composed of 4 horizontal elements and 2 vertical elements, and 2 horizontal elements may overlap between W_1s having adjacent indexes i_1.

When the W_1 configuration method as shown in FIG. 26 is generalized, pairs of indexes in the first dimension and indexes in the second dimension of precoding matrices constituting W_1 correspond to (x,y), (x+1,y), (x+2,y), (x+3,y), (x,y+1), (x+1,y+1), (x+2,y+1) and (x+3,y+1). Here, x and y are integers that are not negative numbers.

As another embodiment, W_1 may be configured as represented by Equation 45.

$$C_1 = \left\{ \begin{bmatrix} \tilde{W}_1 & 0 \\ 0 & \tilde{W}_1 \end{bmatrix} \right\} \quad \text{[Equation 45]}$$

$$\tilde{W}_1 = \left[ w_{(4i_1) \bmod B_t} \; w_{(4i_1+1) \bmod B_t} \; \cdots \; w_{(4i_1+3+B_h) \bmod B_t} \right]_{\text{8 columns}} \right\}$$

where $w_m = v_h \otimes v_v$, $v_h = \begin{bmatrix} 1 \\ e^{j\frac{2\pi h}{B_h}} \end{bmatrix}$, $v_v = \begin{bmatrix} 1 \\ e^{j\frac{2\pi v}{B_v}} \end{bmatrix}$, $h = m \bmod B_h$, $v = \lfloor \frac{m}{B_h} \rfloor$, $m \in \left\{ \left( 4i_1 + i_2 \bmod 4 + B_h \lfloor \frac{i_1}{4} \rfloor \right) \bmod B_T \right\}$, $i_1 = 0, 1, \ldots, 2^{L_1} - 1$, $i_2 = 0, 1, 2, \ldots, 7$ Here, i_1 indicates the index of W_1 and i_2 is an index corresponding to selection of W_2. B_h indicates the product of the number of horizontal antenna ports and the oversampling factor and B_v indicates the product of the number of vertical antenna ports and the oversampling factor.

Equation 45 is represented as the diagram of FIG. 27.

FIG. 27 is a diagram for describing a method of configuring a codebook according to an embodiment of the present invention.

Referring to FIG. 27, W_1 is composed of 4 horizontal elements and 2 vertical elements, and one horizontal element may overlap between W_1s having adjacent indexes i_1.

When the W_1 configuration method as shown in FIG. 27 is generalized, pairs of indexes in the first dimension and indexes in the second dimension of precoding matrices constituting W_1 correspond to (x,y), (x+1,y), (x+2,y), (x+3,y), (x,y+1), (x+1,y+1), (x+2,y+1) and (x+3,y+1). Here, x and y are integers that are not negative numbers.

As another embodiment, W_1 may be configured as represented by Equation 46.

$$C_1 = \left\{ \begin{bmatrix} \tilde{W}_1 & 0 \\ 0 & \tilde{W}_1 \end{bmatrix} \right\} \quad \text{[Equation 46]}$$

$$\tilde{W}_1 = \left[ w_{(2i_1) \bmod B_t} \; w_{(2i_1+1) \bmod B_t} \; \cdots \; w_{(2i_1+1+3B_h) \bmod B_t} \right]_{\text{8 columns}} \right\}$$

where $w_m = v_h \otimes v_v$, $v_h = \begin{bmatrix} 1 \\ e^{j\frac{2\pi h}{B_h}} \end{bmatrix}$, $v_v = \begin{bmatrix} 1 \\ e^{j\frac{2\pi v}{B_v}} \end{bmatrix}$, $h = m \bmod B_h$, $v = \lfloor \frac{m}{B_h} \rfloor$, $m \in \left\{ \left( 2i_1 + i_2 \bmod 2 + B_h \lfloor \frac{i_2}{2} \rfloor \right) \bmod B_T \right\}$, $i_1 = 0, 1, \ldots, 2^{L_1} - 1$, $i_2 = 0, 1, 2, \ldots, 7$ Here, i_1 indicates the index of W_1 and i_2 is an index corresponding to selection of W_2. B_h indicates the product of the number of horizontal antenna ports and the oversampling factor and B_v indicates the product of the number of vertical antenna ports and the oversampling factor.

Equation 46 is represented as the diagram of FIG. 28.

FIG. 28 is a diagram for describing a method of configuring a codebook according to an embodiment of the present invention.

Referring to FIG. 28, W_1 is composed of 2 horizontal elements and 4 vertical elements, and 2 horizontal element may overlap between W_1s having adjacent indexes i_1.

When the W_1 configuration method as shown in FIG. 28 is generalized, pairs of indexes in the first dimension and indexes in the second dimension of precoding matrices constituting W_1 correspond to (x,y), (x+1,y), (x,y+1), (x+1,y+1), (x,y+2), (x+1,y+2), (x,y+3) and (x+1,y+3). Here, x and y are integers that are not negative numbers.

As another embodiment, W_1 may be configured as represented by Equation 47.

[Equation 47]

$$C_1 = \left\{ \begin{bmatrix} \tilde{W}_1 & 0 \\ 0 & \tilde{W}_1 \end{bmatrix} \middle| \tilde{W}_1 = \right.$$

$$\left. \underbrace{\begin{bmatrix} w_{(i_1 \bmod B_h + 2B_h \lfloor \frac{i_1}{B_h} \rfloor) \bmod B_T} & w_{(i_1+1) \bmod B_h + B_h + 2B_h \lfloor \frac{i_1}{B_h} \rfloor) \bmod B_T} & \cdots & w_{(i_1+3) \bmod B_h + 3B_h + 2B_h \lfloor \frac{i_1}{B_h} \rfloor) \bmod B_T} \end{bmatrix}}_{8 \text{ columns}} \right\}$$

where $w_m = v_h \otimes v_v$, $v_h = \begin{bmatrix} 1 \\ e^{j\frac{2\pi h}{B_h}} \end{bmatrix}$, $v_v = \begin{bmatrix} 1 \\ e^{j\frac{2\pi v}{B_v}} \end{bmatrix}$, $h = m \bmod B_h$, $v = \lfloor \frac{m}{B_h} \rfloor$, $m \in \left\{ \left( (i_1 + (i_2 \bmod 4)) \bmod B_h + B_h (i_2 \bmod 2 + 2B_h (\lfloor \frac{i_1}{B_h} \rfloor + \lfloor \frac{i_2}{4} \rfloor)) \right) \bmod B_T \right\}$, $i_1 = 0, 1, \ldots, 2^{L_1} - 1$, $i_2 = 0, 1, 2, \ldots, 7$ In the above configuration method, $B_h$ W_1s are present in the horizontal direction and $B_v/2$ W_1 groups are present in the vertical direction. Similarly, a codebook may be generated by arranging $B_h/2$ W_1s in the horizontal direction and arranging $B_v$ 4 W_1 groups in the vertical direction. This can be represented by Equation 48.

[Equation 48]

$$C_1 = \left\{ \begin{bmatrix} \tilde{W}_1 & 0 \\ 0 & \tilde{W}_1 \end{bmatrix} \middle| \tilde{W}_1 = \right.$$

$$\left. \underbrace{\begin{bmatrix} w_{(2i_1 \bmod B_h + 2B_h \lfloor \frac{i_1}{B_h} \rfloor) \bmod B_T} & w_{(2i_1+1) \bmod B_h + B_h + 2B_h \lfloor \frac{i_1}{B_h} \rfloor) \bmod B_T} & \cdots & w_{(i_1+3) \bmod B_h + 3B_h + 2B_h \lfloor \frac{i_1}{B_h} \rfloor) \bmod B_T} \end{bmatrix}}_{8 \text{ columns}} \right\}$$

where $w_m = v_h \otimes v_v$, $v_h = \begin{bmatrix} 1 \\ e^{j\frac{2\pi h}{B_h}} \end{bmatrix}$, $v_v = \begin{bmatrix} 1 \\ e^{j\frac{2\pi v}{B_v}} \end{bmatrix}$, $h = m \bmod B_h$, $v = \lfloor \frac{m}{B_h} \rfloor$, $m \in \left\{ \left( (2i_1 + (i_2 \bmod 4)) \bmod B_h + B_h (i_2 \bmod 2) + B_h (\lfloor \frac{i_1}{B_h} \rfloor + 2B_h \lfloor \frac{i_2}{4} \rfloor) \right) \bmod B_T \right\}$, $i_1 = 0, 1, \ldots, 2^{L_1} - 1$, $i_2 = 0, 1, 2, \ldots, 7$ Equation 47 is represented as the diagram of FIG. 29.

FIG. 29 is a diagram for describing a method of configuring a codebook according to an embodiment of the present invention.

Referring to FIG. 29, 8 beam vectors constituting W_1 among column indexes belonging to a 4×4 square can be selected in a check pattern. This is generalized by Equation 47.

When the W_1 configuration method as shown in FIG. 29 is generalized, pairs of indexes in the first dimension and indexes in the second dimension of precoding matrices constituting W_1 correspond to (x,y), (x+1,y+1), (x+2,y), (x+3,y+1), (x,y+2), (x+1,y+3), (x+2,y+2) and (x+3,y+3). Here, x and y are integers that are not negative numbers.

When W_1 is configured using Equations 42 to 48, W_2 is configured through the following method.

In the case of transmission rank 1, the outer precoder W_2 can be selected from the second codebook $C_2^{(1)}$.

As an embodiment according to the present invention, W_2 can be configured as represented by Equation 49.

[Equation 49]

$$c_2^{(1)} = \left\{ \frac{1}{\sqrt{2}} \begin{bmatrix} Y \\ \varphi Y \end{bmatrix} \right\},$$

$Y \in \{e_1, e_2, e_3, e_4, e_5, e_6, e_7, e_8\}$, $\varphi \in \{1, -1, j, -j\}$.

As represented in Equation 49, L_2 is 5 bits since L_2S=3 and L_2C=2.

In the case of transmission rank 2, the outer precoder W_2 can be selected from the second codebook $C_2^{(1)}$.

As an embodiment according to the present invention, W_2 can be configured as represented by Equation 50.

$$C_2^{(2)} = \left\{ \frac{1}{\sqrt{2}} \begin{bmatrix} Y_1 & Y_2 \\ \varphi Y_1 & -\varphi Y_2 \end{bmatrix} \right\}$$ [Equation 50]

$(Y_1,Y_2) \in \{(e_1,e_1),(e_2,e_2),(e_3,e_3),(e_4,e_4),(e_5,e_5),(e_6,e_6),$
$(e_7,e_7),(e_8,e_8)(e_4,e_5),(e_3,e_6),(e_3,e_5),(e_1,e_2),(e_2,e_5),$
$(e_4,e_8),(e_5,e_6),(e_3,e_7)\}; \varphi \in \{1,j\}$ As represented in Equation 50, L_2 is 5 bits since L_2S=4 and L_2C=1.

Here, combinations of selection vectors may be obtained through the following methods.

1) A method of generating 8 pairs according to combinations of the same vectors and preferentially filling the remaining 8 pairs with combinations of consecutive vectors An example of this method as represented by Equation 51 can be provided.

$(Y_1,Y_2) \in \{(e_1,e_1),(e_2,e_2),(e_3,e_3),(e_4,e_4),(e_5,e_5),(e_6,e_6),$
$(e_7,e_7),(e_8,e_8)(e_1,e_2),(e_2,e_3),(e_3,e_4),(e_4,e_5),(e_5,e_6),$
$(e_6,e_7),(e_7,e_8),(e_1,e_4)\}; \varphi \in \{1,j\}$ [Equation 51]

2) A method of configuring a combination of vectors such that a chordal distance is maximized for all available pairs when a final codebook W is calculated Here, a chordal distance between matrices A and B is defined as represented by Equation 52.

$$D(A, B) = \frac{1}{\sqrt{2}} \|AA^H - BB^H\|_F$$ [Equation 52]

In Equation 52, $\|\cdot\|_F$ refers to Frobenius norm operation. An example of this method can be represented by Equation 50.

3) 8 pairs are generated according to combinations of the same vectors as represented by Equation 53 and 2-bit co-phasing is generated to produce a total of 5 bits.

$(Y_1,Y_2) \in \{(e_1,e_1),(e_2,e_2),(e_3,e_3),(e_4,e_4),(e_5,e_5),(e_6,e_6),$
$(e_7,e_7),(e_8,e_8)\}; \phi \in \{1,j,-1,-j\}$ [Equation 53]

In addition, when L_2=6 bits are considered, W_2 configuration below can be considered.

In the case of transmission rank 1, the outer precoder $W_2$ can be selected from the second codebook $C_2^{(1)}$.

As an embodiment according to the present invention, W_2 can be configured as represented by Equation 54.

$$C_2^{(1)} = \left\{ \frac{1}{\sqrt{2}} \begin{bmatrix} Y \\ \varphi Y \end{bmatrix} \right\},$$ [Equation 54]

$Y \in \{e_1, e_2, e_3, e_4, e_5, e_6, e_7, e_8\},$ $\varphi \in \left\{ 1, -1, j, -j, \frac{1+j}{\sqrt{2}}, \frac{1-j}{\sqrt{2}}, \frac{-1+j}{\sqrt{2}}, \frac{-1-j}{\sqrt{2}} \right\}.$ As represented in Equation 54, L_2 is 6 bits since L_2S=3 and L_2C=3.

In the case of transmission rank 2, the outer precoder $W_2$ can be selected from the second codebook $C_2^{(1)}$.

As an embodiment according to the present invention, W_2 can be configured as represented by Equation 55.

$$C_2^{(2)} = \left\{ \frac{1}{\sqrt{2}} \begin{bmatrix} Y_1 & Y_2 \\ \varphi Y_1 & -\varphi Y_2 \end{bmatrix} \right\}$$ [Equation 55]

$(Y_1,Y_2) \in \{(e_1,e_1),(e_2,e_2),(e_3,e_3),(e_4,e_4),(e_5,e_5),(e_6,e_6),$
$(e_7,e_7),(e_8,e_8)(e_4,e_5),(e_3,e_6),(e_3,e_5),(e_1,e_2),(e_2,e_5),$
$(e_4,e_8),(e_5,e_6),(e_3,e_7)\}; \varphi \in \{1,-1,j,-j\}$ [Equation 51]

As represented in Equation 55, L_2 is 6 bits since L_2S=4 and L_2C=2.

As another embodiment according to the present invention, W_2 can be configured as represented by Equation 56.

$$C_2^{(2)} = \left\{ \frac{1}{\sqrt{2}} \begin{bmatrix} Y_1 & Y_2 \\ \varphi Y_1 & -\varphi Y_2 \end{bmatrix} \right\}$$ [Equation 56]

$(Y_1,Y_2) \in \{(e_1,e_1),(e_2,e_2),(e_3,e_3),(e_4,e_4),(e_5,e_5),(e_6,e_6),$
$(e_7,e_7),(e_8,e_8)(e_1,e_2),(e_2,e_3),(e_3,e_4),(e_4,e_5),(e_5,e_6),$
$(e_6,e_7),(e_7,e_8),(e_1,e_3)(e_1,e_4),(e_1,e_5),(e_1,e_6),(e_1,e_7),$
$(e_1,e_8),(e_2,e_4),(e_2,e_5),(e_2,e_6),(e_2,e_7),(e_2,e_8),(e_3,e_5),$
$(e_3,e_6),(e_3,e_7),(e_3,e_8),(e_4,e_6),(e_7,e_7),\}; \varphi \in \{1,j\}$ As represented in Equation 56, L_2 is 6 bits since L_2S=5 and L_2C=1.

The method of determining (Y_1, Y_2) pair described with reference to Equation 50 can be equally applied to Equations 55 and 56.

2.12 TXRU

Methods of configuring a codebook for a 12 TXRU 2D AAS as shown in FIG. 14(b) will be described. In the case of 12 TXRU as shown in FIG. 14(b), two cases of (3,2,2,12) and (2,3,2,12) can be considered according to 2D antenna panel form.

Although the case of (2,3,2,12) will be described, the present invention is not limited thereto and a codebook can be extended and applied in the case of (3,2,2,12) similarly to the (2,3,2,12) codebook design method which will be described below.

First, a case in which $Q_h=2, Q_v=2, L_1=4$ is assumed.

In this case, since there are 3 Tx antenna ports in the horizontal direction and 2 Tx antenna ports in the vertical direction, columns constituting final W_1 are composed of 6 Tx DFT vectors and the structure is represented by Equation 57.

$$v_h = \begin{bmatrix} 1 \\ e^{j\frac{2\pi h}{3Q_h}} \\ e^{j\frac{4\pi h}{3Q_h}} \end{bmatrix}, v_v = \begin{bmatrix} 1 \\ e^{j\frac{2\pi v}{2Q_v}} \end{bmatrix}, v_m = v_h \otimes v_v$$ [Equation 57]

Here, m is a function of i_1 and i_2 as in the case of 8 TXRU.

First, a case in which the number of columns (i.e., the number of beams) constituting W_1 is selected as 4 in the entire codebook C_1, as in the case of 8 TXRU, can be considered.

As an embodiment according to the present invention, W_1 can be configured as represented by Equation 58.

$$C_1 = \left\{ \begin{bmatrix} \tilde{W}_1 & 0 \\ 0 & \tilde{W}_1 \end{bmatrix} \middle| \tilde{W}_1 = \left[ \frac{w_{m(i_1,0)} w_{m(i_1,1)} w_{m(i_1,2)} w_{m(i_1,3)}}{4 \text{ columns}} \right] \right\}$$ [Equation 58]

where $w_m = v_h \otimes v_v, v_h = \begin{bmatrix} 1 \\ e^{j\frac{2\pi h}{3Q_h}} \\ e^{j\frac{4\pi h}{3Q_h}} \end{bmatrix},$ -continued $$v_v = \begin{bmatrix} 1 \\ e^{j\frac{2\pi v}{B_v}} \end{bmatrix},$$

$$h = m(i_1, i_2) \bmod B_h, \quad v = \left\lfloor \frac{m(i_1, i_2)}{B_h} \right\rfloor,$$

$$m(i_1, i_2) = (2i_1, i_2) \bmod B_h + B_h \left\lfloor \frac{i_1}{B_h/2} \right\rfloor$$

for $i_1 = 0, 1, \ldots, 2^{L_1} - 1, i_2 = 0, 1, 2, 3$,

Equation 58 represented as the diagram of FIG. 30.

FIG. 30 is a diagram for describing a method of configuring a codebook according to an embodiment of the present invention.

Referring to FIG. 30, since the number of columns is not an exponent of 2, 3 W_1s can be configured for a fixed vertical index and thus a total of 12 W_1s can be configured.

When the W_1 configuration method as shown in FIG. 30 is generalized, pairs of indexes in the first dimension and indexes in the second dimension of precoding matrices constituting W_1 correspond to (x,y), (x+1,y), (x+2,y) and (x+3,y). Here, x and y are integers that are not negative numbers.

A total number of W_1s which can be configured using L_1=4 is 16. Here, a case in which only 12 W_1s are used and a case in which 16 W_1s are used can be considered.

1) When only 12 W_1s are used

W_1 can be configured using Equation 32.

If 12, 13, 14 and 15 are obtained as a result of decoding (by a BS) feedback information (of a UE) about W_1, it can be determined (by the BS) that error has been generated with respect to W_1.

When reserved states (e.g., 12, 13, 14 and 15 in the above-described example) are present in a specific reporting type such as W_1 feedback, the present invention causes a receiving end to perform error check using the reserved states. Accordingly, the present invention proposes techniques for preventing following feedback instances from becoming a meaningless report due to corresponding error. For example, at least one of the following methods can be applied.

1-A) A BS can transmit an aperiodic CSI request signal/message to a UE to receive CSI including W_1 through aperiodic feedback.

1-B) When a periodic feedback chain is used, the BS can ignore all of received CSI (e.g., CSI having lower feedback levels or short periods with respect to W_1, for example, X_2 and/or CQI) until W_1 having an error is reported in the next period.

1-C) When a periodic feedback chain is used, the BS can signal (e.g., through DCI) a specific B-bit indicator (e.g., B=1) in #n subframe (SF) to override a reporting type (e.g., W_1) (having an error) such that the reporting type is exceptionally retransmitted.

Here, it is possible to override the reporting type (e.g., W_1) (having an error) for a CSI process of feeding back the most recently reported specific reporting type (e.g., W_1) before #(n−k) SF (e.g., k can be predefined or configured for a UE) according to the B-bit indicator to exceptionally retransmit the reporting type. Additionally/alternatively, when a specific X port (e.g., X=12) CSI report including the reserved states is set in the CSI process, it is possible to override the reporting type (having an error) (e.g., W_1) at periodic reporting instance(s) that initially appear after #n SF of the CSI process to exceptionally retransmit the reporting type.

Furthermore, to prevent unnecessary uplink overhead, a UE may be defined or configured to drop (i.e., not to transmit) other pieces of CSI (e.g., CSI having lower feedback levels or short periods with respect to W_1, for example, X_2 and/or CQI) until a CSI reporting instance of the next valid reporting type (having an error) (e.g., W_1) appears.

By supporting such operations, it is possible to prevent unnecessary uplink overhead for periodic consecutive CSI reporting instances following a specific periodic CSI reporting instance in which an error is detected or to immediately indicate retransmission of CSI report to perform effective periodic reporting.

2) When 16 W_1s are used

When a method of additionally adding 4 W_1 configuration patterns is represented as a generalized equation, Equation 59 is obtained.

$$C_1 = \left\{ \begin{bmatrix} \tilde{W}_1 & 0 \\ 0 & \tilde{W}_1 \end{bmatrix} \middle| \tilde{W}_1 = \begin{bmatrix} \underbrace{w_{m(i_1,0)} w_{m(i_1,1)} w_{m(i_1,2)} w_{m(i_1,3)}}_{4\ \text{columns}} \end{bmatrix} \right\} \quad \text{[Equation 59]}$$

where $w_m = v_h \otimes v_v$, $v_h = \begin{bmatrix} 1 \\ e^{j\frac{2\pi h}{B_h}} \end{bmatrix}$ $$v_v = \begin{bmatrix} 1 \\ e^{j\frac{2\pi v}{B_v}} \end{bmatrix},$$

$$h = m(i_1, i_2) \bmod B_h, \quad v = \left\lfloor \frac{m(i_1, i_2)}{B_h} \right\rfloor,$$

$$\begin{cases} m(i_1, i_2) = (2i_1, i_2) \bmod B_h + B_h \left\lfloor \frac{i_1}{B_h/2} \right\rfloor \\ \text{for } i_1 = 0, 1, \ldots, \frac{B_h B_v}{2} - 1, i_2 = 0, 1, 2, 3, \\ m(i_1, i_2) = i_1 - \frac{B_h B_v}{2} + i_2 B_h \\ \text{for } i_1 = \frac{B_h B_v}{2}, \ldots, 2^{L_1} - 1, i_2 = 0, 1, 2, 3, \end{cases}$$

Here, i_1 indicates the index of W_1 and i_2 is an index corresponding to selection of W_2. B_h indicates the product of the number of horizontal antenna ports and the oversampling factor and B_v indicates the product of the number of vertical antenna ports and the oversampling factor.

Equation 59 is represented as the diagram of FIG. 31.

FIG. 31 is a diagram for describing a method of configuring a codebook according to an embodiment of the present invention.

FIG. 31 illustrates a case in which a vertical pattern is considered when i_1=12, 13, 14 and 15 in Equation 59.

As another embodiment, the patterns of FIGS. 18 to 21 (or FIGS. and 23) may be applied.

Since the number of columns constituting W_1 is 4, W_2 can be configured using Equations 28 or 30 when L_2=4.

Although L_1=4 and a case of using Equation 28 is described in the above-described example, the present invention is not limited thereto and the above-described method can be easily extended and applied using Equations 32 to 39 for all cases shown in Table 6.

Next, a case in which the number of columns (i.e., the number of beams) constituting W_1 is 6 may be considered.

As an embodiment according to the present invention, W_1 can be configured as represented by Equation 60.

$$C_1 = \left\{ \begin{bmatrix} \tilde{W}_1 & 0 \\ 0 & \tilde{W}_1 \end{bmatrix} \right\} \quad \text{[Equation 60]}$$

$$\tilde{W}_1 = \underbrace{\left[ w_{m(i_1,0)} w_{m(i_1,1)} w_{m(i_1,2)} w_{m(i_1,3)} w_{m(i_1,4)} w_{m(i_1,5)} \right]}_{6 \text{ columns}}$$

$$\text{where } w_m = v_h \otimes v_v, \; v_h = \begin{bmatrix} 1 \\ e^{j\frac{2\pi h}{3Q_h}} \\ e^{j\frac{4\pi h}{3Q_h}} \end{bmatrix},$$

$$v_v = \begin{bmatrix} 1 \\ e^{j\frac{2\pi v}{2Q_v}} \end{bmatrix}, \; h = m(i_1, i_2) \bmod B_h,$$

$$v = \left\lfloor \frac{m(i_1, i_2)}{B_h} \right\rfloor,$$

$$m(i_1, i_2) = (3i_1 + i_2) \bmod B_h + B_h \left\lfloor \frac{i_1}{B_h/3} \right\rfloor$$

$$\text{for } i_1 = 0, 1, \ldots, 2^{L_1} - 1, i_2 = 0, 1, 2, 3, 4, 5$$

Equation 60 is represented as the diagram of FIG. 32.

FIG. 32 is a diagram for describing a method of configuring a codebook according to an embodiment of the present invention.

Referring to FIG. 32, indexes of columns constituting W_1 are consecutive in the horizontal direction for given vertical element indexes.

When the W_1 configuration method as shown in FIG. 32 is generalized, pairs of indexes in the first dimension and indexes in the second dimension of precoding matrices constituting W_1 correspond to (x,y), (x+1,y), (x+2,y), (x+3,y), (x+4,y) and (x+5,y). Here, x and y are integers that are not negative numbers.

As another embodiment, W_1 can be configured by modifying the function $m(i_1,i_2)$ in Equation 60 into Equation 61.

$$m(i_1, i_2) = (3i_1 + (i_2 \bmod 3)) \bmod B_h + B_h \left\lfloor \frac{i_1}{B_h/3} \right\rfloor + B_h \left\lfloor \frac{i_2}{3} \right\rfloor \quad \text{[Equation 61]}$$

$$\text{for } i_1 = 0, 1, \ldots, 2^{L_1} - 1, i_2 = 0, 1, 2, 3, 4, 5$$

Equation 60 to which the function $m(i_1,i_2)$ in Equation 61 has been applied is represented as the diagram of FIG. 33.

FIG. 33 is a diagram for describing a method of configuring a codebook according to an embodiment of the present invention.

Referring to FIG. 33, W_1 can be configured in a rectangular pattern composed of a DFT vector having 3 horizontal elements and 2 vertical elements. In this case, 3 beams overlap between vertically adjacent W_1s.

When the W_1 configuration method as shown in FIG. 33 is generalized, pairs of indexes in the first dimension and indexes in the second dimension of precoding matrices constituting W_1 correspond to (x,y), (x+1,y), (x+2,y), (x,y+1), (x+1,y+1) and (x+2,y+1). Here, x and y are integers that are not negative numbers.

In addition to the examples of FIGS. 32 and 33, a case in which two beams overlap between W_1s may be considered.

However, in the case of 12 TXRU, the index of W1 cannot be represented as an exponent of 2, and thus all indexes cannot be used as in the above-described case in which W_1 is composed of 4 beams.

This can be represented by Equation 62. W_1 can be configured by modifying the function $m(i_1,i_2)$ in Equation 59 into Equation 62.

$$m(i_1, i_2) = (2i_1 + (i_2 \bmod 3)) \bmod B_h + 2B_h \left\lfloor \frac{i_1}{B_h/2} \right\rfloor + B_h \left\lfloor \frac{i_2}{3} \right\rfloor \quad \text{[Equation 62]}$$

$$\text{for } i_1 = 0, 1, \ldots, 2^{L_1} - 1, i_2 = 0, 1, 2, 3, 4, 5$$

Equation 62 is represented as the diagram of FIG. 34.

FIG. 34 is a diagram for describing a method of configuring a codebook according to an embodiment of the present invention.

When the W_1 configuration method as shown in FIG. 34 is generalized, pairs of indexes in the first dimension and indexes in the second dimension of precoding matrices constituting W_1 correspond to (x,y), (x+1,y), (x+2,y), (x,y+1), (x+1,y+1) and (x+2,y+1). Here, x and y are integers that are not negative numbers.

In addition, W_1 can be configured by modifying the function $m(i_1,i_2)$ in Equation 59 into Equation 63.

$$m(i_1, i_2) = (3i_1 + (i_2 \bmod 3)) \bmod B_h + B_h \left\lfloor \frac{i_1}{B_h/3} \right\rfloor + B_h \left\lfloor \frac{i_2}{3} \right\rfloor \quad \text{[Equation 63]}$$

$$\text{for } i_1 = 0, 1, \ldots, 2^{L_1} - 1, i_2 = 0, 1, 2, 3, 4, 5$$

Here, i_1 indicates the index of W_1 and i_2 is an index corresponding to selection of W_2. B_h indicates the product of the number of horizontal antenna ports and the oversampling factor and B_v indicates the product of the number of vertical antenna ports and the oversampling factor.

Equation 63 is represented as the diagram of FIG. 35.

FIG. 35 is a diagram for describing a method of configuring a codebook according to an embodiment of the present invention.

When the W_1 configuration method as shown in FIG. 35 is generalized, pairs of indexes in the first dimension and indexes in the second dimension of precoding matrices constituting W_1 correspond to (x,y), (x+1,y), (x,y+1), (x+1,y+1), (x,y+2) and (x+1,y+2). Here, x and y are integers that are not negative numbers.

W_1 is composed of 6 columns using Equations 60 to 63, and W_2 is configured using the following methods.

In the case of transmission rank 1, the outer precoder $W_2$ can be selected from the second codebook $C_2^{(1)}$.

As an embodiment according to the present invention, W_2 can be configured as represented by Equation 64.

$$C_2^{(1)} = \left\{ \frac{1}{\sqrt{2}} \begin{bmatrix} Y \\ \phi Y \end{bmatrix} \right\}, \quad \text{[Equation 64]}$$

$$Y \in \{e_1, e_2, e_3, e_4, e_5, e_6\}, \phi \in \{1, -1, j, -j\}.$$

As represented in Equation 52, L_2 is 5 bits since L_2S=3 and L_2C=2.

In the case of transmission rank 2, the outer precoder $W_2$ can be selected from the second codebook $C_2^{(2)}$.

As an embodiment according to the present invention, W_2 can be configured as represented by Equation 65.

$$C_2^{(2)} = \left\{ \frac{1}{\sqrt{2}} \begin{bmatrix} Y_1 & Y_2 \\ \phi Y_1 & -\phi Y_2 \end{bmatrix} \right\} \quad \text{[Equation 65]}$$

$(Y_1,Y_2) \in \{(e_1,e_1),(e_2,e_2),(e_3,e_3),(e_4,e_4),(e_5,e_5),(e_6,e_6),$
$(e_1,e_2),(e_2,e_3),(e_3,e_4),(e_4,e_5),(e_5,e_6),(e_1,e_3),(e_1,e_4),$
$(e_1,e_5),(e_1,e_7),(e_2,e_4)\};\phi \in \{1,j\}$ As represented in Equation 65, L_2 is 5 bits since L_2S=4 and L_2C=1.

As represented in Equation 66, 3 bits in the case that beam pairs are composed of its own beams and 2-bit for co-phasing may be considered when rank 2 is configured.

$(Y_1,Y_2) \in \{(e_1,e_1),(e_2,e_2),(e_3,e_3),(e_4,e_4),(e_5,e_5),(e_6,e_6)\};$
$\phi \in \{1,j,-1,-j\}$ [Equation 66]

Equations 64 to 66 illustrate a case in which L_2=5 bits. A case in which L_2=6 bits will be described below.

In the case of transmission rank 1, the outer precoder $W_2$ can be selected from the second codebook $C_2^{(1)}$.

W_2 can be configured as represented by Equation 67.

$$C_2^{(1)} = \left\{ \frac{1}{\sqrt{2}} \begin{bmatrix} Y \\ \phi Y \end{bmatrix} \right\}, Y \in \{e_1, e_2, e_3, e_4, e_5, e_6\}, \quad \text{[Equation 67]}$$

$$\phi \in \left\{ 1, -1, j, -j, \frac{1+j}{\sqrt{2}}, \frac{1-j}{\sqrt{2}}, \frac{-1+j}{\sqrt{2}}, \frac{-1-j}{\sqrt{2}} \right\}.$$

As represented in Equation 54, L_2 is 6 bits since L_2S=3 and L_2C=3.

In the case of transmission rank 2, the outer precoder $W_2$ can be selected from the second codebook $C_2^{(2)}$.

W_2 can be configured as represented by Equation 68.

$$C_2^{(2)} = \left\{ \frac{1}{\sqrt{2}} \begin{bmatrix} Y_1 & Y_2 \\ \phi Y_1 & -\phi Y_2 \end{bmatrix} \right\} \quad \text{[Equation 68]}$$

$(Y_1,Y_2) \in \{(e_1,e_1),(e_2,e_2),(e_3,e_3),(e_4,e_4),(e_5,e_5),(e_6,e_6),$
$(e_1,e_2),(e_2,e_3),(e_3,e_4),(e_4,e_5),(e_5,e_6),(e_1,e_3),(e_1,e_4),$
$(e_1,e_5),(e_1,e_7),(e_2,e_4)\};\phi \in \{1,-1,j,-j\}$ As represented in Equation 68, L_2 is 6 bits since L_2S=4 and L_2C=2.

Alternatively, W_2 can be configured as represented by Equation 69.

$$C_2^{(2)} = \left\{ \frac{1}{\sqrt{2}} \begin{bmatrix} Y_1 & Y_2 \\ \phi Y_1 & -\phi Y_2 \end{bmatrix} \right\} \quad \text{[Equation 69]}$$

$(Y_1,Y_2) \in \{(e_1,e_1),(e_2,e_2),(e_3,e_3),(e_4,e_4),(e_5,e_5),(e_6,e_6),$
$(e_1,e_2),(e_1,e_3)(e_1,e_4),(e_1,e_5),(e_1,e_6),(e_2,e_3),(e_2,e_4),$
$(e_2,e_5),(e_2,e_6),(e_3,e_4)(e_3,e_5),(e_3,e_6),(e_4,e_5),(e_4,e_6),$
$(e_5,e_6)\};\phi \in \{1,j\}$ As represented in Equation 68, L_2 is 6 bits since L_2S=5 and L_2C=1.

In the cases of Equations 67 and 69, L_2S is composed of 3 bits and 5 bits, and thus eight (Y_1, Y_2) pairs and thirty-two (Y_1, Y_2) pairs can be represented. However, as represented in Equations 67 and 69, there are six (Y_1, Y_2) pairs and twenty-one (Y_1, Y_2) pairs. Accordingly, when indexes indicating pairs other than the pairs of this case are fed back from a UE, the BS recognizes the feedback as a transmission error and may operate as follows.

2-A) The BS can transmit an aperiodic CSI request signal/message to a reception UE to receive information of W_2 through aperiodic feedback.

2-B) When a periodic feedback chain is used, the BS can ignore received other specific CSI until W_2 having an error is reported in the next period.

2-C) Alternatively, the proposed operation method described in 1-C can be applied to W_2 having a error.

When a periodic feedback chain is used, the BS can signal (e.g., through DCI) a specific B-bit indicator (e.g., B=1) in #n subframe (SF) to override W_2 (having an error) such that W_2 is exceptionally retransmitted.

Here, it is possible to override W_2 (having an error) for a CSI process of feeding back the most recently reported W_2 before #(n−k) SF (e.g., k can be predefined or configured for a UE) according to the B-bit indicator to exceptionally retransmit W_2. Additionally/alternatively, it is possible to override W_2 (having an error) at specific periodic reporting instance(s) that initially appear after #n SF of the CSI process to exceptionally retransmit W_2.

Furthermore, to prevent unnecessary uplink overhead, a UE may be defined or configured to drop (i.e., not to transmit) other pieces of CSI until a CSI reporting instance of the next W_2 (having an error) appears.

Since L_2S is 4 in Equation 55, (Y_1, Y_2) pairs can be selected using the methods described with reference to Equations 51 and 52.

Codebook design for (2,3,2,12) has been described. Codebook design may be similarly extended and applied in the case of (3,2,2,12). A difference therebetween is that 6 Tx DFT vectors corresponding to columns constituting final W_1 are configured as represented by Equation 57.

$$v_h = \begin{bmatrix} 1 \\ e^{j\frac{2\pi h}{2Q_h}} \end{bmatrix}, v_v = \begin{bmatrix} 1 \\ e^{j\frac{2\pi v}{3Q_v}} \\ e^{j\frac{4\pi v}{3Q_v}} \end{bmatrix}, v_m = v_h \otimes v_v, \quad \text{[Equation 70]}$$

$$h = m(i_1, i_2) \bmod B_h, \ v = \left\lfloor \frac{m(i_1, i_2)}{B_h} \right\rfloor$$

Here, $m(i_1,i_2)$ is a function of i_1 and i_2 which are indexes of W_1 and W_2 and a function with respect to the aforementioned method of configuring W_1. The above-described codebook design method for 12 TXRU can be extended and applied using the function to configure a codebook W.

The methods of configuring a codebook with DFT vectors corresponding to a BS antenna port panel size have been described. That is, when horizontal elements are exemplified, (2,2,2,8) is composed of 2 Tx DFT vectors and (3,2,2,12) is composed of 3 Tx DFT vectors. However, codebooks applied to legacy LTE based systems have indexes such as 2, 4 and 8 which are exponents of 2, and 3 and 6 Tx codebooks having indexes that are not exponents of 2 are used, it is expected that complexity in reception UE implementation increases.

To solve this, the present invention proposes methods of configuring a codebook using a DFT vector composed of exponents of 2 in a 2D AAS using antenna ports having indexes that are not exponents of 2 as horizontal or vertical components or horizontal and vertical components.

Equation 71 represents a 4Tx DFT codebook C_4Tx having an oversampling factor of Q_h.

$$C_{4Tx} = \begin{bmatrix} 1 & 1 & 1 & 1 & 1 & 1 & \cdots & 1 \\ 1 & \exp\left(\frac{j2\pi}{4\cdot Q_h}\right) & \exp\left(\frac{j4\pi}{4\cdot Q_h}\right) & \exp\left(\frac{j6\pi}{4\cdot Q_h}\right) & \exp\left(\frac{j8\pi}{4\cdot Q_h}\right) & \exp\left(\frac{j10\pi}{4\cdot Q_h}\right) & \cdots & \exp\left(\frac{j2\cdot(4\cdot Q_h-1)\pi}{4\cdot Q_h}\right) \\ 1 & \exp\left(\frac{j4\pi}{4\cdot Q_h}\right) & \exp\left(\frac{j8\pi}{4\cdot Q_h}\right) & \exp\left(\frac{j12\pi}{4\cdot Q_h}\right) & \exp\left(\frac{j16\pi}{4\cdot Q_h}\right) & \exp\left(\frac{j20\pi}{4\cdot Q_h}\right) & \cdots & \exp\left(\frac{j2\cdot 2\cdot(4\cdot Q_h-1)\pi}{4\cdot Q_h}\right) \\ 1 & \exp\left(\frac{j6\pi}{4\cdot Q_h}\right) & \exp\left(\frac{j12\pi}{4\cdot Q_h}\right) & \exp\left(\frac{j18\pi}{4\cdot Q_h}\right) & \exp\left(\frac{j24\pi}{4\cdot Q_h}\right) & \exp\left(\frac{j30\pi}{4\cdot Q_h}\right) & \cdots & \exp\left(\frac{j2\cdot 3\cdot(4\cdot Q_h-1)\pi}{4\cdot Q_h}\right) \end{bmatrix}$$

[Equation 71]

Oversampling is used to increase beam granularity of a codebook and may be implemented by configuring a matrix composed of first, second, third and fourth rows of a $4Q_h \times 4Q_h$ DFT matrix. A method of configuring a P Tx codebook having an antenna port P that is not an exponent of 2 using such an oversampling DTF matrix is described below.

3-A) An exponent of 2 which is greater than and closest to P is obtained. That is, N which satisfies $2^{N-1} < P < 2^N$ can be obtained.

3-B) A NQ×NQ DFT matrix can be configured using an oversampling factor Q provided in the system.

3-C) A sub-matrix C_PTx composed of first to P-th rows and first to PQ-th columns of the aforementioned matrix can be calculated.

When the codebook is composed of antenna ports having horizontal and vertical components that do not correspond to exponents of 2, it is possible to repeat the above-described process to configure another codebook C'_PTx and then obtain the Kronecker product of codebooks C_PTx and C'_PTx to configure the entire codebook.

3.16TXRU

A method of configuring a codebook for a 16 TXRU 2D AAS as shown in FIG. 14(c) will be described. As illustrated in FIG. 14(c), (2,4,2,16) and (4,2,2,16) may be configured according to antenna configuration in the case of 16 TXRU.

An 8 Tx DFT vector constituting codebook C_1 for W_1 is configured as represented by Equation 72 in the case of (2,4,2,16).

$$v_h = \begin{bmatrix} 1 \\ e^{j\frac{2\pi h}{4Q_h}} \\ e^{j\frac{4\pi h}{4Q_h}} \\ e^{j\frac{6\pi h}{4Q_h}} \end{bmatrix}, v_v = \begin{bmatrix} 1 \\ e^{j\frac{2\pi v}{2Q_v}} \end{bmatrix}, v_m = v_h \otimes v_v,$$

[Equation 72]

-continued $$h = m(i_1, i_2) \bmod B_h, \quad v = \left\lfloor \frac{m(i_1, i_2)}{B_h} \right\rfloor$$

In the case of (4,2,2,16), An 8 Tx DFT vector constituting codebook C_1 for W_1 is configured as represented by Equation 73.

$$v_h = \begin{bmatrix} 1 \\ e^{j\frac{2\pi h}{2Q_h}} \end{bmatrix}, v_v = \begin{bmatrix} 1 \\ e^{j\frac{2\pi v}{4Q_v}} \\ e^{j\frac{4\pi v}{4Q_v}} \\ e^{j\frac{6\pi v}{4Q_v}} \end{bmatrix}, v_m = v_h \otimes v_v,$$

[Equation 73]

$$h = m(i_1, i_2) \bmod B_h, \quad v = \left\lfloor \frac{m(i_1, i_2)}{B_h} \right\rfloor$$

Here, $m(i_1, i_2)$ is a function of i_1 and i_2 which are indexes of W_1 and W_2 and a function with respect to the aforementioned method of configuring W_1.

In the case of 16 TXRU, $m(i_1, i_2)$ can be configured by reusing the pattern used in the case of 8 TXRU. That is, when W_1 is composed of 4 columns, W1 can be configured by combining Equations 32 to 39 and Equations and 73.

For example, a codebook is configured using the pattern of FIG. in a system using (2,4,2,16), as represented by Equation 74.

$$C_1 = \left\{ \begin{bmatrix} \tilde{W}_1 & 0 \\ 0 & \tilde{W}_1 \end{bmatrix} \middle| \tilde{W}_1 = \underbrace{[w_{m(i_1,0)} \; w_{m(i_1,1)} \; w_{m(i_1,2)} \; w_{m(i_1,3)}]}_{4 \text{ columns}} \right\}$$

[Equation 74]

where $v_h = \begin{bmatrix} 1 \\ e^{j\frac{2\pi h}{4Q_h}} \\ e^{j\frac{4\pi h}{4Q_h}} \\ e^{j\frac{6\pi h}{4Q_h}} \end{bmatrix}, v_v = \begin{bmatrix} 1 \\ e^{j\frac{2\pi v}{2Q_v}} \end{bmatrix}, v_m = v_h \otimes v_v,$ $$h = m(i_1, i_2) \bmod B_h, \quad v = \left\lfloor \frac{m(i_1, i_2)}{B_h} \right\rfloor,$$

-continued $$m(i_1, i_2) = (2i_1 + i_2) \bmod B_h + B_h \left\lfloor \frac{i_1}{B_h/2} \right\rfloor$$

for $i_1 = 0, 1, \ldots, 2^{L_1} - 1$, $i_2 = 0, 1, 2, 3$,

Here, i_1 indicates the index of W_1 and i_2 is an index corresponding to selection of W_2. B_h indicates the product of the number of horizontal antenna ports and the oversampling factor and B_v indicates the product of the number of vertical antenna ports and the oversampling factor.

Here, W_2 can be configured according to Equations 28 and 30 in the cases of rank 1 and rank 2, respectively.

In addition, when W_1 is composed of 8 columns, W_1 can be configured by combining Equations 43, 44, 45 and 46 and Equations 72 and 73.

For example, a codebook is configured using the pattern of FIG. in a system using (2,4,2,16), as represented by Equation 75.

$$C_1 = \left\{ \begin{bmatrix} \tilde{W}_1 & 0 \\ 0 & \tilde{W}_1 \end{bmatrix} \middle| \tilde{W}_1 = \underbrace{\begin{bmatrix} w_{(4i_1+0) \bmod B_h + B_h \lfloor \frac{i_1}{B_h/4} \rfloor} & w_{(4i_1+1) \bmod B_h + B_h \lfloor \frac{i_1}{B_h/4} \rfloor} & \cdots & w_{(4i_1+7) \bmod B_h + B_h \lfloor \frac{i_1}{B_h/4} \rfloor} \end{bmatrix}}_{8\ columns} \right\}$$ [Equation 75]

where $v_h = \begin{bmatrix} 1 \\ e^{j\frac{2\pi h}{4Q_h}} \\ e^{j\frac{4\pi h}{4Q_h}} \\ e^{j\frac{6\pi h}{4Q_h}} \end{bmatrix}$, $v_v = \begin{bmatrix} 1 \\ e^{j\frac{2\pi v}{2Q_v}} \end{bmatrix}$, $v_m = v_h \otimes v_v$, $h = m(i_1, i_2) \bmod B_h$, $v = \left\lfloor \frac{m(i_1, i_2)}{B_h} \right\rfloor$, $m \in \left\{ (4i_1 + i_2) \bmod B_h + B_h \left\lfloor \frac{i_1}{B_h/4} \right\rfloor \right\}$, $i_1 = 0, 1, \ldots, 2^{L_1} - 1$, $i_2 = 0, 1, 2, \ldots, 7$ Here, i_1 indicates the index of W1 and i_2 is an index corresponding to selection of W_2. B_h indicates the product of the number of horizontal antenna ports and the oversampling factor and B_v indicates the product of the number of vertical antenna ports and the oversampling factor.

Here, W_2 can be configured according to Equation 49 or 54 in the case of rank 1. W_2 can be configured according to Equation 50, 55 or 56 in the case of rank 2.

In the above-described embodiments of the present invention, methods of obtaining DFT vectors and performing kronecker product operation on the DFT vectors to configure codebook vectors on the assumption that there is no phase offset when DFT vectors of vertical and horizontal elements are configured have been described.

That is, when an offset is considered in Equations 19 and 20, Equations 76 and 77 are obtained.

$$D_{(mn)}^{N_v \times N_v Q_v} = \frac{1}{\sqrt{N_v}} e^{j\frac{2\pi(m-1)(n-1)+\delta_v}{N_v Q_v}}$$ [Equation 76]

for $m = 1, 2, \ldots, N_v$, $n = 1, 2, \ldots, N_v Q_v$ $$D_{(mn)}^{N_h \times N_h Q_h} = \frac{1}{\sqrt{N_h}} e^{j\frac{2\pi(m-1)(n-1)+\delta_h}{N_h Q_h}}$$ [Equation 77]

for $m = 1, 2, \ldots, N_h$, $n = 1, 2, \ldots, N_h Q_h$

Here, $\delta_h$ and $\delta_v$ indicate phase offsets of vertical and horizontal DFT vectors, respectively. In embodiments of configuring a codebook considering such offsets, a codebook may be configured by setting offsets when an antenna tilting angle corresponding to a specific codebook phase is not used.

Furthermore, beam indexes in the horizontal direction in a fat matrix in which the number of columns is greater than the number of rows have been preferentially described for convenience of description. When beam indexes are arranged in the vertical direction, FIG. 15 can be modified into FIG. 36.

FIG. 36 is a diagram for describing a method of configuring a codebook according to an embodiment of the present invention.

In this case, methods of configuring the entire codebook, W_1 and W_2 are the same as the above-described methods, but Equations which represent the methods may be changed according to difference between beam indexing methods. For example, Equation 21 can be modified into Equation 78.

$$C_1 = \left\{ \begin{bmatrix} \tilde{W}_1 & 0 \\ 0 & \tilde{W}_1 \end{bmatrix} \middle| \tilde{W}_1 = [\underbrace{w_{(8i_1)\text{mod}32\lfloor\frac{i_1}{4}\rfloor} \quad w_{(8i_1+4)\text{mod}32+\lfloor\frac{i_1}{4}\rfloor} \quad w_{(8i_1+8)\text{mod}8+\lfloor\frac{i_1}{4}\rfloor} \quad w_{(8i_1+12)\text{mod}8+\lfloor\frac{i_1}{4}\rfloor}}_{4 \text{ columns}}] \right\}$$ [Equation 78]

where $w_m = v_h \otimes v_v$, $v_h = \begin{bmatrix} 1 \\ e^{j\frac{2\pi h}{8}} \end{bmatrix}$, $v_v = \begin{bmatrix} 1 \\ e^{j\frac{2\pi v}{4}} \end{bmatrix}$, $h = \lfloor\frac{m}{4}\rfloor$, $v = m\text{mod}4$, $m \in \left\{(8i_1 + 4i_2)\text{mod}32 + \lfloor\frac{i_1}{4}\rfloor\right\}$, $i_1 = 0, 1, \ldots, 15$, $i_2 = 0, 1, 2, 3$, Here, i_1 indicates the index of W_1 and i_2 is an index corresponding to selection of W_2.

As in the above-described embodiment, the W_1 configuration methods described above can also be easily extended and applied when beam indexing is changed to vertical indexing.

In the methods of configuring W_1 described in the present invention, as many beams as half the number of beams constituting W_1 may overlap between W_1s which are adjacent in the horizontal or vertical domain.

That is, in FIG. 36, W_1(0) and W_1(1) simultaneously include beams corresponding to indexes 8 and 12. However, a method of configuring W_1 without considering overlap may be used.

When overlap occurs in the horizontal domain, only even-numbered indexes {0,2,4,6, . . . } or odd-numbered indexes {1,3,5, . . . } may be selected to reconfigure W_1 in a legacy W_1 configuration method. Alternatively, W_1 may be composed of multiples of a specific number, for example, (0, 4, 8, . . . ) in the case of 4.

In the case of design in which overlap occurs in the vertical domain as in the example of FIG. 18, when the number of W_1s composed of the same vertical domain is defined as N_w1, W_1 can be reconfigured using indexes of {0,1, . . . , (N_w1)−1, 2N_w1, . . . } in a legacy W_1 configuration method to generate W_s composed of beams without overlap therebetween. Alternatively, when being moved by a multiple of a specific number (e.g., 4), W_1 can be constructed by using indexes such as {0,1, . . . , (N_w1)−1, 4N_w1, . . . } have.

In the case of methods of configuring W_1 having overlap in the vertical or horizontal domain, beam overlap can be eliminated using the above-described two principles.

By configuring W_1 in this manner, the number of feedback bits of W_1, L_1, can be reduced.

The above-described embodiments of the present invention propose various codebook design methods applicable to the antenna layout shown in FIG. 14 for 3D-MIMO. With respect to these codebook design methods, a BS can signal, to a UE, a codebook to be used by the UE using the following signaling methods.

A. The BS can signal the number of antenna ports, such as 8, 12 or 16, to the UE through RRC signaling.

12- and 16-antenna port layouts may respectively have a horizontally long rectangular form and a vertically long rectangular form, and the BS can signal a codebook suitable for each antenna port layout to the UE through RRC signaling using a 1-bit indicator. For example, the UE can recognize the antenna layout as a horizontally long rectangular antenna layout when the indicator is 0 and recognize the antenna layout as a vertically long rectangular antenna layout when the indicator is 1. In addition, the UE can generate a codebook suitable for each antenna layout through the 1-bit indicator.

i. Additionally, when a one-dimensional form is considered for antenna layouts (that is, (1,6,2) and (6,1,2) in the case of 12 antenna ports and (1,8,2) and (8,1,2) in the case of 16 antenna ports), the BS can signal an antenna layout to the UE through RRC signaling using a 2-bit indicator or bitmap. The UE can configure a codebook using the antenna layout.

ii. Additionally, when the UE uses some or all of the above-described codebooks, the above-described codebook configuration methods can be signaled to the UE in the form of a bitmap.

iii. In the case of aperiodic CSI reporting, the BS can explicitly signal L_1 and L_2 which are the numbers of bits corresponding to W_1 and W_2 to the UE through RRC signaling or signal the same to the UE in the form of a bitmap. Then, the UE can configure predetermined codebooks corresponding to the numbers of bits and use the same. In addition, the above-described codebooks corresponding to L_1 and L_2 may be signaled to the UE in the form of a bitmap such that the UE can generate a codebook.

B. The BS can explicitly signal, to the UE, a method of configuring layouts corresponding to the numbers of antenna ports, such as 8, 12 and 16, that is, the numbers of horizontal and vertical antenna ports. That is, the BS can signal information corresponding to (M, N) or (M, N, P) to the UE through RRC signaling and the UE can configure a codebook corresponding thereto through one of the above-described predetermined methods.

i. Additionally, when the UE uses some or all of the above-described codebooks, the above-described methods of configuring a codebook can be signaled to the UE in the form of a bitmap.

ii. In the case of aperiodic CSI reporting, the BS can explicitly signal L_1 and L_2 which are the numbers of bits corresponding to W_1 and W_2 to the UE through RRC signaling or signal the same to the UE in the form of a bitmap. Then, the UE can configure predetermined codebooks corresponding to the numbers of bits and use the same. In addition, the above-described codebooks corresponding to L_1 and L_2 may be signaled to the UE in the form of a bitmap such that the UE can generate a codebook.

C. When the number of antenna ports including legacy codebooks is 8, the BS can signal a 1-bit indicator to the UE through RRC signaling. The UE can generate a legacy codebook or a codebook for (2,2,2) through the 1-bit indicator.

i. Additionally, when the UE uses some or all of the above-described codebooks, the above-described codebook configuration methods can be signaled to the UE in the form of a bitmap.

ii. In the case of aperiodic CSI reporting, the BS can explicitly signal L_1 and L_2 which are the numbers of bits corresponding to W_1 and W_2 to the UE through RRC signaling or signal the same to the UE in the form of a bitmap. Then, the UE can configure predetermined codebooks corresponding to the numbers of bits and use the same. In addition, the above-described codebooks corresponding to L_1 and L_2 may be signaled to the UE in the form of a bitmap such that the UE can generate a codebook.

In the antenna port layout illustrated in FIG. 14 as an example of a 3D MIMO system, antenna port spacing largely affects codebook design. That is, system performance depends on how a codebook is configured when the antenna port spacing is wide (e.g., a physical distance of antenna port virtualization or antenna elements is long) and when the antenna port spacing is narrow.

In general, it is desirable to configure a beam group of W_1 such that the spacing between beams is wide when the spacing between antenna ports is wide and to configure the beam group of W_1 such that the spacing between beams is narrow when the spacing between antenna ports is narrow. For application of codebook design adapted to various environments, the present invention proposes the following methods.

As an embodiment according to the present invention, Equation 32 representing that horizontal component beams constituting W_1 are consecutively grouped for a given vertical component beam can be used. Alternatively, Equation representing that horizontal component beams are configured while maintaining a specific index group p=8 (P may be predefined or signal to the UE by the BS through RRC signaling) can be used.

When W_1 is composed of 4 beams in (2,4,2,16), equations for configuring a codebook are modified into Equations 79 and 80.

$$C_1 = \left\{ \begin{bmatrix} \tilde{W}_1 & 0 \\ 0 & \tilde{W}_1 \end{bmatrix} \middle| \tilde{W}_1 = \underbrace{[w_{m(i_1,0)} \; w_{m(i_1,1)} \; w_{m(i_1,2)} \; w_{m(i_1,3)}]}_{4 \; columns} \right\}$$ [Equation 79]

where $v_h = \begin{bmatrix} 1 \\ e^{j\frac{2\pi h}{4Q_h}} \\ e^{j\frac{4\pi h}{4Q_h}} \\ e^{j\frac{6\pi h}{4Q_h}} \end{bmatrix}$, $v_v = \begin{bmatrix} 1 \\ e^{j\frac{2\pi v}{2Q_v}} \end{bmatrix}$, $v_m = v_h \otimes v_v$, $h = m(i_1, i_2) \bmod B_h$, $v = \left\lfloor \frac{m(i_1, i_2)}{B_h} \right\rfloor$, $m(i_1, i_2) = (2i_1 + i_2) \bmod B_h + B_h \left\lfloor \frac{i_1}{B_h/2} \right\rfloor$ for $i_1 = 0, 1, \ldots, 2^{L_1} - 1$, $i_2 = 0, 1, 2, 3$, $$C_1 = \left\{ \begin{bmatrix} \tilde{W}_1 & 0 \\ 0 & \tilde{W}_1 \end{bmatrix} \middle| \tilde{W}_1 = \underbrace{[w_{m(i_1,0)} \; w_{m(i_1,1)} \; w_{m(i_1,2)} \; w_{m(i_1,3)}]}_{4 \; columns} \right\}$$ [Equation 80]

where $v_h = \begin{bmatrix} 1 \\ e^{j\frac{2\pi h}{4Q_h}} \\ e^{j\frac{4\pi h}{4Q_h}} \\ e^{j\frac{6\pi h}{4Q_h}} \end{bmatrix}$, $v_v = \begin{bmatrix} 1 \\ e^{j\frac{2\pi v}{2Q_v}} \end{bmatrix}$, $v_m = v_h \otimes v_v$, $h = m(i_1, i_2) \bmod B_h$, $v = \left\lfloor \frac{m(i_1, i_2)}{B_h} \right\rfloor$, $m(i_1, i_2) = (i_1 + \mu i_2) \bmod B_h + B_h \left\lfloor \frac{i_1}{B_h/2} \right\rfloor$ for $i_1 = 0, 1, \ldots, 2^{L_1} - 1$, $i_2 = 0, 1, 2, 3$.

Here, i_1 indicates the index of W_1 and i_2 is an index corresponding to selection of W_2.

1. The BS can signal a codebook suitable for a spacing between antenna ports to the UE through 1-bit signaling. That is, the BS can signal information about Equation 79 or 80 to the UE using 1 bit. The UE can reconfigure the codebook using the information.

2. W_1 including Equations 79 and 80 is configured when a codebook is configured, which is represented by Equation 81.

$$C_1 = \left\{ \begin{bmatrix} \tilde{W}_1 & 0 \\ 0 & \tilde{W}_1 \end{bmatrix} \middle| \tilde{W}_1 = \underbrace{[w_{m(i_1,0)} \; w_{m(i_1,1)} \; w_{m(i_1,2)} \; w_{m(i_1,3)}]}_{4 \; columns} \right\}$$ [Equation 81]

where $v_h = \begin{bmatrix} 1 \\ e^{j\frac{2\pi h}{4Q_h}} \\ e^{j\frac{4\pi h}{4Q_h}} \\ e^{j\frac{6\pi h}{4Q_h}} \end{bmatrix}$, $v_v = \begin{bmatrix} 1 \\ e^{j\frac{2\pi v}{2Q_v}} \end{bmatrix}$, $v_m = v_h \otimes v_v$, $h = m(i_1, i_2) \bmod B_h$, $v = \left\lfloor \frac{m(i_1, i_2)}{B_h} \right\rfloor$, $\begin{cases} m(i_1, i_2) = (2i_1 + i_2) \bmod B_h + B_h \left\lfloor \frac{i_1}{B_h/2} \right\rfloor \\ \text{for } i_1 = 0, 1, \ldots, 2^{L_1} - 1, i_2 = 0, 1, 2, 3, \\ m(i_1, i_2) = (i_1 + \mu i_2) \bmod B_h + B_h \left\lfloor \frac{i_1}{B_h/2} \right\rfloor \\ \text{for } i_1 = 2^{L_1}, 1, \ldots, 2^{L_1} - 1, i_2 = 0, 1, 2, 3 \end{cases}$ Here, i_1 indicates the index of W_1 and i_2 is an index corresponding to selection of W_2.

In this case, a payload size corresponding to W_1 may increase by 1 bit, but choices of wideband/long-term codebooks of the user can be widened.

3. To prevent the payload size from increasing in the method 2, a method of subsampling to ½ in Equations 79 and 80 may be used. That is, only odd numbers or even numbers can be combined for the index of i_1 in Equations 79 and 80.

4. The proposed method with respect to combination of two codebooks described in 2 may be extended and applied to the above-described various codebook designs in addition to combination of Equations 79 and 80.

2D Codebook Design for 16-Port CSI-RS

An embodiment according to the present invention proposes a codebook design method for 16 TXRU, as illustrated in FIG. 14(c).

A proposed codebook has a dual codebook structure as represented by Equation 82.

$$W = W_1 W_2 \quad \text{[Equation 82]}$$

Here, W_1 corresponds to long-term and/or wideband channel characteristics and W_2 corresponds to short-term and/or subband channel characteristics. In addition, W_1 includes two identical sub-matrices indicating beam directivity in two polarization groups and W_2 corresponds to beam selection and quantized polarization phase of W_1. According to the double codebook structure, feedback (i.e., long-term feedback for W_1 and short-term feedback for W_2) overhead can be reduced by setting different feedback periods.

Compared to codebooks of legacy systems, the main difference in codebook design for a 2D antenna array is to use additional degrees of freedom in the vertical domain. To this end, Kronecker product of a horizontal DFT matrix and a vertical DFT matrix is introduced into W_1 while maintaining a block diagonal structure, as represented by the following equation 83.

$$W_1(i_1) = \begin{bmatrix} X(i_1) & 0 \\ 0 & X(i_1) \end{bmatrix} \quad \text{[Equation 83]}$$

Here, $i_1 (i_1 = 0, \ldots 2^{L_1}-1)$ indicates indexes for W_1 and L is the number of feedback bits for W_1. $x(i_1)$ is the Kronecker product of selected columns of horizontal and vertical grids of beams according to $i_1$.

1. Codebook design for W_1

W_1 which is a fat matrix in which the number of columns is greater than the number of rows is defined as $X = X_H \otimes X_V$.

Here, $X_H$ and $X_V$ are fat matrices for the horizontal domain and the vertical domain, respectively.

$X_H$ can be configured from an N-Tx DFT vector such as $X_H = [v_{H,0}, v_{H,1}, v_{H,2}, \ldots v_{H,B_H-1}]$. Here, $B_H = NO_H$ and $$v_{H,k} = \left[1 \exp\left(j\frac{2\pi k}{B_H}\right) \ldots \exp\left(j\frac{2\pi(N-1)k}{B_H}\right)\right]^T.$$

$O_H$ indicates an oversampling factor in the horizontal domain.

Similarly, $X_V$ can be configured from an M-Tx DFT vector such as $X_V = [v_{V,0}, v_{V,1}, v_{V,2}, \ldots v_{V,4O_V-1}]$. Here, $B_V = MO_V$ and $$v_{V,k} = \left[1 \exp\left(j\frac{2\pi k}{B_V}\right) \ldots \exp\left(j\frac{2\pi(M-1)k}{B_V}\right)\right]^T.$$

$O_V$ indicates an oversampling factor in the vertical domain.

After Kronecker product operation, the total number of beams in fat matrix X corresponds to $B_T = B_H B_V = M \cdot O_V \cdot N \cdot O_H$. In addition, X can be represented as $X = [w_0, w_1, w_2, \ldots, w_{B_T-1}]$. Here, $$w_j = v_{H,\lfloor \frac{j}{B_V} \rfloor} \otimes v_{V, j \bmod B_V}.$$

For example, $w_1 = v_{H,0} \otimes v_{V,1}$.

Feedback overhead for W_1, L_1 is closely related to the oversampling factor and the beam group for W_1.

Hereinafter, the following oversampling factors are considered for antenna configurations.

(4,2,2,16): O_V=2, 4, 8 and O_H=8,16
(2,4,2,16): O_V=4, 8, 16 and O_H=8

A method of determining $X(i_1)$ defined as the $i_1$-th subset of X and related to beam grouping of W_1 is proposed.

Three options for configuring $X(i_1)$ on the assumption that $X(i_1)$ includes 4 beams are proposed as follows.

FIG. 37 is a diagram for describing a method of configuring a codebook according to an embodiment of the present invention.

Option 1: Horizontal Stripe

Referring to FIG. 37(a), 4 consecutive beams are selected in the horizontal domain for a given vertical beam. In this option, two beams overlap between adjacent X(i). In this case, $X(i_1)$ can be determined as represented by Equation 84.

$$X(i_1) = \left[ w_{(2B_V i_1) \bmod B_T + \lfloor \frac{i_1}{B_H/2} \rfloor} \; w_{(B_V(2i_1+1)) \bmod B_T + \lfloor \frac{i_1}{B_H/2} \rfloor} \right. \quad \text{[Equation 84]}$$

$$\left. w_{(B_V(2i_1+2)) \bmod B_T + \lfloor \frac{i_1}{B_H/2} \rfloor} \; w_{(B_V(2i_1+3)) \bmod B_T + \lfloor \frac{i_1}{B_H/2} \rfloor} \right]$$

where $w_j = v_{H, \lfloor \frac{j}{B_V} \rfloor} \otimes v_{V, j \bmod B_V}$, $j \in \left\{ (B_V(2i_1+i_2)) \bmod B_T + \lfloor \frac{i_1}{B_H/2} \rfloor \right\}$, $i_1 = 0, 1, \ldots, 2^{L_1}-1, i_2 = 0, 1, 2, 3.$ Option 2: rectangle Referring to FIG. 37(b), two consecutive beams are selected in both the horizontal domain and the vertical domain. In this option, two beams overlap between adjacent $X(i_1)$. In this case, $X(i_1)$ can be determined as represented by Equation 85.

$$X(i_1) = \left[ w_{(B_V i_1) \bmod B_T + 2\lfloor \frac{i_1}{B_H/2} \rfloor} \; w_{(B_V(i_1+1)) \bmod B_T + 2\lfloor \frac{i_1}{B_H/2} \rfloor} \right. \quad \text{[Equation 85]}$$

$$\left. w_{(B_V(i_1+1)) \bmod B_T + 2\lfloor \frac{i_1}{B_H/2} \rfloor} \; w_{(B_V(i_1+1)+1) \bmod B_T + 2\lfloor \frac{i_1}{B_H/2} \rfloor} \right]$$

where $w_j = v_{H, \lfloor \frac{j}{B_V} \rfloor} \otimes v_{V, j \bmod B_V}$, $j \in \left\{ \left(B_V\left(i_1 + \lfloor \frac{i_2}{2} \rfloor\right) + i_2 \bmod 2 \right) \bmod B_T + 2\lfloor \frac{i_1}{B_H/2} \rfloor \right\}$, -continued $i_1 = 0, 1, \ldots, 2^{L_1} - 1, i_2 = 0, 1, 2, 3.$ Option 3: check pattern Referring to 37(c), 4 beams are selected one across the one from beams composed of 4 consecutive horizontal beams and 2 consecutive vertical beams. That is, the beams are selected in a check pattern. In this option, two beams overlap between adjacent $X(i_1)$. In this case, $X(i_1)$ can be determined as represented by Equation 86.

[Equation 86]
$$X(i_1) = \left[ w_{(2B_V i_1) \bmod B_T + \lfloor \frac{i_1}{B_H/2} \rfloor} w_{(B_V(2i_1+1)+1) \bmod B_T + \lfloor \frac{i_1}{B_H/2} \rfloor} \right.$$
$$\left. w_{(B_V(2i_1+2)) \bmod B_T + \lfloor \frac{i_1}{B_H/2} \rfloor} w_{(B_V(2i_1+3)+1) \bmod B_T + \lfloor \frac{i_1}{B_H/2} \rfloor} \right]$$

where $w_j = v_{H, \lfloor \frac{j}{B_V} \rfloor} \otimes v_{V, j \bmod B_V}$, $j \in \left\{ (B_V(2i_1 + i_2) + i_2 \bmod 2) \bmod B_T + \lfloor \frac{i_1}{B_H/2} \rfloor \right\},$ $i_1 = 0, 1, \ldots, 2^{L_1} - 1, i_2 = 0, 1, 2, 3.$ Options 2 and 3 may have additional degrees of freedom in the vertical domain compared to option 1.

FIG. 38 is a diagram for describing a method of configuring a codebook according to an embodiment of the present invention.

If 8 beams for X(ii) are long-term fed back through 4 bits, the above-described option 2 (that is, option 4: rectangle pattern in the case of FIG. 38(a)) and option 3 (that is, option 5: check pattern in the case of FIG. 38(b)) can be applied. That is, 4 of 8 beams overlap between adjacent X(ii) as shown in FIGS. 38(a) and 38(b).

$X(i_1)$ corresponding to options 4 and 5 can be determined as represented by Equations 87 and 88.

[Equation 87]
$$X(i_1) = \underbrace{\left[ w_{(2B_V i_1 + \lfloor \frac{i_1}{B_H/2} \rfloor) \bmod B_T} \; w_{(B_V(2i_1+1) + \lfloor \frac{i_1}{B_H/2} \rfloor) \bmod B_T} \; \cdots \; w_{(B_V(2i_1+3)+1+\lfloor \frac{i_1}{B_H/2} \rfloor - B_V \lfloor \frac{i_1}{(B_V-1)B_H/2} \rfloor) \bmod B_T} \right]}_{8 \text{ columns}}$$

where $w_j = v_{H, \lfloor \frac{j}{B_V} \rfloor} \otimes v_{V, j \bmod B_V}$, $j \in \left\{ \left( B_V(2i_1 + i_2 \bmod 4) + \lfloor \frac{i_2}{4} \rfloor + \lfloor \frac{i_1}{B_H/2} \rfloor - B_V \lfloor \frac{i_2}{4} \rfloor \lfloor \frac{i_1}{(B_V-1)B_H/2} \rfloor \right) \bmod B_T \right\},$ $i_1 = 0, 1, \ldots, 2^{L_1} - 1, i_2 = 0, 1, 2, \ldots, 7.$

[Equation 88]
$$X(i_1) = \underbrace{\left[ w_{(2B_V i_1 + \lfloor \frac{i_1}{B_H/2} \rfloor) \bmod B_T} \; w_{(B_V(2i_1+1) + \lfloor \frac{i_1}{B_H/2} \rfloor - B_V \lfloor \frac{i_1}{(B_V-2)B_H/2} \rfloor) \bmod B_T} \; \cdots \; w_{(B_V(2i_1+3)+3+\lfloor \frac{i_1}{B_H/2} \rfloor - B_V \lfloor \frac{i_1}{(B_V-2)B_H/2} \rfloor) \bmod B_T} \right]}_{8 \text{ columns}}$$

where $w_j = v_{H, \lfloor \frac{j}{B_V} \rfloor} \otimes v_{V, j \bmod B_V}$, $j \in \left\{ \left( B_V(2i_1 + (i_2 \bmod 2)) + (B_V + 1) \lfloor \frac{i_2}{2} \rfloor - 2 \lfloor \frac{i_2}{4} \rfloor + \lfloor \frac{i_1}{B_H/2} \rfloor - B_V \left( i_2 \bmod 2 \right) \lfloor \frac{i_1}{(B_V-2)B_H/2} \rfloor \right) \bmod B_T \right\},$ $i_1 = 0, 1, \ldots, 2^{L_1} - 1, i_2 = 0, 1, 2, \ldots, 7.$ Consequently, matrix W_1 can be configured using Equation 83 and one of Equations 84, 85, 86, 87 and 88.

2. Codebook design for W_2

In options 1, 2 and 3, $X(i_1)$ is composed of 4 beams and thus W_2 may be reused in 3GPP release-12 4Tx codebook.

Accordingly, in the case of rank 1, W_2 can be determined as represented by Equation 89.

[Equation 89]
$$W_2 \in \left\{ \frac{1}{\sqrt{2}} \begin{bmatrix} Y \\ \alpha(i_2)Y \end{bmatrix}, \frac{1}{\sqrt{2}} \begin{bmatrix} Y \\ j\alpha(i_2)Y \end{bmatrix}, \right.$$
$$\left. \frac{1}{\sqrt{2}} \begin{bmatrix} Y \\ -\alpha(i_2)Y \end{bmatrix}, \frac{1}{\sqrt{2}} \begin{bmatrix} Y \\ -\alpha(i_2)Y \end{bmatrix} \right\}$$

Here, $Y \in \{e_1, e_2, e_3, e_4\}$ and $e_{(i_2+1)}$ is a selection vector having 4 elements in which only the $(i_2+1)$-th element is 1 and the remaining elements are 0. In addition, $\alpha(i_2) = \exp\left( j \frac{2\pi 2 i_2}{32} \right), i_2 = 0, 1, 2, 3,$ is a rotation term for increasing quantization resolution of co-phasing between two polarization groups.

In the case of rank 2, W_2 can be determined as represented by Equation 90.

[Equation 90]
$$W_2 \in \left\{ \frac{1}{2} \begin{bmatrix} Y_1 & Y_2 \\ Y_1 & -Y_2 \end{bmatrix}, \frac{1}{2} \begin{bmatrix} Y_1 & Y_2 \\ jY_1 & -jY_2 \end{bmatrix} \right\}$$

Here, $(Y_1, Y_2) \in \{(e_1,e_1),(e_2,e_2),(e_3,e_3),(e_4,e_4),(e_1,e_2),(e_2,e_3),(e_1,e_4),(e_2,e_4)\}$. Accordingly, L=4 bits are required for W_2 feedback.

In options 4 and 5, $X(i_1)$ is composed of 8 beams and thus the number of additional feedback bits for W_2 increases.

Similarly, in the case of rank 1, W_2 can be determined as represented by Equation 91.

[Equation 91]
$$W_2 \in \left\{ \frac{1}{\sqrt{2}} \begin{bmatrix} Y \\ \alpha(i_2)Y \end{bmatrix}, \frac{1}{\sqrt{2}} \begin{bmatrix} Y \\ j\alpha(i_2)Y \end{bmatrix}, \right.$$

-continued $$\left. \frac{1}{\sqrt{2}} \begin{bmatrix} Y \\ -\alpha(i_2)Y \end{bmatrix}, \frac{1}{\sqrt{2}} \begin{bmatrix} Y \\ -\alpha(i_2)Y \end{bmatrix} \right\}$$

Here, $Y \in \{e_1, e_2, e_3, e_4, e_5, e_6, e_7, e_8\}$ and $e_{(i_2+1)}$ $e_{(i_2+1)}$ is a selection vector having 8 elements in which only the $(i_2+1)$-th element is 1 and the remaining elements are 0. In addition, $$\alpha(i_2) = \exp\left(j\frac{2\pi 2 i_2}{32}\right), i_2 = 0, 1, 2, 3, 4, 5, 6, 7.$$

In the case of rank 2, W_2 can be determined as represented by Equation 92.

$$W_2 \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\} \qquad \text{[Equation 92]}$$

Here, $$(Y_1, Y_2) \in \left\{ \begin{array}{l} (e_1, e_1), (e_2, e_2), (e_3, e_3), (e_4, e_4), \\ (e_5, e_5), (e_6, e_6), (e_7, e_7), (e_8, e_8) \\ (e_1, e_2), (e_1, e_3), (e_1, e_4), (e_1, e_5), \\ (e_2, e_3), (e_2, e_4), (e_3, e_4), (e_4, e_5) \end{array} \right\}.$$

In Equation 92, a selection pair can be acquired by comparing Chordal distances of all available codebook pairs. In options 4 and 5, 5 bits are required for short-term feedback (i.e., $L_2=5$).

3. Performance Evaluation

Performances of Cat-2 baseline and various codebook designs for 16-TXRU are evaluated. For fair comparison, CSI-RS overhead shown in the following table 7 is considered.

Table 7 shows parameters for 2D codebook design.

TABLE 7

|  | Cat-2 baseline | Proposed codebook design |
|---|---|---|
| Number of REs for NZP and ZP CSI-RSs | 16*3 | 16*3 |
| CSI-RS period [ms] | 10 | 10 |
| Mean CSI-RS overhead (REs/RB/subframe) | 4.8 | 4.8 |
| CSI-RS de-boosting factor | 1 | 2 |

Simulation of a CSI-RS de-boosting factor is introduced due to RS power restriction in a non-precoded based scheme. A CSI-RS de-boosting factor of indicates power corresponding to half of CSI-RS transmission power in Cat-2 baseline. In addition, 100 ms feedback period is assumed because a scheme based on CSI-RS feedback period increase can provide improved performance compared to a scheme based on CSI-RS overhead increase.

Table 8 shows performance of (4, 2, 2, 16) antenna layout of codebook option 1 in a 3D-UMi (3D-Urban Micro) scenario.

TABLE 8

|  | Mean UE throughput (bps/Hz) | Mean UE throughput gain | 5% UE throughput (bps/Hz) | 5% UE throughput gain | 50% UE throughput (bps/Hz) | Resource utilization | FTP load, λ (UEs/s/sector) |
|---|---|---|---|---|---|---|---|
| Cat-2 baseline | 3.083 |  | 0.797 |  | 2.817 | 0.28 | 2 |
|  | 2.006 |  | 0.260 |  | 1.487 | 0.59 | 3 |
|  | 1.344 |  | 0.077 |  | 0.687 | 0.84 | 4 |
| O_H = 16, O_V = 2 | 3.147 | 2.1% | 0.885 | 11.1% | 2.963 | 0.27 | 2 |
|  | 2.199 | 9.6% | 0.352 | 35.1% | 1.747 | 0.53 | 3 |
|  | 1.535 | 14.3% | 0.115 | 49.4% | 0.930 | 0.79 | 4 |
| O_H = 16, O_V = 4 | 3.165 | 2.7% | 0.897 | 12.6% | 2.963 | 0.27 | 2 |
|  | 2.223 | 10.8% | 0.357 | 37.1% | 1.794 | 0.52 | 3 |
|  | 1.569 | 16.8% | 0.122 | 59.0% | 0.990 | 0.78 | 4 |
| O_H = 16, O_V = 8 | 3.175 | 3.0% | 0.909 | 14.1% | 3.008 | 0.26 | 2 |
|  | 2.234 | 11.3% | 0.372 | 43.2% | 1.794 | 0.52 | 3 |
|  | 1.571 | 16.9% | 0.124 | 60.4% | 0.983 | 0.78 | 4 |
| O_H = 8, O_V = 2 | 3.165 | 2.7% | 0.887 | 11.3% | 2.985 | 0.27 | 2 |
|  | 2.195 | 9.4% | 0.348 | 33.6% | 1.739 | 0.53 | 3 |
|  | 1.540 | 14.6% | 0.113 | 47.1% | 0.928 | 0.79 | 4 |
| O_H = 8, O_V = 4 | 3.174 | 3.0% | 0.903 | 13.3% | 2.985 | 0.27 | 2 |
|  | 2.234 | 11.4% | 0.363 | 39.7% | 1.810 | 0.52 | 3 |
|  | 1.563 | 16.3% | 0.120 | 55.8% | 0.966 | 0.78 | 4 |
| O_H = 8, O_V = 8 | 3.189 | 3.4% | 0.907 | 13.8% | 3.008 | 0.26 | 2 |
|  | 2.234 | 11.3% | 0.364 | 39.8% | 1.794 | 0.52 | 3 |
|  | 1.573 | 17.0% | 0.122 | 58.1% | 0.978 | 0.78 | 4 |

Table 8 shows comparison results with respect to codebook option and (4, 2, 2, 16) to which various oversampling factors have been applied in the horizontal and vertical domains in a 3D UMi scenario, and a 3D Uma (3D-Urban Macro) simulation result is shown in Table 15 below. In the simulation, a CSI-RS port is one-to-one mapped to TXRU. In addition, cell association is based on RSRP (reference signal received power) from CRS port 0 mapped to the first TXRU, and vertical beam selection margin is assumed to be 3 dB. Detailed evaluation assumption is shown in Table 11. As shown in Table 8, a larger oversampling factor provides higher performance gain. However, when performances with respect to O_H=16 and O_H=8 cases are compared, two factors show similar performances. Particularly, O_H=16 and O_H=8 cases provide up to 16.9% and 60.4% gains compared to Cat-2 baseline in terms of mean and 5% UE throughput. On the other hand, O_H=8 and O_V=8 cases provide only 17% and 58.1% gains. In Table 12, similar tendency is discovered in (8, 2, 2, 16) having 4

TXRUs per polarization and per column in which a single TXRU is virtualized into identical rows having a 100-degree tilting and two adjacent antenna elements in polarization. Accordingly, it may be desirable to select O_H=8 and O_V=8 in consideration of feedback bits for W_1.

Table 9 shows performance with respect to (2, 4, 2, 16) antenna layout of codebook option 1 in a 3D-UMi scenario.

Furthermore, it is desirable to select one of the five options according to the present invention for codebook design for a 2D antenna array.

In Table 10, performances of the proposed codebook design options are compared. In options 1, 2 and 3, W_1 is composed of 4 beams and thus feedback bits for W_2 are 4 bits. In options 4 and 5, 5 bits are required for W_2. Options

TABLE 9

|  | Mean UE throughput (bps/Hz) | Mean UE throughput gain | 5% UE throughput (bps/Hz) | 5% UE throughput gain | 50% UE throughput (bps/Hz) | Resource Utilization | FTP load, λ (UEs/s/sector) |
|---|---|---|---|---|---|---|---|
| Cat-2 baseline | 3.419 |  | 1.047 |  | 3.390 | 0.24 | 2 |
|  | 2.587 |  | 0.514 |  | 2.247 | 0.45 | 3 |
|  | 1.913 |  | 0.200 |  | 1.404 | 0.7 | 4 |
| O_H = 8, O_V = 4 | 3.442 | 0.7% | 1.070 | 2.1% | 3.419 | 0.23 | 2 |
|  | 2.609 | 0.8% | 0.544 | 5.8% | 2.299 | 0.44 | 3 |
|  | 1.942 | 1.5% | 0.222 | 10.8% | 1.434 | 0.69 | 4 |
| O_H = 8, O_V = 8 | 3.448 | 0.9% | 1.087 | 3.8% | 3.448 | 0.23 | 2 |
|  | 2.615 | 1.1% | 0.542 | 5.5% | 2.299 | 0.44 | 3 |
|  | 1.950 | 1.9% | 0.224 | 11.9% | 1.444 | 0.69 | 4 |
| O_H = 8, O_V = 16 | 3.445 | 0.8% | 1.090 | 4.1% | 3.419 | 0.23 | 2 |
|  | 2.610 | 0.9% | 0.540 | 5.1% | 2.286 | 0.44 | 3 |
|  | 1.954 | 2.1% | 0.223 | 11.3% | 1.449 | 0.69 | 4 |

Table 9 shows comparison results with respect to codebook option and (2, 4, 2, 16) to which various oversampling factors have been applied in the vertical domain in the 3D UMi scenario. A simulation result in 3D Uma (3D-Urban Macro) is shown in Table 15 below. Results with respect to (4, 4, 2, 16) and (8, 4, 2, 16) having a 100-degree tilting angle are respectively shown in Tables 13 and 14. In addition, a simulation result with respect to a 3D-UMa 500 m scenario is shown in Table 16.

Similar to a tall antenna port layout case, a larger oversampling factor provides higher throughput performance in a fat antenna port layout case. In terms of feedback bits for W_1, O_H=8 and O_V=8 require W_1=8 bits, whereas 2 and 3 provide a slight performance gain compared to option 1 using short-term vertical beam selection. When options 1, 4 and 5 are compared, performance gains of up to 2.6% and 4.6% can be respectively obtained at mean and 5% UE throughputs when additional feedback bits of W_2 are consumed. In codebook options, codebook design based on a check pattern can be satisfactory candidates for 16-TXRU owing to excellent performance.

Table 10 shows performance with respect to (4, 2, 2, 16) antenna layout when O_H=8 and O_V=8 are applied in the 3D-UMi scenario.

TABLE 10

|  | Mean UE Throughput (bps/Hz) | Mean UE Throughput Gain | 5% UE Throughput (bps/Hz) | 5% UE Throughput Gain | 50% UE Throughput (bps/Hz) | Resource Utilization | FTP load, λ (UEs/s/sector) |
|---|---|---|---|---|---|---|---|
| Option 1 | 3.174 |  | 0.903 |  | 2.985 | 0.27 | 2 |
|  | 2.234 |  | 0.363 |  | 1.810 | 0.52 | 3 |
|  | 1.563 |  | 0.120 |  | 0.966 | 0.78 | 4 |
| Option 2 | 3.182 | 0.3% | 0.899 | −0.4% | 3.008 | 0.26 | 2 |
|  | 2.233 | 0.0% | 0.367 | 0.9% | 1.810 | 0.52 | 3 |
|  | 1.577 | 0.9% | 0.124 | 3.0% | 0.985 | 0.78 | 4 |
| Option 3 | 3.189 | 0.5% | 0.893 | −1.1% | 2.985 | 0.26 | 2 |
|  | 2.243 | 0.4% | 0.365 | 0.6% | 1.810 | 0.52 | 3 |
|  | 1.583 | 1.3% | 0.119 | −1.2% | 0.978 | 0.78 | 4 |
| Option 4 | 3.211 | 1.2% | 0.920 | 1.8% | 3.053 | 0.26 | 2 |
|  | 2.265 | 1.4% | 0.371 | 2.2% | 1.827 | 0.52 | 3 |
|  | 1.596 | 2.1% | 0.124 | 3.7% | 1.000 | 0.78 | 4 |
| Option 5 | 3.235 | 1.9% | 0.922 | 2.1% | 3.077 | 0.26 | 2 |
|  | 2.285 | 2.3% | 0.380 | 4.6% | 1.861 | 0.51 | 3 |
|  | 1.603 | 2.6% | 0.123 | 2.8% | 1.008 | 0.78 | 4 |

O_H=9 and O_V=8 require W_1=9 bits. O_H=8 and O_V=8 can propose better solutions in both of the tall and fat antenna port layouts due to marginal performance improvement between the two cases.

Accordingly, it is desirable to determine O_H=8 and O_V=8 as oversampling factors for 16 TXRU in consideration of feedback bits for W_1.

Referring to table 10, options 2, 3, 4 and 5 can perform short-term vertical selection for given oversampling factors and can be further optimized, distinguished from option 1, and thus they are expected to show better performance.

Consequently, it is possible to determine O_H=8 and O_V=8 as oversampling factors for 16-TXRU in consideration of feedback bits for W_1.

Furthermore, it is desirable to select one of the five options according to the present invention for codebook design for a 2D antenna array.

Table 11 shows simulation parameters and assumption.

TABLE 11

| Scenario | 3D-UM with ISD (Inter-site distance) = 200 m within 2 GHz |
|---|---|
| BS antenna configuration | Antenna element configuration: 4 × 2 × 2 (+/−45), 0.5 λ horizontal/0.8 λ vertical antenna spacing |
| UE antenna configuration | 2 Rx X-pol (0/+90) |
| System bandwidth | 10 MHz (50 RBs) |
| UE attachment | based on RSRP from CRS port 0 RSRP (formal) |
| Duplex | FDD |
| Network synchronization | synchronized |
| UE distribution | conform to TR36.873 |
| UE speed | 3 km/h |
| Polarized antenna modeling | Model-2 of TR36.873 |
| UE array orientation | $\Omega UT$, α uniformly distributed at angles of [0,360], $\Omega UT$, β = 90 degrees, $\Omega UT$, γ = 0 degree |
| UE antenna pattern | Isotropic antenna gain pattern $A'(\theta' \phi) = 1$ |
| Traffic model | FTP model 1 having packet size of 0.5 Mbytes (low ~20% RU, medium ~50% RU, high ~70% RU) [1] |
| Scheduler | Frequency selective scheduling (multiple UEs per allowed TTI) |
| Receiver | Non-ideal channel estimation and interference modeling, detailed guideline conforms to Rel-12 [71-12] assumption. LMMSE-IRC receiver, detailed guideline conforms to Rel-12 [71-12] assumption. |
| CSI-RS, CRS | CSI-RS is one-to-one mapped to TXRU, only CRS port 0 is modeled for UE attachment, and CRS port 0 is associamted with the first TXRU. |
| HARQ (Hybrid ARQ) | Maximum 4 transmission |
| Feedback | CQI, PMI and RI reporting is triggered per 10 ms. Feedback delay is 5 ms. |
| Overhead | 3 symbols for DL CCHs, 2 CRS ports and DM-RS for 12 REs per PRB |
| Transmission scheme | TM10, single CSI process, SU-MIMO (non-CoMP) involving rank adaptation |
| Wrapping method | Geographical distance based |
| Handover margin | 3 dB |
| Metrics | Mean UE throughput, 5% UE throughput |

Table 12 shows performance with respect to (8, 2, 2, 16) antenna layout of codebook option 1 in the 3D-UMi scenario.

TABLE 12

| | Mean UE Throughput (bps/Hz) | Mean UE Throughput Gain | 5% UE Throughput (bps/Hz) | 5% UE Throughput Gain | 50% UE Throughput (bps/Hz) | Resource Utilization | FTP load, λ (UEs/s/Sector) |
|---|---|---|---|---|---|---|---|
| Cat-2 baseline | 3.359 | | 0.964 | | 3.279 | 0.25 | 2 |
| | 2.362 | | 0.404 | | 1.914 | 0.5 | 3 |
| | 1.648 | | 0.123 | | 1.031 | 0.77 | 4 |
| O_H = 8, O_V = 2 | 3.400 | 1.2% | 1.055 | 9.5% | 3.306 | 0.24 | 2 |
| | 2.534 | 7.3% | 0.506 | 25.3% | 2.198 | 0.46 | 3 |
| | 1.873 | 13.7% | 0.191 | 55.4% | 1.342 | 0.7 | 4 |
| O_H = 8, O_V = 4 | 3.414 | 1.6% | 1.070 | 11.0% | 3.361 | 0.24 | 2 |
| | 2.561 | 8.4% | 0.522 | 29.3% | 2.222 | 0.45 | 3 |
| | 1.903 | 15.5% | 0.199 | 62.2% | 1.404 | 0.69 | 4 |
| O_H = 8, O_V = 8 | 3.415 | 1.7% | 1.081 | 12.2% | 3.348 | 0.24 | 2 |
| | 2.560 | 8.4% | 0.528 | 30.6% | 2.210 | 0.45 | 3 |
| | 1.908 | 15.8% | 0.203 | 65.0% | 1.424 | 0.69 | 4 |

Table 13 shows performance with respect to (4, 4, 2, 16) antenna layout of codebook option 1 in the 3D-UMi scenario.

TABLE 13

| | Mean UE Throughput (bps/Hz) | Mean UE Throughput Gain | 5% UE Throughput (bps/Hz) | 5% UE Throughput Gain | 50% UE Throughput (bps/Hz) | Resource Utilization | FTP load, λ (UEs/s/sector) |
|---|---|---|---|---|---|---|---|
| Cat-2 baseline | 3.557 | | 1.112 | | 3.670 | 0.22 | 2 |
| | 2.730 | | 0.591 | | 2.454 | 0.42 | 3 |
| | 2.075 | | 0.251 | | 1.587 | 0.66 | 4 |
| O_H = 8, O_V = 4 | 3.578 | 0.6% | 1.177 | 5.8% | 3.670 | 0.22 | 2 |
| | 2.772 | 1.5% | 0.634 | 7.3% | 2.516 | 0.41 | 3 |
| | 2.139 | 3.1% | 0.272 | 8.6% | 1.692 | 0.64 | 4 |
| O_H = 8, O_V = 8 | 3.579 | 0.6% | 1.173 | 5.5% | 3.636 | 0.22 | 2 |
| | 2.776 | 1.7% | 0.638 | 8.1% | 2.516 | 0.41 | 3 |
| | 2.145 | 3.3% | 0.278 | 10.9% | 1.702 | 0.63 | 4 |
| O_H = 8, O_V = 16 | 3.579 | 0.6% | 1.163 | 4.5% | 3.670 | 0.22 | 2 |
| | 2.781 | 1.9% | 0.641 | 8.5% | 2.516 | 0.41 | 3 |
| | 2.150 | 3.6% | 0.279 | 11.1% | 1.717 | 0.63 | 4 |

Table 14 shows performance with respect to (8, 4, 2, 16) antenna layout of codebook option 1 in the 3D-UMi scenario.

TABLE 14

| | Mean UE Throughput (bps/Hz) | Mean UE Throughput Gain | 5% UE Throughput (bps/Hz) | 5% UE Throughput Gain | 50% UE Throughput (bps/Hz) | Resource Utilization | FTP load, λ (UEs/s/Sector) |
|---|---|---|---|---|---|---|---|
| Cat-2 baseline | 3.631 | | 1.198 | | 3.810 | 0.22 | 2 |
| | 2.896 | | 0.654 | | 2.649 | 0.39 | 3 |
| | 2.250 | | 0.300 | | 1.827 | 0.62 | 4 |
| O_H = 8, O_V = 4 | 3.681 | 1.4% | 1.282 | 7.1% | 3.922 | 0.21 | 2 |
| | 2.998 | 3.5% | 0.763 | 16.8% | 2.778 | 0.37 | 3 |
| | 2.396 | 6.5% | 0.399 | 33.1% | 2.031 | 0.57 | 4 |
| O_H = 8, O_V = 8 | 3.682 | 1.4% | 1.299 | 8.4% | 3.884 | 0.21 | 2 |
| | 3.007 | 3.8% | 0.771 | 17.9% | 2.797 | 0.37 | 3 |
| | 2.405 | 6.9% | 0.393 | 31.3% | 2.062 | 0.57 | 4 |
| O_H = 8, O_V = 16 | 3.682 | 1.4% | 1.295 | 8.1% | 3.884 | 0.21 | 2 |
| | 3.007 | 3.8% | 0.771 | 17.9% | 2.797 | 0.37 | 3 |
| | 2.411 | 7.2% | 0.399 | 33.1% | 2.051 | 0.57 | 4 |

Table 15 shows performance with respect to (4, 2, 2, 16) antenna layout of codebook option 1 in the 3D-UMa 500 m scenario.

TABLE 15

| | Mean UE Throughput (bps/Hz) | Mean UE Throughput Gain | 5% UE Throughput (bps/Hz) | 5% UE Throughput Gain | 50% UE Throughput (bps/Hz) | Resource Utilization | FTP load, λ (UEs/s/Sector) |
|---|---|---|---|---|---|---|---|
| Cat-2 baseline | 2.479 | | 0.493 | | 2.000 | 0.36 | 2 |
| | 1.490 | | 0.125 | | 0.881 | 0.73 | 3 |
| | 0.961 | | 0.043 | | 0.320 | 0.89 | 4 |
| O_H = 8, O_V = 2 | 2.583 | 4.2% | 0.576 | 16.9% | 2.174 | 0.34 | 2 |
| | 1.659 | 11.3% | 0.175 | 39.4% | 1.084 | 0.68 | 3 |
| | 1.071 | 11.4% | 0.055 | 27.3% | 0.408 | 0.88 | 4 |
| O_H = 8, O_V = 4 | 2.600 | 4.9% | 0.573 | 16.2% | 2.186 | 0.34 | 2 |
| | 1.667 | 11.9% | 0.175 | 39.9% | 1.090 | 0.68 | 3 |
| | 1.075 | 11.9% | 0.056 | 29.3% | 0.418 | 0.87 | 4 |
| O_H = 8, O_V = 8 | 2.593 | 4.6% | 0.582 | 18.0% | 2.174 | 0.34 | 2 |
| | 1.663 | 11.6% | 0.176 | 40.3% | 1.089 | 0.68 | 3 |
| | | | | | | | 4 |

Table 16 shows performance with respect to (2, 4, 2, 16) antenna layout of codebook option 1 in the 3D-UMa 500 m scenario.

TABLE 16

| | Mean UE Throughput (bps/Hz) | Mean UE Throughput Gain | 5% UE Throughput (bps/Hz) | 5% UE Throughput Gain | 50% UE Throughput (bps/Hz) | Resource Utilization | FTP load, λ (UEs/s/sector) |
|---|---|---|---|---|---|---|---|
| Cat-2 baseline | 2.962 | | 0.738 | | 2.721 | 0.29 | 2 |
| | 2.105 | | 0.315 | | 1.619 | 0.56 | 3 |
| | 1.421 | | 0.096 | | 0.777 | 0.82 | 4 |
| O_H = 8, O_V = 2 | 3.020 | 2.0% | 0.797 | 8.0% | 2.797 | 0.28 | 2 |
| | 2.165 | 2.8% | 0.338 | 7.4% | 1.688 | 0.54 | 3 |
| | 1.473 | 3.6% | 0.111 | 16.1% | 0.825 | 0.8 | 4 |
| O_H = 8, O_V = 4 | 3.019 | 1.9% | 0.810 | 9.8% | 2.778 | 0.28 | 2 |
| | 2.165 | 2.9% | 0.339 | 7.6% | 1.709 | 0.54 | 3 |
| | 1.474 | 3.7% | 0.109 | 14.0% | 0.823 | 0.8 | 4 |
| O_H = 8, O_V = 8 | 3.016 | 1.8% | 0.802 | 8.7% | 2.778 | 0.28 | 2 |
| | 2.164 | 2.8% | 0.340 | 7.7% | 1.688 | 0.54 | 3 |
| | | | | | | | 4 |

When the aforementioned check pattern (i.e., configuration with a horizontal spacing of 2 beams and a vertical spacing of 1 beam between W1 beam groups) is used, a case in which a given entire beam $N_hQ_hN_vQ_v$ is not included may occur as described in option 3 of FIG. 37.

To prevent this, a new check pattern (or zigzag pattern) as shown in FIG. 39 may be used.

FIG. 39 is a diagram for describing a method of configuring a codebook according to an embodiment of the present invention.

Referring to FIG. 39, only the pattern corresponding to odd-numbered indexes of W_1 is reversed to generate the pattern of FIG. 39, as described in option 3 of FIG. 37. Even-numbered indexes of W_1 may be reversed to generate the pattern.

In addition, option 1 shows a horizontal stripe (i.e., two beams overlap in the horizontal direction in identical vertical beams) pattern. If odd numbers (even numbers) of the vertical indexes or multiples of a specific number are selected in order to reduce the payload size of W_1 in the above pattern, beams with respect to a specific vertical beam cannot be considered.

FIG. 40 is a diagram for describing a method of configuring a codebook according to an embodiment of the present invention.

FIG. 40 illustrates a case in which only even numbers are selected on the basis of vertical indexes. In this case, beams corresponding to odd-numbered vertical indexes cannot be selected. To solve this problem, a modified horizontal stripe pattern as shown in FIG. 41 may be considered.

FIG. 41 is a diagram for describing a method of configuring a codebook according to an embodiment of the present invention.

FIG. 41 illustrates a case in which vertical indexes are increased by 1 for odd-numbered indexes of W_1. With this configuration, a larger number of vertical component beams can be considered compared to the pattern of FIG. 40, and thus performance improvement is expected.

The method described above with reference to FIG. 39 may be equally applied to a check pattern configured using a 4×2 rectangle instead of using a 2×4 rectangle forming a check pattern.

FIG. 42 is a diagram for describing a method of configuring a codebook according to an embodiment of the present invention.

Referring to FIG. 42, a check pattern (or zigzag pattern) can be generalized.

This is represented by Equation 93.

FIG. 44 illustrates a vertical stripe pattern when horizontal indexes are increased by 1 for odd-numbered indexes of W_1.

FIG. 45 illustrates a method for transmitting and receiving a signal on the basis of a codebook according to an embodiment of the present invention.

Referring to FIG. 45, an eNB transmits a reference signal (e.g., CSI-RS or the like) to a UE through multiple antenna ports (S4501).

The UE reports channel state information to the eNB (S4502).

Here, the channel state information may include a CQI, an RI, a PMI, a PTI and the like and the UE may derive the CQI, RI, PMI, PTI and the like using the reference signal received from the eNB.

Particularly, according to the present invention, the PMI may include a first PMI for selecting a precoding matrix set from a codebook and a second PMI for selecting one precoding matrix from the precoding matrix set.

Here, the codebook may be configured through the methods described above with reference to Equations 19 to 93 and/or FIGS. 15 to 44.

Here, a precoding matrix applied to multiple layers may be configured precoding vectors applied to respective layers. Here, each precoding vector applied per layer may be determined in the precoding vector set determined by the first PMI and a combination of precoding vectors may be determined by the second PMI. Here, the precoding vector set determined by the first PMI may correspond to a set of precoding matrices for 1 layer. Accordingly, in the case of multiple layers, a precoding matrix set may refer to a set of precoding matrices generated according to various combinations of precoding vectors corresponding to the respective layer.

For example, a codebook may be composed of a precoding matrix generated on the basis of the Kronecker product of a first matrix for first dimension (e.g., horizontal dimen- $$C_1 = \left\{ \begin{bmatrix} \tilde{W}_1 & 0 \\ 0 & \tilde{W}_1 \end{bmatrix} \middle| \tilde{W}_1 = \left[ \underbrace{w_{(i_1)\bmod 8+16\lfloor \frac{i_1}{8} \rfloor)\bmod 32} \ w_{(i_1+\alpha)\bmod 8+8d+16\lfloor \frac{i_1}{8} \rfloor)\bmod 32} \ w_{(i_1+b)\bmod 8+16\lfloor \frac{i_1}{8} \rfloor+8c)\bmod 32} \ w_{(i_1+\alpha(+b)\bmod 8+8d+16\lfloor \frac{i_1}{8} \rfloor+8c)\bmod 32}}_{4 \text{ columns}} \right] \right\} \quad \text{[Equation 93]}$$

where $w_m = v_h \otimes v_v$, $v_h = \begin{bmatrix} 1 \\ e^{j\frac{2\pi h}{8}} \end{bmatrix}$, $v_v = \begin{bmatrix} 1 \\ e^{j\frac{2\pi v}{4}} \end{bmatrix}$, $h = m \bmod 8$, $v = \lfloor \frac{m}{8} \rfloor$, $m \in \left\{ \left( i_1 + \alpha \cdot (i_2 \bmod 2) + b \lfloor \frac{i_2}{2} \rfloor \right) \bmod 8 + 16 \lfloor \frac{i_1}{8} \rfloor + 8d(i_2 \bmod 2) + 8c \lfloor \frac{i_2}{2} \rfloor \right) \bmod 32 \right\}$, $i_1 = 0, 1, \ldots, 15, i_2 = 0, 1, 2, 3$.

The methods described above with reference to FIGS. 40 and 41 can be equally applied to a vertical stripe pattern obtained by reversing a horizontal stripe pattern into the vertical domain.

FIG. 43 is a diagram for describing a method of configuring a codebook according to an embodiment of the present invention.

FIG. 43 illustrates a vertical stripe pattern when only even-numbered indexes are selected on the basis of horizontal indexes.

FIG. 44 is a diagram for describing a method of configuring a codebook according to an embodiment of the present invention.

sion) antenna ports and a second matrix for second dimension (e.g., vertical dimension) antenna ports.

Precoding matrices constituting all codebooks may be represented in a 2-dimensional form. In this case, each precoding matrix may be specified by an index in the first dimension (i.e., horizontal dimension) and an index in the second dimension (i.e., vertical dimension). In addition, the first matrix may be specified by the index of the first dimension of the precoding matrix and the second matrix may be specified by the index of the second dimension of the precoding matrix.

In addition, values of first dimension indexes and two dimension indexes of precoding matrices belonging to the precoding matrix set on the basis of the first PMI.

As described above, a precoding matrix set can be configured through various methods. In this case, the eNB can transmit a precoding matrix set configuration method, the number of antenna ports having the same polarization in the first dimension, the number of antenna ports having the same polarization in the second dimension, an oversampling factor used in the first dimension and an oversampling factor used in the second dimension to the UE through an RRC (Radio Resource Control) message or the like prior to step S4501.

General Apparatus to which the Present Invention May be Applied

FIG. 46 illustrates a block diagram of a wireless communication apparatus according to an embodiment of the present invention.

Referring to FIG. 46, the wireless communication system includes a base station (eNB) 4610 and a plurality of user equipments (UEs) 4620 located within the region of the eNB 4610.

The eNB 4610 includes a processor 4611, a memory 4612 and a radio frequency unit 4613. The processor 4611 implements the functions, processes and/or methods proposed in FIGS. 1 to 45 above. The layers of wireless interface protocol may be implemented by the processor 4611. The memory 4612 is connected to the processor 4611, and stores various types of information for driving the processor 4611. The RF unit 4613 is connected to the processor 4611, and transmits and/or receives radio signals.

The UE 4620 includes a processor 4621, a memory 4622 and a radio frequency unit 4623. The processor 4621 implements the functions, processes and/or methods proposed in FIGS. 1 to 45 above. The layers of wireless interface protocol may be implemented by the processor 4621. The memory 4622 is connected to the processor 4621, and stores various types of information for driving the processor 4621. The RF unit 4623 is connected to the processor 4621, and transmits and/or receives radio signals.

The memories 4612 and 4622 may be located interior or exterior of the processors 4611 and 4621, and may be connected to the processors 4611 and 4621 with well known means. In addition, the eNB 4610 and/or the UE 4620 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The codebook configuration method in a multi-antenna wireless communication system of the present invention has been described mainly with the example applied to 3GPP LTE/LTE-A system, but may also be applied to various wireless communication systems except the 3GPP LTE/LTE-A system.

The invention claimed is:

1. A method for transmitting and receiving, by a user equipment (UE), a signal based on a codebook in a 2-dimensional multi-antenna wireless communication system, the method comprising:
   receiving, from an evolved NodeB (eNB), a channel state information-reference signal (CSI-RS) on multiple antenna ports; and
   transmitting, to the eNB, a channel state information (CSI) report, wherein:
   the CSI report includes a precoding matrix indicator (PMI) for representing a precoding matrix of a codebook related to a rank-1 transmission,
   the PMI includes a first PMI comprising a codebook index pair including a first dimensional index and a second dimensional index and a second PMI related to co-phasing,
   four precoding matrices of the codebook are determined by the codebook index pair,
   a precoding matrix of any one of the four precoding matrices is determined by the second PMI,
   the four precoding matrices are generated by a Kronecker product of a first matrix and a second matrix,
   the first matrix comprises one or more columns of a first discrete Fourier transform (DFT) matrix selected based on a number of antenna ports of a first dimension and a first oversampling factor related to the first dimension, and
   the second matrix comprises one or more columns of a second DFT matrix selected based on a number of antenna ports of a second dimension and a second oversampling factor related to the second dimension.

2. The method of claim 1, wherein a spacing between the four precoding matrices adjacent in a direction of the first dimension is 2.

3. The method of claim 1, wherein the second PMI has a value of $\{0, 1, 2, 3\}$, and wherein a factor for controlling the phase is determined as one of $$\left\{1, \exp\left(j\frac{\pi}{2}\right), \exp\left(j\frac{2\pi}{2}\right), \exp\left(j\frac{3\pi}{2}\right)\right\}$$

based on a value of the second PMI.

4. The method of claim 1, wherein a total number of precoding matrices included in the codebook related to the rank-1 transmission is determined by a product of the number of antenna ports having the same polarization in the first dimension, the number of antenna ports having the same polarization in the second dimension, the first oversampling factor and the second oversampling factor.

5. The method of claim 1, wherein the first DFT matrix is generated according to an equation below,

[Equation]

$$D_{(mn)}^{N_h \times N_h Q_h} = \frac{1}{\sqrt{N_h}} e^{j\frac{2\pi(m-1)(n-1)}{N_h Q_h}}, \quad [\text{Equation}]$$

$$m = 1, 2, \cdots, N_h, n = 1, 2, \cdots, N_h Q_h$$

wherein $N_h$ is the number of antenna ports having the same polarization in the first dimension and $Q_h$ is the first oversampling factor.

6. The method of claim 1, wherein the second DFT matrix is generated according to an equation below, $$D_{(mn)}^{N_v \times N_v Q_v} = \frac{1}{\sqrt{N_v}} e^{j\frac{2\pi(m-1)(n-1)}{N_v Q_v}}, \quad [\text{Equation}]$$

$$m = 1, 2, \ldots, N_v, n = 1, 2, \ldots, N_v Q_v$$

wherein $N_v$ is the number of antenna ports having the same polarization in the second dimension and $Q_v$ is the second oversampling factor.

7. The method of claim 1, wherein index pairs of the first PMI of the four precoding matrices are (x, y), (x+2, y), (x+1, y+1) and (x+3, y+1), and
wherein x and y are integers which are not negative numbers.

8. A method for transmitting and receiving, by an evolved NodeB (eNB), a signal based on a codebook in a 2-dimensional multi-antenna wireless communication system, the method comprising:
transmitting, to a user equipment (UE), a channel state information-reference signal (CSI-RS) on multiple antenna ports; and
receiving, from the UE, a channel state information (CSI) report, wherein:
the CSI report includes a precoding matrix indicator (PMI) for representing a precoding matrix of a codebook related to a rank-1 transmission,
the PMI includes a first PMI comprising a codebook index pair including a first dimensional index and a second dimensional index and a second PMI related to co-phasing,
four precoding matrices of the codebook are determined by the codebook index pair,
a precoding matrix of any one of the four precoding matrices is determined by the second PMI,
the four precoding matrices are generated by a Kronecker product of a first matrix and a second matrix,
the first matrix comprises one or more columns of a first discrete Fourier transform (DFT) matrix selected based on a number of antenna ports of a first dimension and a first oversampling factor related to the first dimension, and
the second matrix comprises one or more columns of a second DFT matrix selected based on a number of antenna ports of a second dimension and a second oversampling factor related to the second dimension.

9. The method of claim 8, wherein a spacing between the four precoding matrices adjacent in a direction of the first dimension is 2.

10. A user equipment (UE) for transmitting and receiving a signal based on a codebook in a 2-dimensional multi-antenna wireless communication system and comprising:
a radio frequency (RF) module configured to transmit and receive a wireless signal; and
a processor functionally connected to the RF module and configured to:
receive, from an evolved NodeB (eNB), a channel state information-reference signal (CSI-RS) on multiple antenna ports; and
transmitting, to the eNB, a channel state information (CSI) report, wherein:
the CSI report includes a precoding matrix indicator (PMI) for representing a precoding matrix of a codebook related to a rank-1 transmission,
the PMI includes a first PMI comprising a codebook index pair including a first dimensional index and a second dimensional index and a second PMI related a co-phasing,
four precoding matrices of the codebook are determined by the codebook index pair,
a precoding matrix of any one of the four precoding matrices is determined by the second PMI,
the four precoding matrices are generated by a Kronecker product of a first matrix and a second matrix,
the first matrix comprises one or more columns of a first discrete Fourier transform (DFT) matrix selected based on a number of antenna ports of a first dimension and a first oversampling factor related to the first dimension, and
the second matrix comprises one or more columns of a second DFT matrix selected based on a number of antenna ports of a second dimension and a second oversampling factor related to the second dimension.

11. The UE of claim 10, wherein a spacing between the precoding matrices adjacent in a direction of the first dimension is 2.

12. The UE of claim 10, wherein the second PMI has a value of {0, 1, 2, 3}, and
wherein a factor for controlling the phase is determined as one of $$\left\{1, \exp\left(j\frac{\pi}{2}\right), \exp\left(j\frac{2\pi}{2}\right), \exp\left(j\frac{3\pi}{2}\right)\right\}$$

based on a value of the second PMI.

13. The UE of claim 10, wherein index pairs of the first PMI of the four precoding matrices are (x, y), (x+2, y), (x+1, y+1) and (x+3, y+1), and wherein x and y are integers which are not negative numbers.

\* \* \* \* \*